US012761689B1

(12) United States Patent
Sibbesen et al.

(10) Patent No.: US 12,761,689 B1
(45) Date of Patent: Oct. 13, 2026

(54) PORTABLE ELECTRONIC DEVICE CASE MODULAR KEYBOARD SYSTEM

(71) Applicant: Pioneer Square Brands, Inc., High Point, NC (US)

(72) Inventors: Soren Sibbesen, Jamestown, NC (US); Brian Lewis Piper, Seattle, WA (US); Quentin Wade Forbes, Winston Salem, NC (US); Richard Kennedy, Antioch, TN (US)

(73) Assignee: Pioneer Square Brands, Inc., High Point, NC (US)

(*) Notice: Subject to any disclaimer, the term of this patent is extended or adjusted under 35 U.S.C. 154(b) by 0 days.

(21) Appl. No.: 19/420,771

(22) Filed: Dec. 16, 2025

Related U.S. Application Data

(60) Provisional application No. 63/789,384, filed on Apr. 15, 2025.

(51) Int. Cl.
*G06F 1/16* (2006.01)

(52) U.S. Cl.
CPC .................................. *G06F 1/1616* (2013.01)

(58) Field of Classification Search
CPC .................................................... G06F 1/1616
See application file for complete search history.

(56) References Cited

U.S. PATENT DOCUMENTS 9,715,254 B2 * 7/2017 Mori ..................... G06F 1/1624
10,838,455 B2 * 11/2020 Fenton .................. G06F 1/1681
10,845,843 B1 * 11/2020 Manzano .............. G06F 1/1656
10,845,844 B1 * 11/2020 Chan ...................... G06F 1/1628
10,928,854 B1 * 2/2021 Fenton .................. G06F 1/1628
11,029,726 B2 * 6/2021 Manzano .............. G06F 1/1628
11,029,727 B1 * 6/2021 Chan ...................... G06F 1/1628
11,188,121 B2 * 11/2021 Manzano .............. G06F 1/1628
11,237,593 B2 * 2/2022 Chan ...................... G06F 1/1628
11,294,426 B1 * 4/2022 Piper ...................... G06F 1/1669
11,300,997 B1 * 4/2022 Chan ...................... G06F 1/1628
11,314,280 B2 * 4/2022 Ferren ..................... F16M 11/38
11,327,536 B1 * 5/2022 Piper ...................... G06F 1/1681
11,385,680 B1 * 7/2022 Chan ...................... G06F 1/1628
11,402,874 B1 * 8/2022 Giazzon ................ G06F 1/1628
(Continued)

*Primary Examiner* — Lisa Lea-Edmonds
(74) *Attorney, Agent, or Firm* — Grandview Law

(57) ABSTRACT

This application relates to a modular device enclosure including a frame assembly, keyboard assembly, trim member, and a tablet-shaped electronic device. The frame includes side portions, flange portions, recessed structures, and standoffs that enable precise positioning and retention of the keyboard assembly. The keyboard assembly includes sidewalls, a coupling structure with tab members and apertures, and a front interface with a keypad and trackpad. A trim member includes boss members for coupling with the keyboard assembly and is positioned to conceal and protect coupling features. A tablet-shaped electronic device may be received within the frame and cooperate with the keyboard and trim. The assemblies may be reversibly coupled to allow easy removal, secure engagement, and low-profile stowing. Exploded and assembled views illustrate the configuration in open and closed orientations. In various implementations, the assemblies are positionally indexed, and designed to accommodate tactile input and electronic interface with a touch-sensitive display.

20 Claims, 53 Drawing Sheets

(56) References Cited

U.S. PATENT DOCUMENTS

| | | | | |
|---|---|---|---|---|
| 11,409,328 | B2 * | 8/2022 | Manzano | A45C 11/003 |
| 11,455,010 | B1 * | 9/2022 | Chan | G06F 1/1628 |
| 11,717,067 | B1 * | 8/2023 | Piper | A45C 11/00<br>224/191 |
| 11,914,426 | B2 * | 2/2024 | Perelli | G06F 1/1658 |
| 2025/0390148 | A1 * | 12/2025 | Piper | G06F 1/1628 |

* cited by examiner

PORTABLE ELECTRONIC DEVICE CASE MODULAR KEYBOARD SYSTEM

In one or more aspects a A case system for a portable electronic device, the system comprising: I. a frame assembly including: A. a plurality of side portions, each having a flange portion; B. a recessed structure including: (1) end portions, (2) a back portion, (3) a base portion, and (4) an edge portion, C. a plurality of standoffs positioned within the recessed structure, and D. a plurality of tabs positioned along the recessed structure; II. a keyboard assembly including: A. a plurality of side portions aligned with the side portions of the frame assembly, B. a coupling structure having: (1) an inner surface, and (2) a plurality of apertures arranged to receive corresponding tabs and fasteners from the frame assembly, C. a front portion including a keypad and a trackpad, and D. a back portion positioned adjacent to the recessed structure of the frame assembly, wherein the keyboard assembly is removably couplable to the frame assembly such that the back portion is secured within the recessed structure and the tabs and standoffs facilitate alignment and attachment.

In implementations the side portions of the keyboard assembly include tab members insertable into corresponding tab-receiving regions of the frame assembly.

In implementations the frame assembly further includes inner wall portions extending from the side portions and interfacing with outer portions of the keyboard assembly.

In implementations the inner wall portions cooperate with the tabs to restrict lateral movement of the keyboard assembly relative to the frame assembly.

In implementations the plurality of apertures in the coupling structure receive fasteners extending through the tabs of the frame assembly.

In implementations the recessed structure of the frame assembly includes a plurality of bosses positioned adjacent at least some of the tabs to accept the fasteners.

In implementations the standoffs maintain spacing between the keyboard assembly and the base portion of the recessed structure.

In implementations the spacing accommodates airflow or cable routing between the keyboard assembly and the frame assembly.

In implementations the back portion of the keyboard assembly includes a latch portion engageable with a portion of the recessed structure of the frame assembly.

In implementations the latch portion assists in maintaining the keyboard assembly in a retained position relative to the frame assembly.

In one or more aspects a case system for a portable electronic device includes I. a frame assembly including: A. a recessed structure formed by: (1) end portions, (2) a back portion, and (3) an edge portion, and B. a plurality of tabs and standoffs, and II. a keyboard assembly including: A. a coupling structure with a plurality of apertures, and B. a back portion seated within the recessed structure, wherein the keyboard assembly is removably couplable to the frame assembly by fasteners extending through the tabs into the standoffs.

In implementations the coupling structure includes an inner surface shaped to match the recessed structure of the frame assembly.

In implementations the inner surface promotes flush alignment between the keyboard assembly and the frame assembly.

In implementations the recessed structure further includes a plurality of bosses receiving the fasteners.

In implementations the frame assembly includes outer face portions surrounding the recessed structure and aligning with corresponding outer portions of the keyboard assembly.

In implementations the keyboard assembly includes a front portion having a trackpad and a keypad aligned for user input.

In one or more aspects a case system for a portable electronic device includes I. a frame assembly including: A. a recessed structure receiving both a keyboard assembly and a portable electronic device, B. a plurality of tabs and standoffs arranged to secure components within the recessed structure, and C. flange portions extending from side portions of the frame assembly, II. a keyboard assembly removably couplable to the recessed structure by fasteners extending through the tabs; and III. a trim member including a plurality of boss members engaging corresponding holes in the frame assembly to enclose the portable electronic device and keyboard assembly.

In implementations the trim member includes an inner surface contacting and retaining the portable electronic device.

In implementations the trim member includes side portions aligned with the side portions of the frame assembly to provide edge protection.

In implementations the frame assembly and trim member together define an enclosure substantially surrounding the keyboard assembly and the portable electronic device in a closed configuration.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of Portable Electronic Device Case Modular Keyboard System, articles of manufacture, compositions of matter for same that may provide context, for instance, in introducing one or more processes and/or devices described herein.

DETAILED DESCRIPTION

Figure 1:
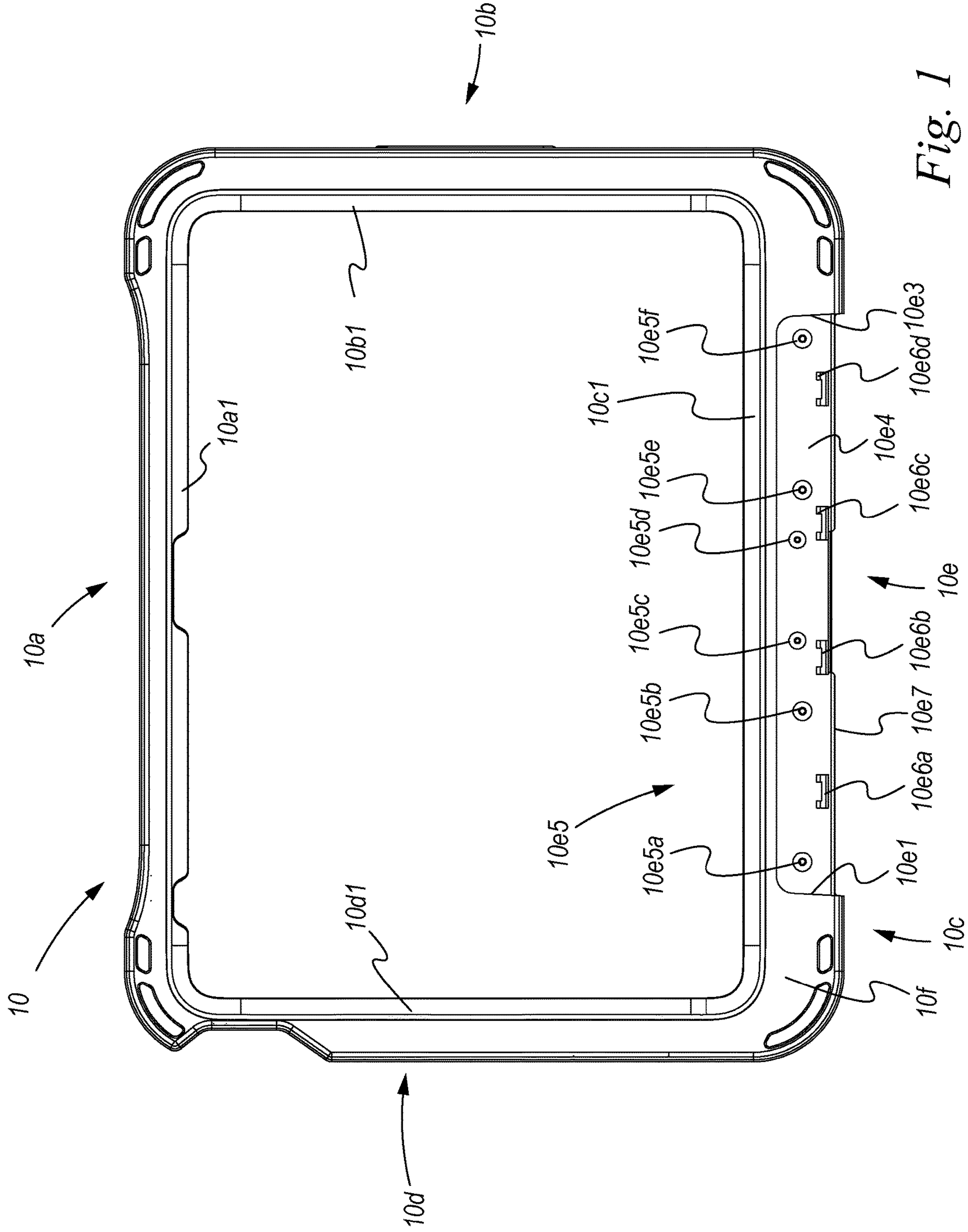
FIG. 1 is a front elevational view of a frame.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a front elevational view of frame assembly 10 including side portions 10*a*, 10*b*, 10*c*, and 10*d*, each having corresponding flange portions 10*a*1, 10*b*1, 10*c*1, and 10*d*1 that extend inward toward a central recessed structure 10*e*. Recessed structure 10*e* includes end portions 10*e*1 and 10*e*3, back portion 10*e*2, and base portion 10*e*4, collectively defining a perimeter boundary that receives the keyboard assembly. Disposed within the recessed structure are a standoff plurality 10*e*5 of standoffs 10*e*5*a*-10*e*5*f* and tab plurality 10*e*6 of tabs 10*e*6*a*-10*e*6*d*. The standoffs project upward from base portion 10*e*4, each having a generally cylindrical or rectangular peg structure with a central threaded hole or aperture for screw-type or snap-in coupling. The tabs are spaced between the standoffs and extend vertically or slightly inward, suggesting use as alignment or tension-fit members. Edge portion 10*e*7 runs along at least one side of the recessed structure to guide insertion or stabilize a coupled keyboard. Outer face portion 10*f* defines the front-facing periphery and may include a beveled transition into the recessed region, enabling smooth interfacing with the keyboard's bottom surface.

Frame assembly 10 is configured to receive a keyboard assembly within recessed structure 10*e* such that the keyboard is secured by the standoffs 10*e*5*a*-10*e*5*f* and tabs 10*e*6*a*-10*e*6*d*. The standoffs include central threaded holes dimensioned to receive threaded fasteners, facilitating secure coupling of the keyboard assembly to the frame. The tabs may engage side surfaces or edge notches of the keyboard, preventing undesired lateral motion. The flange portions along side portions 10*a*-10*d* define a partial overhang above the recessed region, which may serve to stabilize trim elements or prevent upward displacement of the keyboard.

The structural arrangement of recessed structure 10*e*, including base portion 10*e*4 and edge portion 10*e*7, facilitates an interface between the frame and keyboard that is mechanically secure and laterally constrained. The positioning of the standoffs and tabs supports repeatable attachment and detachment during maintenance or part replacement. The perimeter and layout also allow for alignment with corresponding apertures in the keyboard assembly to form a unified assembly housing a portable electronic device.

Figure 2:
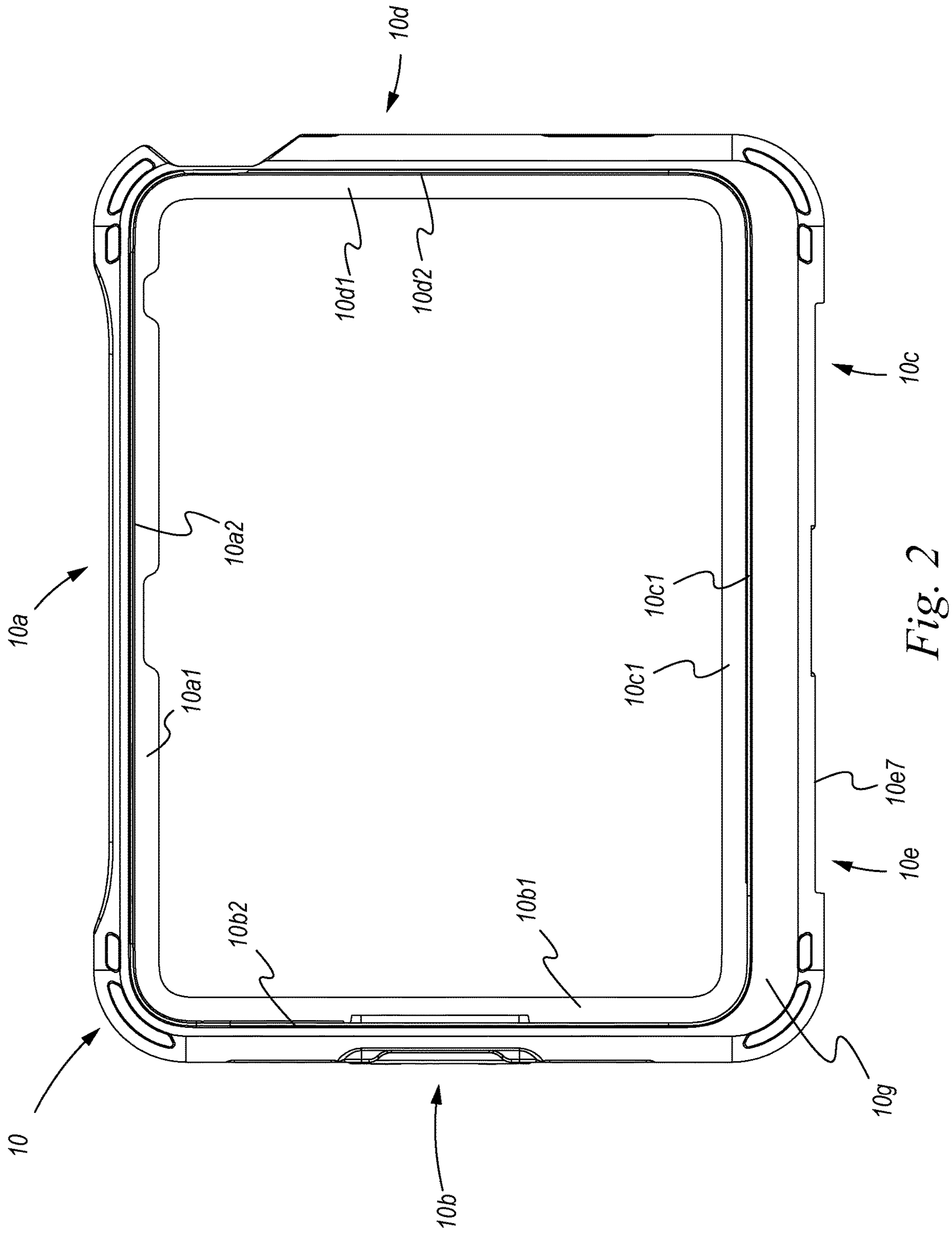
FIG. 2 is a back elevational view of the frame of FIG. 1.

Turning to FIG. 2, depicted therein is a back elevational view of frame assembly 10, showing side portions 10*a*-10*d* from the rear side. Inner wall portions 10*a*2, 10*b*2, 10*c*2, and 10*d*2 are visible along the inside perimeter, forming a downward-facing channel or lip that likely retains the keyboard or aligns with mating trim elements. Outer face portion 10*g* defines the exterior boundary of the frame's rear surface and may serve to visually or structurally integrate with the trim when assembled. Also visible is the external profile of recessed structure 10*e*, including the back portion 10*e*2 and base portion 10*e*4, which together define a shallow sunken cavity that receives the keyboard assembly while leaving space for coupling hardware such as standoffs and tabs. Several fastener holes and parting lines are also visible, indicating potential molded or modular construction.

The recessed structure 10*e* is designed to interface with both the keyboard and trim members in a layered configuration. The rear profile shown in this view suggests a housing structure capable of receiving the portable electronic device behind the keyboard plane, within a rear cavity that is defined at least in part by back portion 10*e*2 and side portions 10*a*-10*d*. The outer face portion 10*g* may act as a mechanical and cosmetic surface, integrating with trim components while forming a rigid support frame.

The inner wall portions 10*a*2-10*d*2 also contribute to guiding and supporting the positioning of the keyboard assembly within the recessed region. These inner wall features help align edge surfaces of the keyboard and serve as reference surfaces for locating tabs or bosses extending from the trim. The overall configuration establishes a nested, multi-layered case system structure in which the keyboard is mounted to the frame from the front, and the portable electronic device is mounted from the rear.

Figure 3:
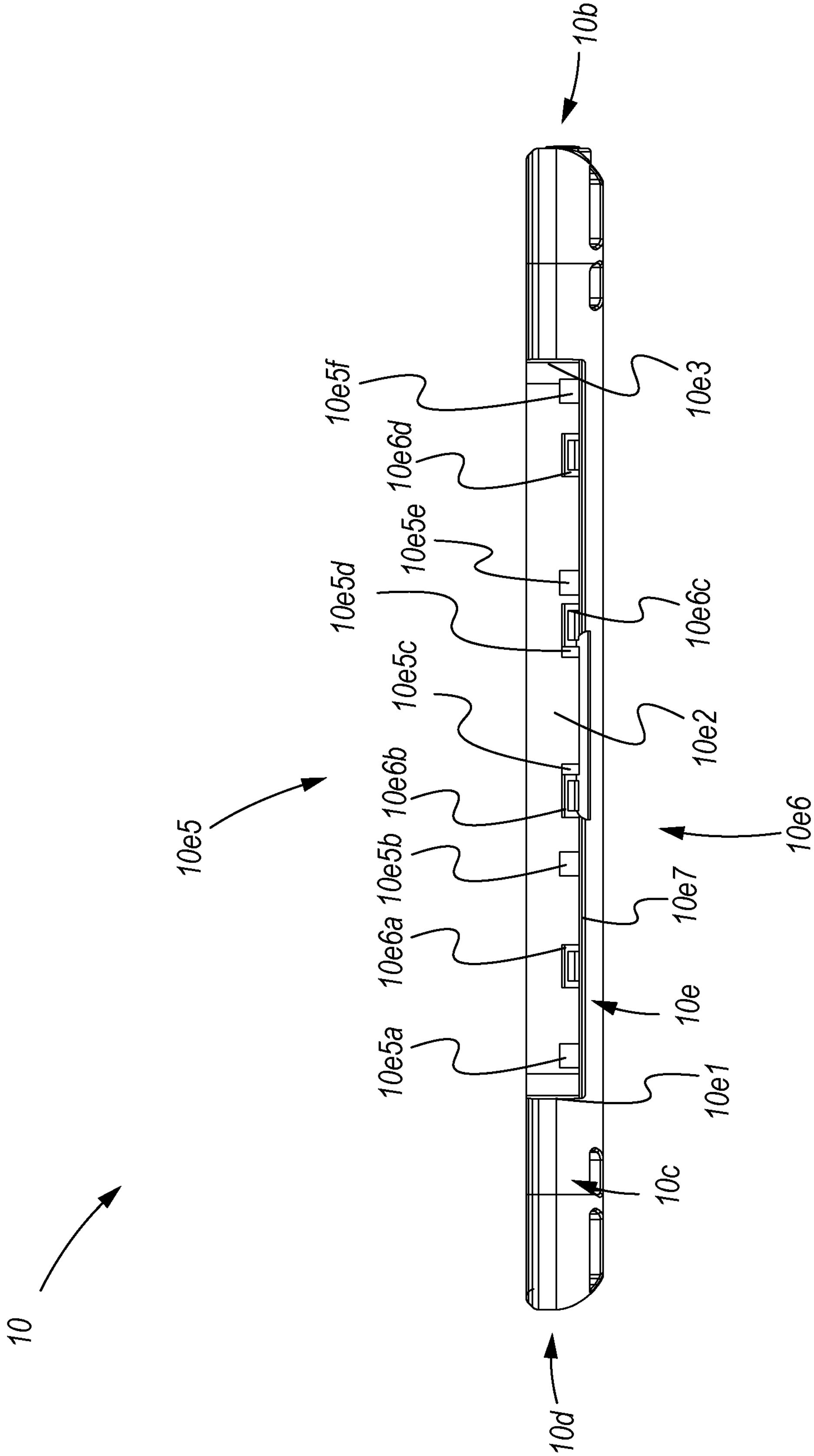
FIG. 3 is a left side elevational view of the frame of FIG. 1.

Turning to FIG. 3, depicted therein is a left side elevational view of frame assembly 10. This view shows side portion 10*b* and the associated inward-extending flange portion 10*b*1. Flange portion 10*b*1 defines part of the ledge that surrounds the central recessed structure 10*e* and provides support for the keyboard assembly when installed. The flange projects inward from the main frame body and is coextensive with adjacent flange portions to form a continuous peripheral shelf.

Visible behind flange portion 10*b*1 is the recessed structure 10*e*, particularly base portion 10*e*4, which is set deeper than the flanges and defines the horizontal bottom surface that supports the keyboard. The vertical separation between the flange and the base establishes a cavity into which the keyboard may be inserted and seated. This drop-in geometry enables the keyboard to align flush or nearly flush with the upper surface defined by the flanges once installed.

The view also illustrates the thickness and solidity of the side wall, which contributes to the structural integrity of the frame. The profile of side portion 10*b* suggests the presence of internal volumes sufficient to support embedded features such as threaded bosses, slots, or molded supports. The outer contour of side portion 10*b* also interfaces with the trim member when assembled and may provide structural or cosmetic alignment surfaces.

This side elevational perspective confirms the tiered arrangement of the recessed structure in relation to the peripheral flanges and frame body, which together define the mechanical interface between the keyboard and the frame. The alignment of these components enables stable and repeatable assembly of the keyboard into the frame and provides an interface that supports additional system components such as a trim member or rear-mounted tablet.

Figure 4:
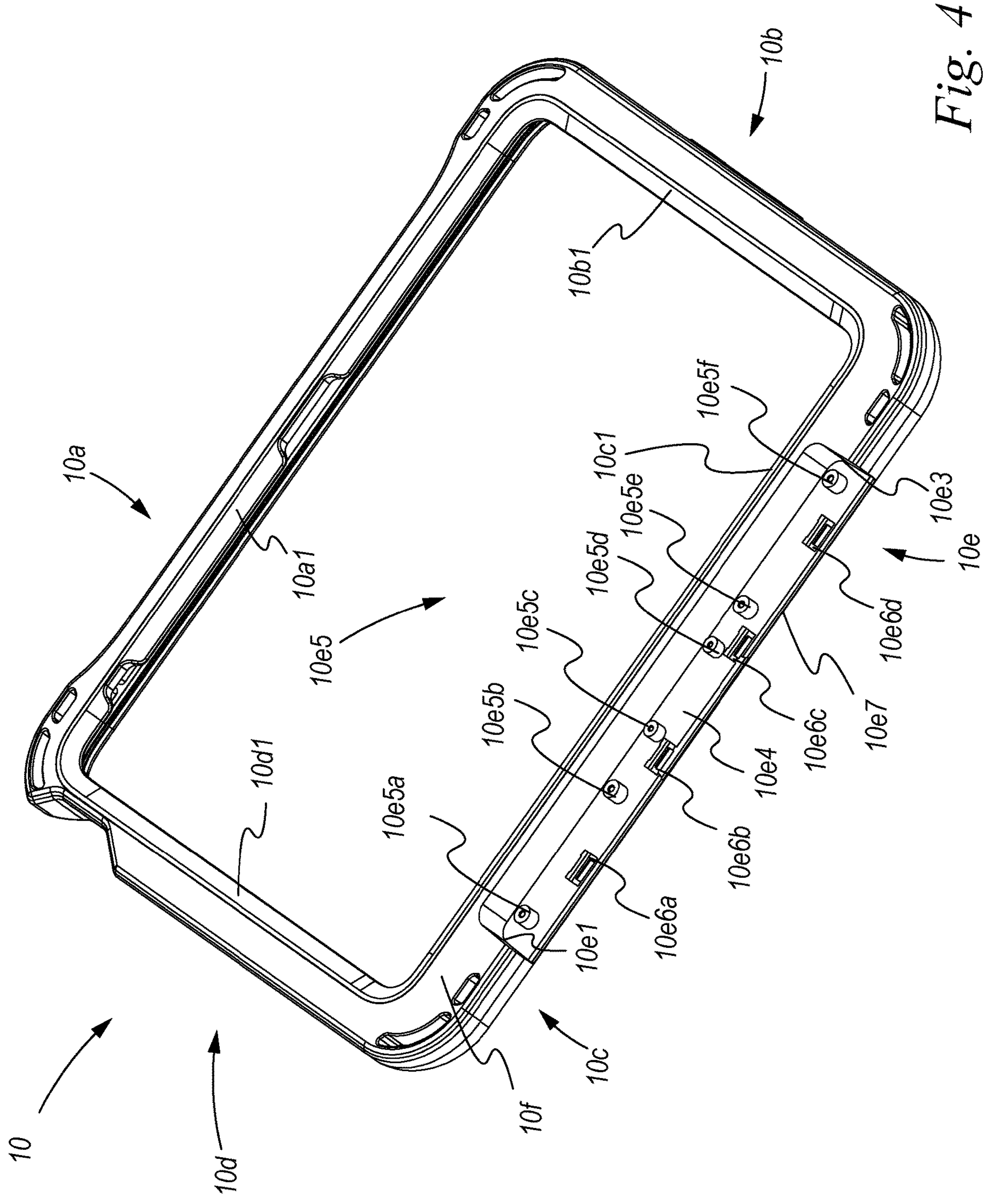
FIG. 4 is a first front perspective view of the frame of FIG. 1.

Turning to FIG. 4, depicted therein is a first front perspective view of frame assembly 10. This angled view reveals the overall structure and interrelation of the recessed structure 10*e* with surrounding flange portions 10*a*1, 10*b*1, 10*c*1, and 10*d*1, which form a continuous ledge defining the upper boundary of the recessed region. These flange portions extend inward from the respective side portions 10*a*-10*d* and collectively form a stabilizing support ledge around the recessed structure.

The recessed structure 10*e* includes end portions 10*e*1 and 10*e*3, a back portion 10*e*2, and a base portion 10*e*4, which together define the sunken compartment designed to receive a keyboard assembly. Within this base portion 10*e*4, a set of upwardly projecting standoffs 10*e*5*a*-10*e*5*f* are visible. These standoffs are positioned to align with coupling apertures in the keyboard assembly and may include internal threading or hollow channels for receiving fasteners such as screws. The standoffs appear in a distributed array to provide balanced support and retention across the keyboard surface.

Also visible in this view are multiple tabs 10*e*6*a*-10*e*6*d*, which extend vertically from base portion 10*e*4 and are spaced between or adjacent to the standoffs. These tabs are shaped to provide lateral engagement with the keyboard assembly, either through frictional fit, compression, or alignment of mating surfaces. The tabs may include chamfered or angled tips to assist in guided insertion of the keyboard.

Edge portion 10*e*7 is visible along one side of the recessed structure and may serve as a guide or alignment rail during keyboard insertion. It may also provide an added structural lip to prevent lateral shifting once the keyboard is installed.

The perspective view also shows the integration between recessed structure 10*e* and outer face portion 10*f*, which defines the visible front surface of the frame assembly. This face may be beveled or contoured to ease assembly and provide a smooth interface with adjacent components such as the keyboard or trim member.

The combination of flange portions, recessed geometry, and coupling features establishes a robust and repeatable mechanical interface for removably coupling the keyboard assembly to the frame assembly. The spatial relationships among these elements also facilitate consistent alignment during manufacturing or user assembly.

Figure 5:
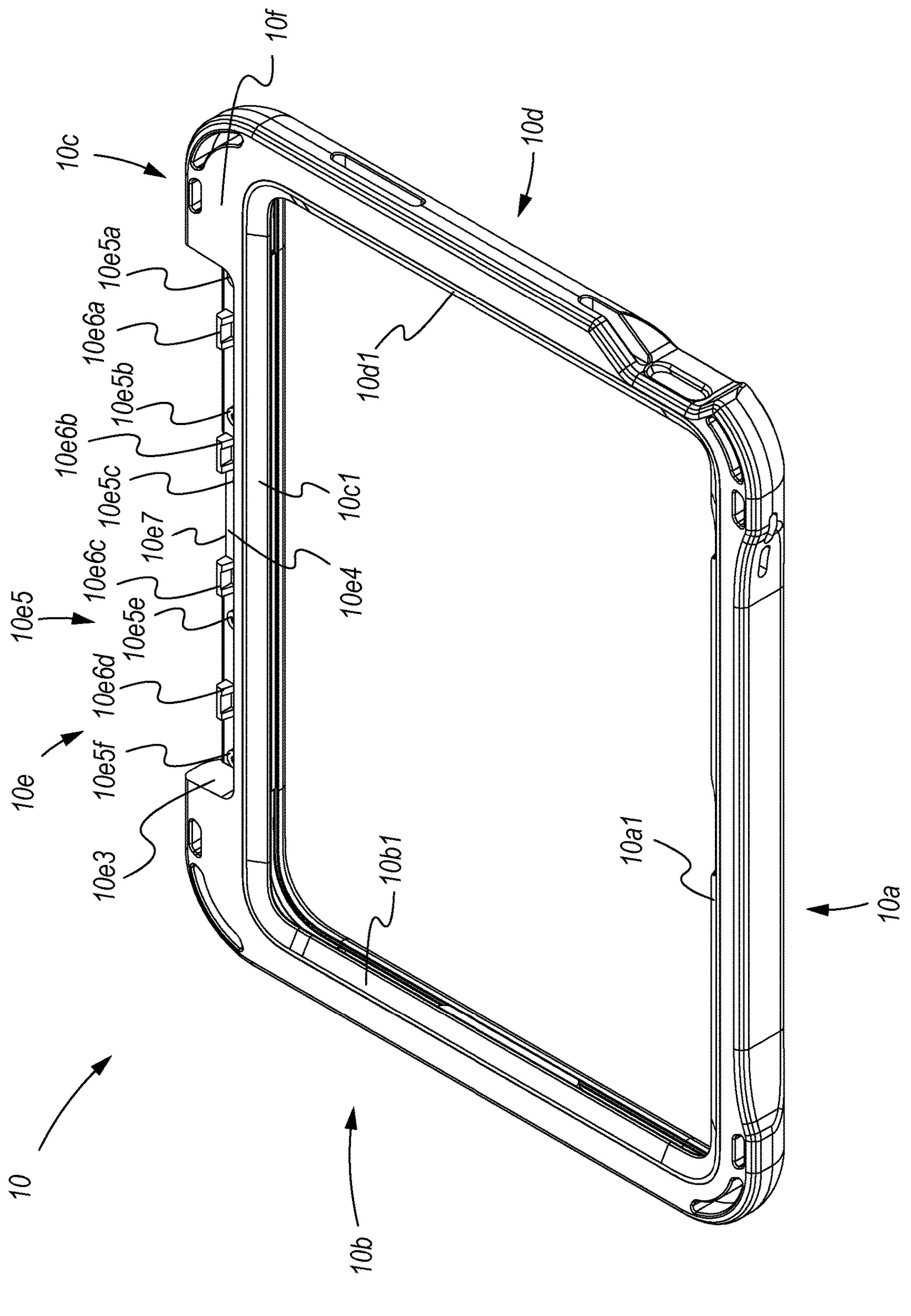
FIG. 5 is a second front perspective view of the frame of FIG. 1.

Turning to FIG. 5, depicted therein is a second front perspective view of frame assembly 10, viewed from an angle complementary to that of FIG. 4. This view further clarifies the geometry and depth of the recessed structure 10*e* and its associated features.

Frame assembly 10 includes side portions 10*a*, 10*b*, 10*c*, and 10*d*, each having inward-extending flange portions 10*a*1-10*d*1. These flange portions form the upper lip of the recessed structure 10*e* and serve as stop surfaces or constraints that help secure the keyboard assembly when inserted from above. The recessed structure itself includes end portions 10*e*1 and 10*e*3, back portion 10*e*2, and a generally planar base portion 10*e*4.

Projecting upward from base portion 10*e*4 are standoffs 10*e*5*a*-10*e*5*f*, which are shown more clearly in this perspective. The standoffs are spaced to correspond with fastener apertures in the keyboard and are likely cylindrical or rectangular in cross-section, with threaded central bores or recesses to receive machine screws or similar fasteners. Their elevation above the base portion helps maintain separation between the keyboard and base, and their fixed spacing ensures alignment repeatability during installation.

Also visible in this view are tabs 10*e*6*a*-10*e*6*d*. These tabs are distributed around the standoffs and rise vertically or at a slight angle from the base portion. Their placement and shape indicate a function of guiding or retaining the keyboard assembly during insertion, possibly through friction fit, snap-in engagement, or positional alignment with notches or recesses on the keyboard housing.

Edge portion 10*e*7 is more prominent in this view and runs along a side of recessed structure 10*e*. It may function as an insertion guide or a physical barrier against lateral displacement once the keyboard is seated. The visible geometry suggests that this edge portion could also help define the side boundary of the installed keyboard and provide an alignment reference for trim coupling.

The overall structure presents a recessed central volume surrounded by mechanically reinforcing features that collectively enable secure, repeatable, and tool-supported mounting of a keyboard assembly into the frame. The flanges and internal elements shown here serve to define the mounting cavity's depth, boundary, and fastener interface, which are important to ensuring modularity in the complete device enclosure system.

Figure 6:
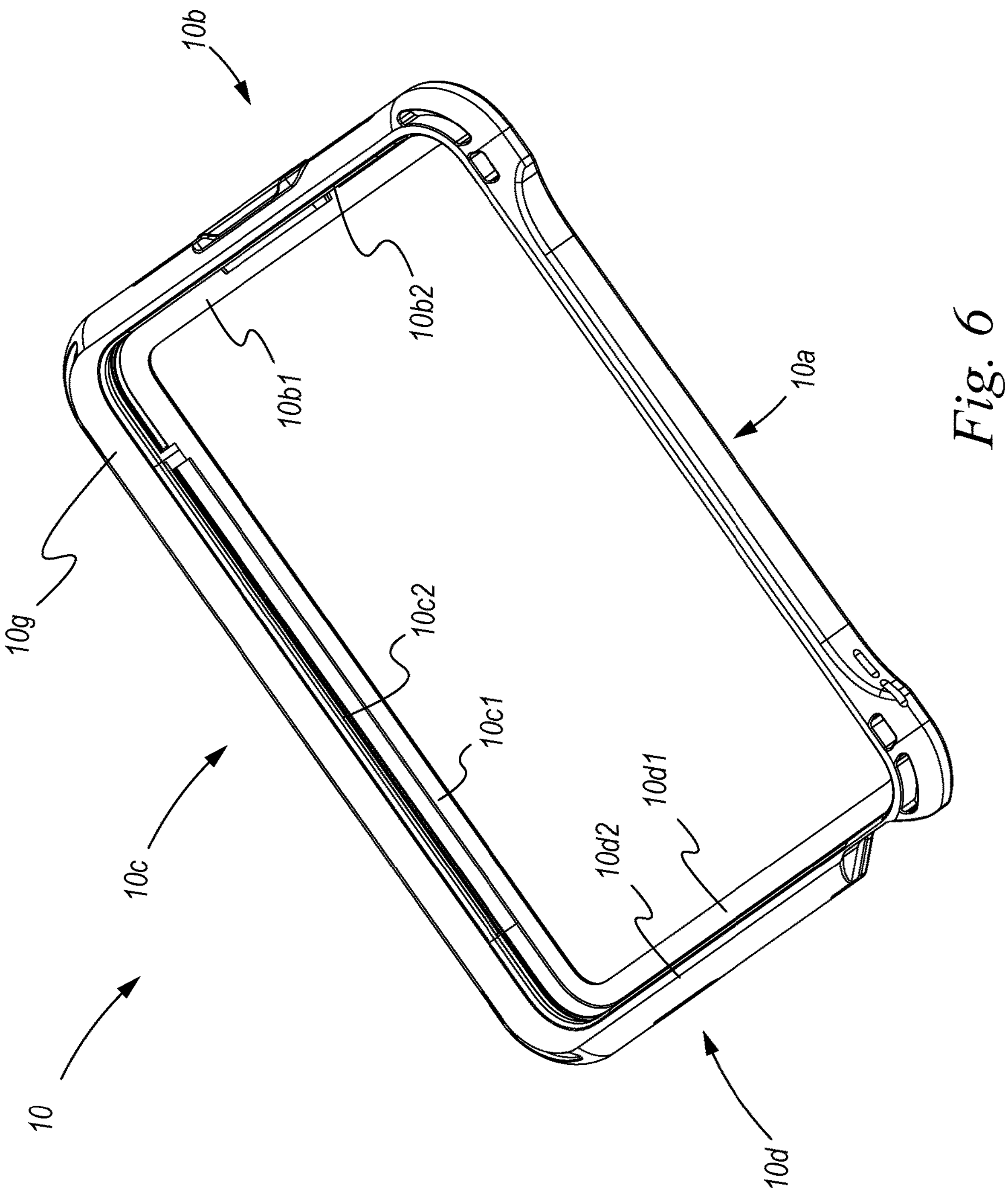
FIG. 6 is a first back perspective view of the frame of FIG. 1.

Turning to FIG. 6, depicted therein is a first back perspective view of frame assembly 10, showing the rear and underside configuration of the assembly. This view helps illustrate the structural relationship between the outer face portion 10*g*, the side portions 10*a*-10*d*, and the recessed internal region of the frame that receives other device components.

The frame's side portions define a generally rectangular boundary enclosing the rear cavity. Along the inner boundary of these side portions are inner wall portions 10*a*2, 10*b*2, 10*c*2, and 10*d*2. These inner wall portions are contoured as downward-projecting or inward-stepped ridges that help define a seating or retaining region for a rear-inserted portable electronic device or a trim element. Their shape suggests alignment functions or engagement features for structural interfacing.

Recessed structure 10*e* is partially visible from this angle, with the back portion 10*e*2 and base portion 10*e*4 clearly observed. These portions together define a sunken central cavity that houses the coupling features for the keyboard and may also provide clearance for a tablet or internal electronics. Although standoffs and tabs are not clearly visible from this rear angle, their positions are inferred by surface geometry and contour lines on the inner structure.

The outer face portion 10*g* spans the external perimeter of the back surface and may serve cosmetic or mechanical purposes, such as reinforcing the rear edge, providing protection for internal components, or defining mating surfaces for enclosure elements. It appears flush with the rear wall planes of side portions 10*a*-10*d*, indicating that the back surface forms a solid perimeter when mounted.

This view also highlights that the thickness of the frame is sufficient to support embedded hardware features, including threaded holes, bosses, or latch-receiving components, while maintaining a compact profile suitable for portable device applications.

Overall, FIG. 6 emphasizes the rear-facing geometry of the frame and shows how it defines a nested housing region to accommodate both front and rear component coupling, with a configuration that supports modular assembly and alignment between components.

Figure 7:
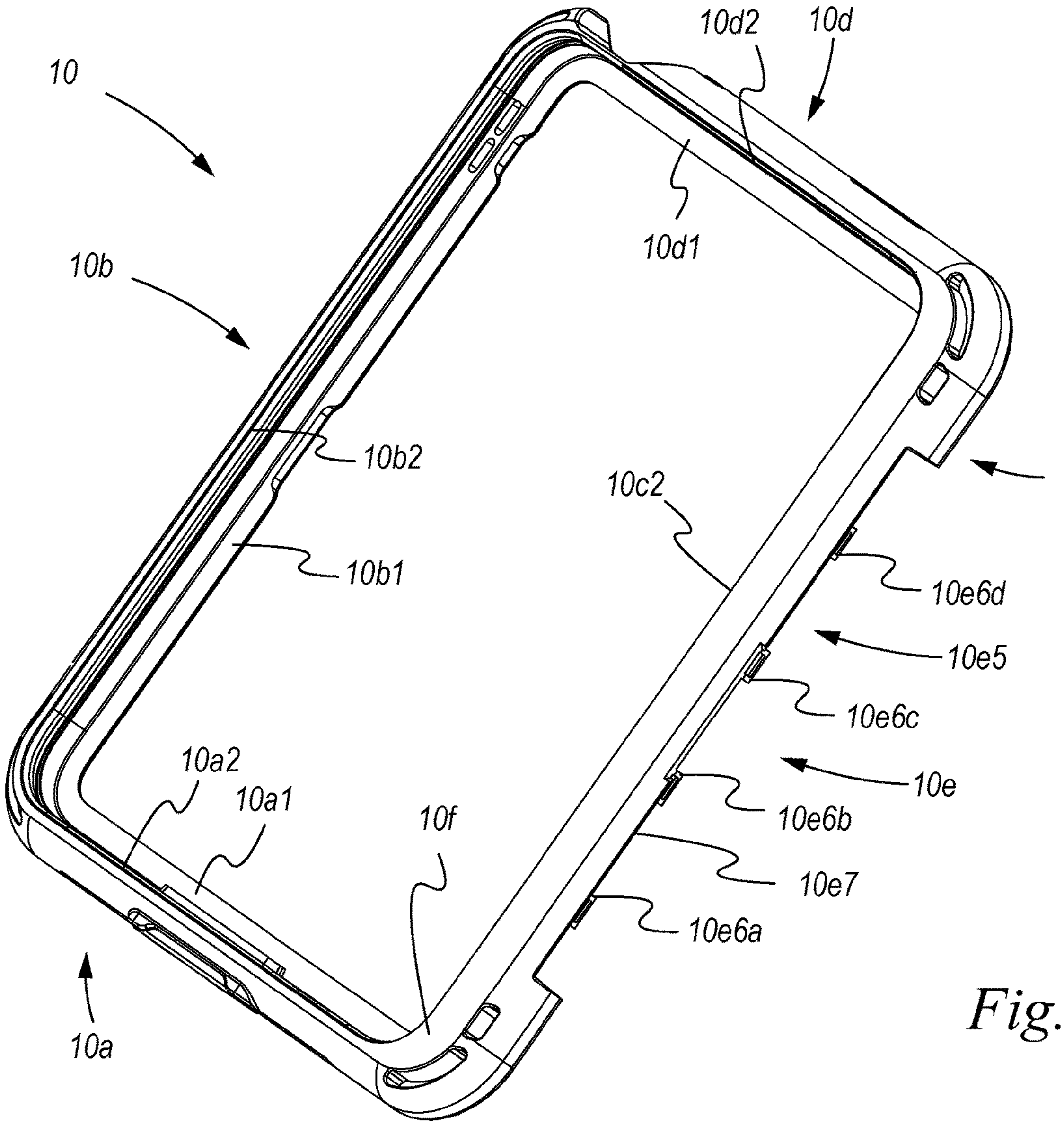
FIG. 7 is a second back perspective view of the frame of FIG. 1.

Turning to FIG. 7, depicted therein is a second back perspective view of frame assembly 10, rotated relative to FIG. 6 to provide an angled look into the internal rear structure and component layout. This view enhances spatial understanding of how the various portions of the frame interact with components such as the keyboard, trim member, and portable electronic device.

Side portions 10*a*-10*d* and outer face portion 10*g* are again visible, enclosing the rear frame boundary in a generally rectangular layout. Inner wall portions 10*a*2-10*d*2 form a lowered channel or shelf around the interior of the frame opening, functioning as alignment guides or mounting ledges for internal components. These inner walls also likely provide bearing surfaces for a trim piece or device edge, helping to stabilize such elements during assembly.

The internal boundaries of recessed structure 10*e*, including back portion 10*e*2 and base portion 10*e*4, are visible in greater depth in this view. While the standoffs and tabs are not directly observable, the general contours and depth of the recessed structure suggest their relative location and function. These internal features define a lowered cavity within the central frame and are configured to receive and support a keyboard assembly.

In this orientation, one can better observe the interaction between flange portions 10*a*1-10*d*1 and the top surface of the frame, as they create a ledge that forms the upper border of the recessed cavity on the front-facing side. This flanged structure helps limit the vertical movement of an inserted keyboard and may also provide physical stops or resting points for trim elements.

The frame thickness, visible along the side portions, confirms that the structure supports durable engagement between front and rear-mounted components. The rear opening accommodates insertion of a tablet or similar device into the rear housing region, which is defined at least in part by base portion 10*e*4 and back portion 10*e*2, while the front opening enables keyboard coupling into recessed structure 10*e*.

Overall, FIG. 7 complements previous views by illustrating the full enclosure geometry of the frame, clarifying how internal and external features support the positioning and securement of layered assemblies, including a keyboard from the front and a portable device from the rear.

Figure 8:
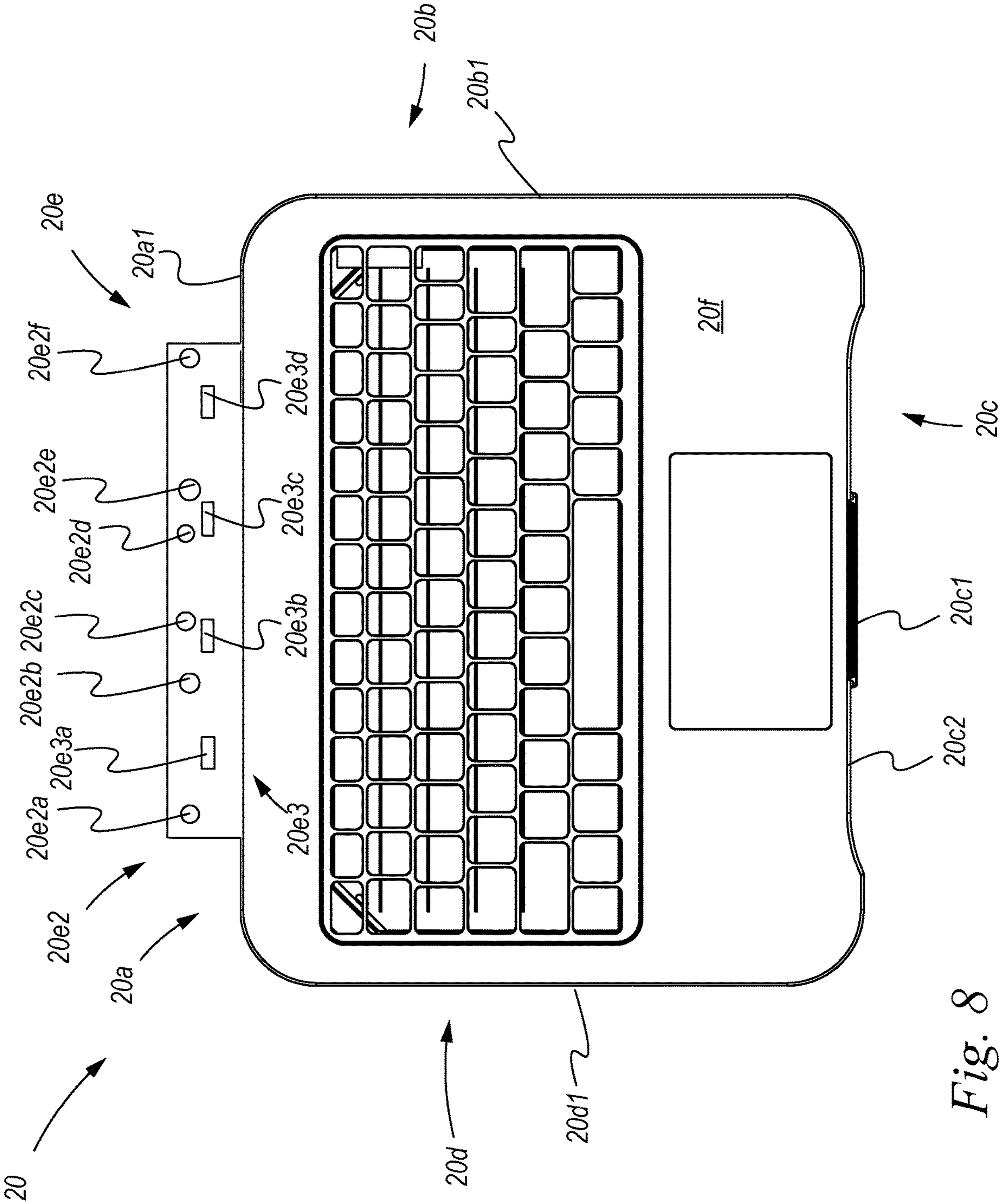
FIG. 8 is a front elevational view of a keyboard.

Turning to FIG. 8, depicted therein is a front elevational view of keyboard assembly 20. Keyboard assembly 20 includes four side portions 20*a*, 20*b*, 20*c* (with tab member 20*c*1), and 20*d*, arranged in a generally rectangular shape and bounding a central front surface 20*f*. Keyboard 20 includes coupling structure 20*e* with inner surface 20*e*1, aperture plurality 20*e*2 having aperture 20*e*2*a*, aperture 20*e*2*b*, aperture 20*e*20*c*, aperture 20*e*2*d*, aperture 20*e*2*e*, and aperture 20*e*2*f*, aperture plurality 20*e*3 with aperture 20*e*3*a*, aperture 20*e*3*b*, aperture 20*e*3*c*, and aperture 20*e*3*d*.

The front surface includes keypad 20*f*1, which occupies the majority of the upper region, and trackpad 20*f*2, located centrally near the bottom edge. The keyboard surface is generally flat, with a subtle depression around the trackpad to avoid unintended contact or interference when enclosed.

The outer edges of side portions 20*a*-20*d* are dimensioned and contoured to correspond with the recessed structure of the frame assembly. The edges may include slight bevels or steps that assist with alignment or seating against the frame's inner wall portions and flange portions. These structural features support repeatable insertion and retention of the keyboard within the frame.

The keypad 20*f*1 contains a full set of alphanumeric and functional keys, and may include other specialized keys such as brightness or volume controls. The trackpad 20*f*2 is flush-mounted or slightly recessed within the keyboard housing, and is likely capacitive or pressure-sensitive for use with multi-touch input gestures. The positioning and proportions of the input elements suggest ergonomic spacing, allowing finger access without requiring excessive reach or motion.

In this view, the keyboard housing is shown without any trim or outer frame, offering a clear presentation of its standalone geometry. The flatness and symmetry of the surface reinforce its compatibility with a trim member that overlays its periphery while avoiding interference with the active input surfaces. The uniform outer margins on all sides also suggest a housing structure designed to engage with bosses, tabs, or other retention features when coupled into a larger system assembly.

Figure 9:
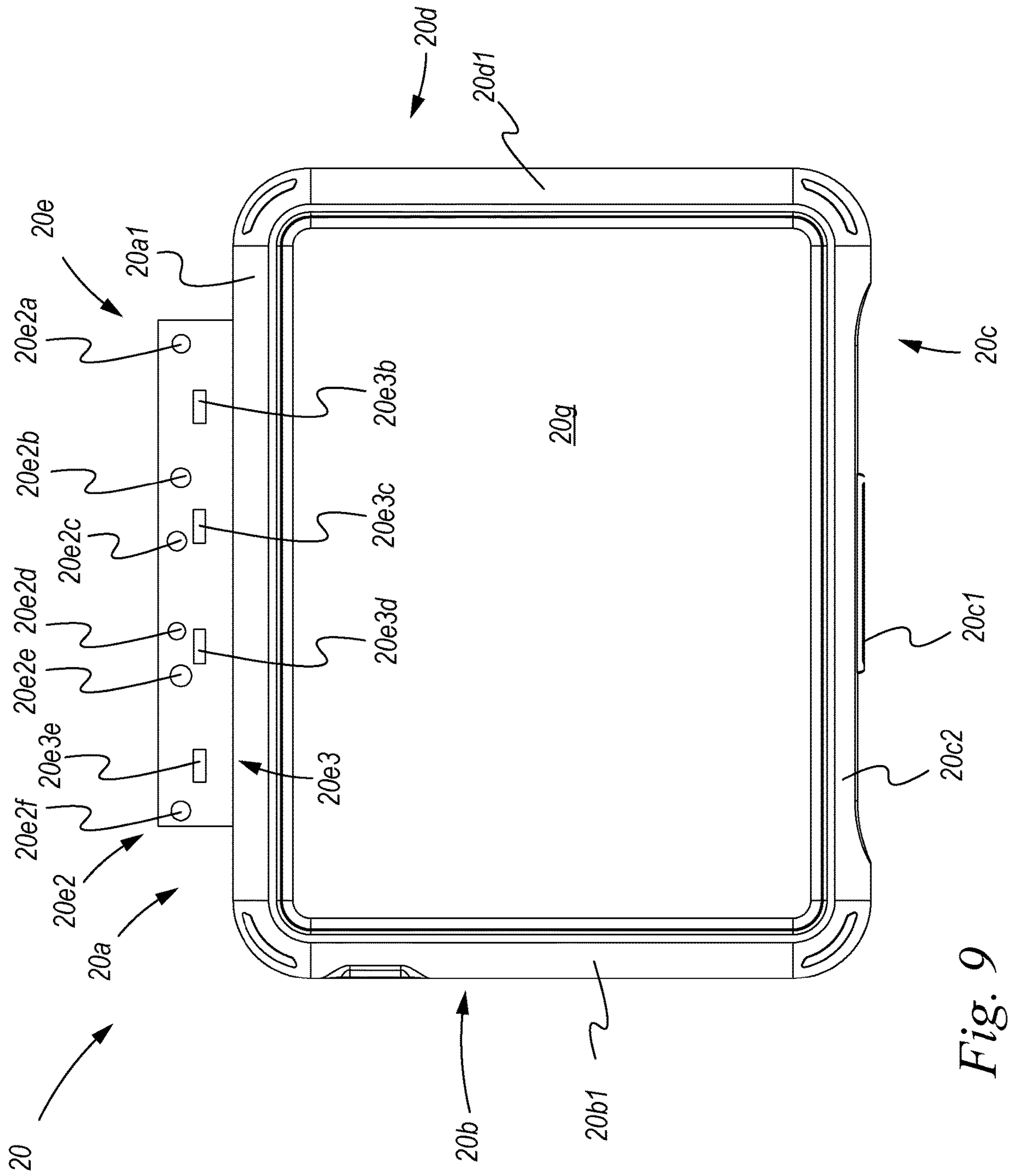
FIG. 9 is a back elevational view of the keyboard of FIG. 8.

Turning to FIG. 9, depicted therein is a back elevational view of keyboard assembly 20. Side portions 20*a*, 20*b*, and 20*d* include outer portions 20*a*1, 20*b*1, and 20*d*1, respectively. Side portion 20*c* include latch portion 20*cl* and outer portion 20*c*2. Keyboard assembly 20 includes back portion 20*g*. The geometry of the side wall portions is generally rectangular, with corners that may be slightly rounded for compatibility with the frame's recessed cavity.

Within the central region of back portion 20*g* is a coupling structure 20*e*, which includes a recessed inner surface 20*e*1. This coupling structure 20*e* is surrounded by an array of apertures, including apertures 20*e*2*a*-20*e*2*f* and 20*e*3*a*-20*e*3*d*, which are positioned to correspond with the standoffs and tabs located in the recessed structure of the frame assembly. The apertures are of varying size and placement, suggesting distinct functions such as threaded fastener engagement and press-fit alignment.

The array layout of apertures ensures that the keyboard can be securely positioned and retained within the frame, with each aperture engaging with a corresponding mechanical feature. The configuration supports multiple points of contact to minimize wobble, tilt, or lateral shifting once installed. The combination of recessed surface 20*e*1 and its surrounding apertures defines a multi-level mounting surface that accommodates variations in component height or fastener head profile.

Also visible in this view is a latch portion 20*cl* located along the edge of side portion 20*c*1. This latch may interact with a corresponding structure in the frame to provide an audible or tactile engagement when the keyboard is inserted. The latch can serve as a secondary retention mechanism to supplement the engagement of screws or press-fit tabs, particularly during transport or mobile use.

Overall, the rear configuration of keyboard assembly 20 is purposefully structured to mate with the internal features of the frame, supporting a repeatable, stable, and secure coupling within a modular system architecture.

Figure 10:
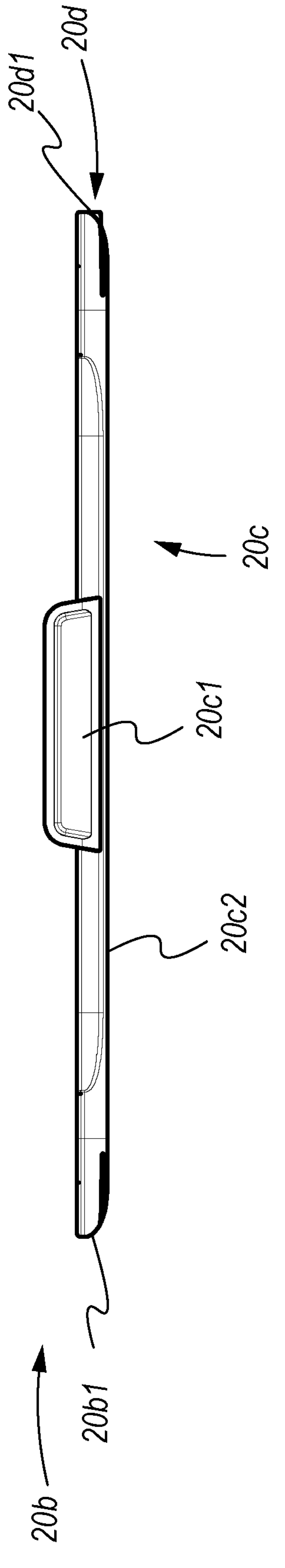
FIG. 10 is a left side elevational view of the keyboard of FIG. 8.

Turning to FIG. 10, depicted therein is a left side elevational view of keyboard assembly 20. The view shows side wall portion 20*a*, which extends vertically between front portion 20*f* and rear portion 20*g*, defining the lateral boundary of the keyboard housing along one longitudinal edge. The side wall portion 20*a* is generally planar, with a slight taper or curvature that may aid in alignment with the corresponding inner wall or flange portion of the frame assembly.

This side view reveals the overall thickness of the keyboard assembly and illustrates the shallow depth of the housing, which allows the keyboard to fit within the recessed structure of the frame without protruding above the outer face of the frame. The consistent height between front and rear edges suggests that the keyboard housing is intended to rest flush against the base portion of the frame, while also presenting an upper input surface that remains unobstructed by surrounding trim or enclosure elements.

A subtle transition near the bottom edge of side wall portion 20*a* may indicate a flat zone or step feature designed to accommodate a standoff or boss from the frame assembly. This contour helps maintain clearance and mechanical engagement between the underside of the keyboard and the standoff surfaces in the frame's recessed cavity.

Though not visible in this view, alignment features or tab-receiving notches may be present along the inner face of side wall portion 20*a*, further facilitating proper lateral positioning within the frame. The height and geometry of this side wall portion contribute to the structural rigidity of the keyboard housing while also enabling it to slide or drop into the frame along defined guide surfaces.

This figure emphasizes the compact profile of the keyboard and its compatibility with the layered architecture of the overall system, which includes the frame, trim, and tablet components.

Figure 11:
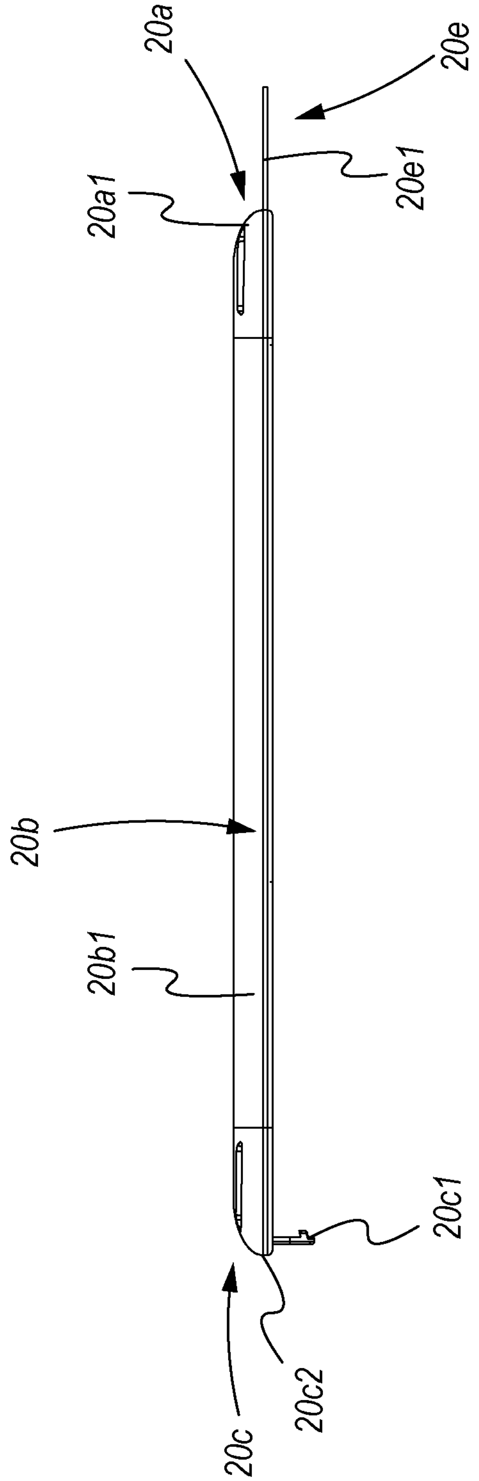
FIG. 11 is a top plan view of the keyboard of FIG. 8.

Turning to FIG. 11, depicted therein is a top plan view of keyboard assembly 20. The aperture layout shown along the top surface corresponds to the positional arrangement of tabs and standoffs located within the recessed structure of the frame assembly. These apertures, part of the keyboard's coupling structure, are spaced and dimensioned to receive mechanical fasteners or alignment projections. The rectangular configuration and symmetry of the apertures facilitate guided placement of the keyboard within the frame and enhance the overall structural integration between the components. The plan view also highlights the lateral dimensions of the keyboard and its alignment relative to the recessed structure to which it mates.

Figure 12:
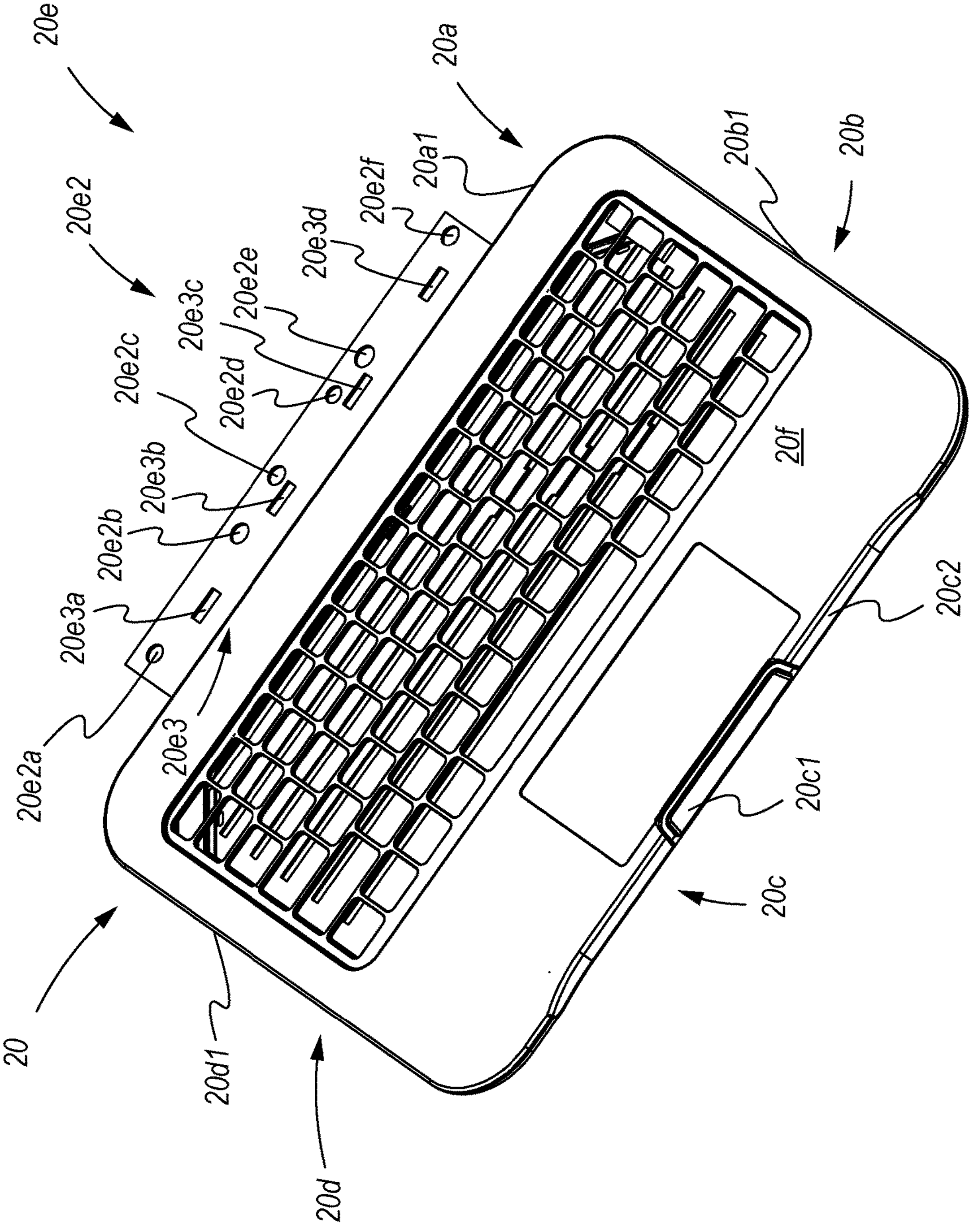
FIG. 12 is a first front perspective view of the keyboard of FIG. 8.

Turning to FIG. 12, depicted therein is a first front perspective view of keyboard assembly 20, highlighting the relationship between the keypad, side walls, and trackpad area. The keypad 20*f*1 spans a substantial portion of the upper front surface, while trackpad 20*f*2 is centrally located near the bottom edge of front portion 20*f*. The perspective reveals the height of the side walls relative to the input surface and shows how the front surface is slightly recessed to accommodate the trim assembly without contacting the input devices. This recessed design helps protect the keypad and trackpad from accidental contact or debris when enclosed. The alignment of side wall surfaces is also visible, indicating that the keyboard is shaped for close interfacing with adjacent interior surfaces of the frame assembly.

Figure 13:
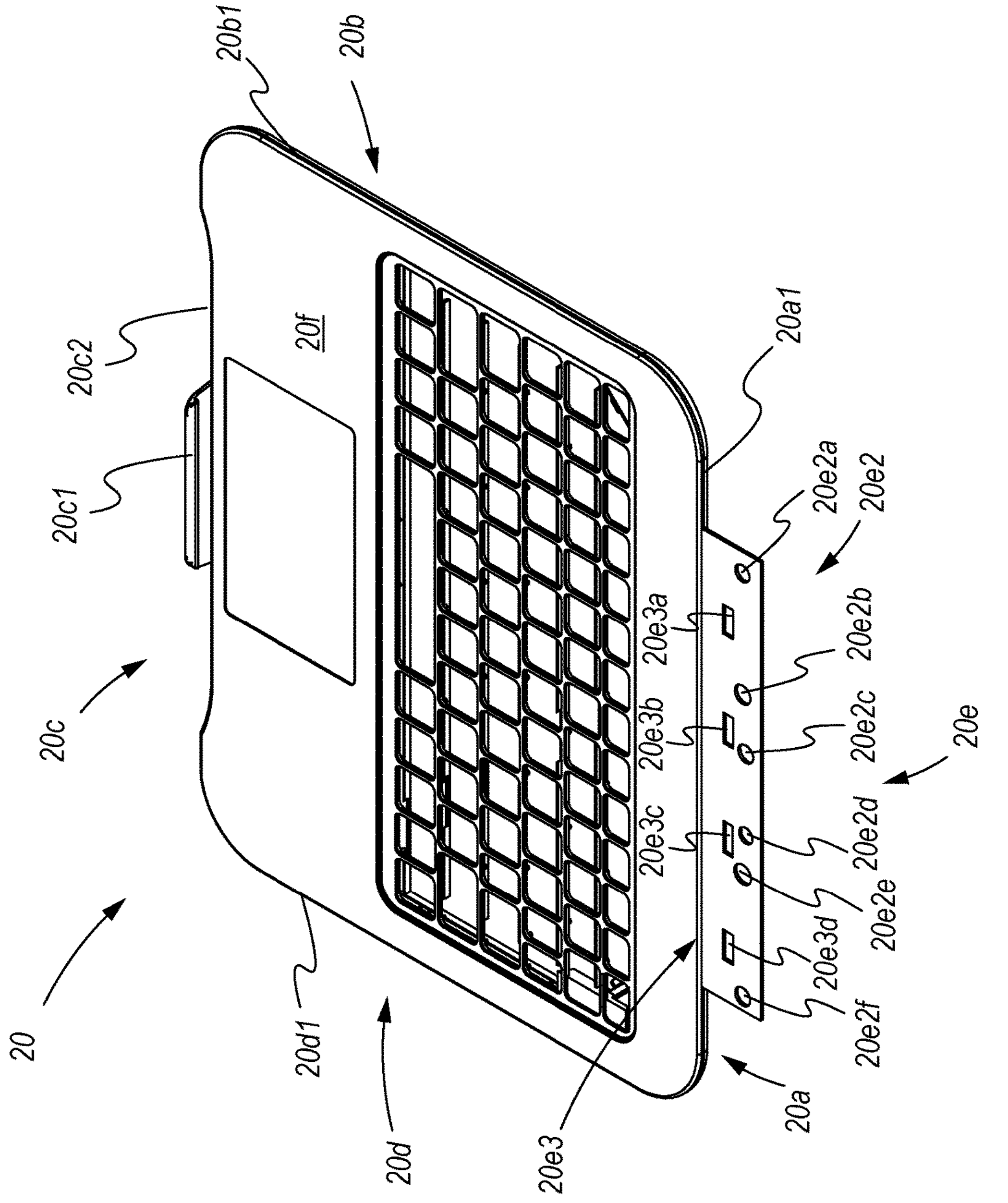
FIG. 13 is a second front perspective view of the keyboard of FIG. 8.

Turning to FIG. 13, depicted therein is a second front perspective view of keyboard assembly 20, offering an alternate viewing angle that reveals additional alignment features and surface transitions. Visible along the top and side portions are several alignment notches and bosses-such as 20*e*2*a*-20*e*2*f* and 20*e*3*a*-20*e*3*d*—that are dimensioned to receive frame-mounted tabs and standoffs. These structural features help position the keyboard securely within the recessed structure of the frame assembly. The depth and contour of the keypad 20*f*1 and trackpad 20*f*2 are also observable from this view, providing further insight into how the trim assembly might overlap or surround these input areas without interfering with user interaction. The overall geometry of keyboard assembly 20 remains generally planar with slight curvature or relief at its edges for ease of insertion and removal.

Figure 14:
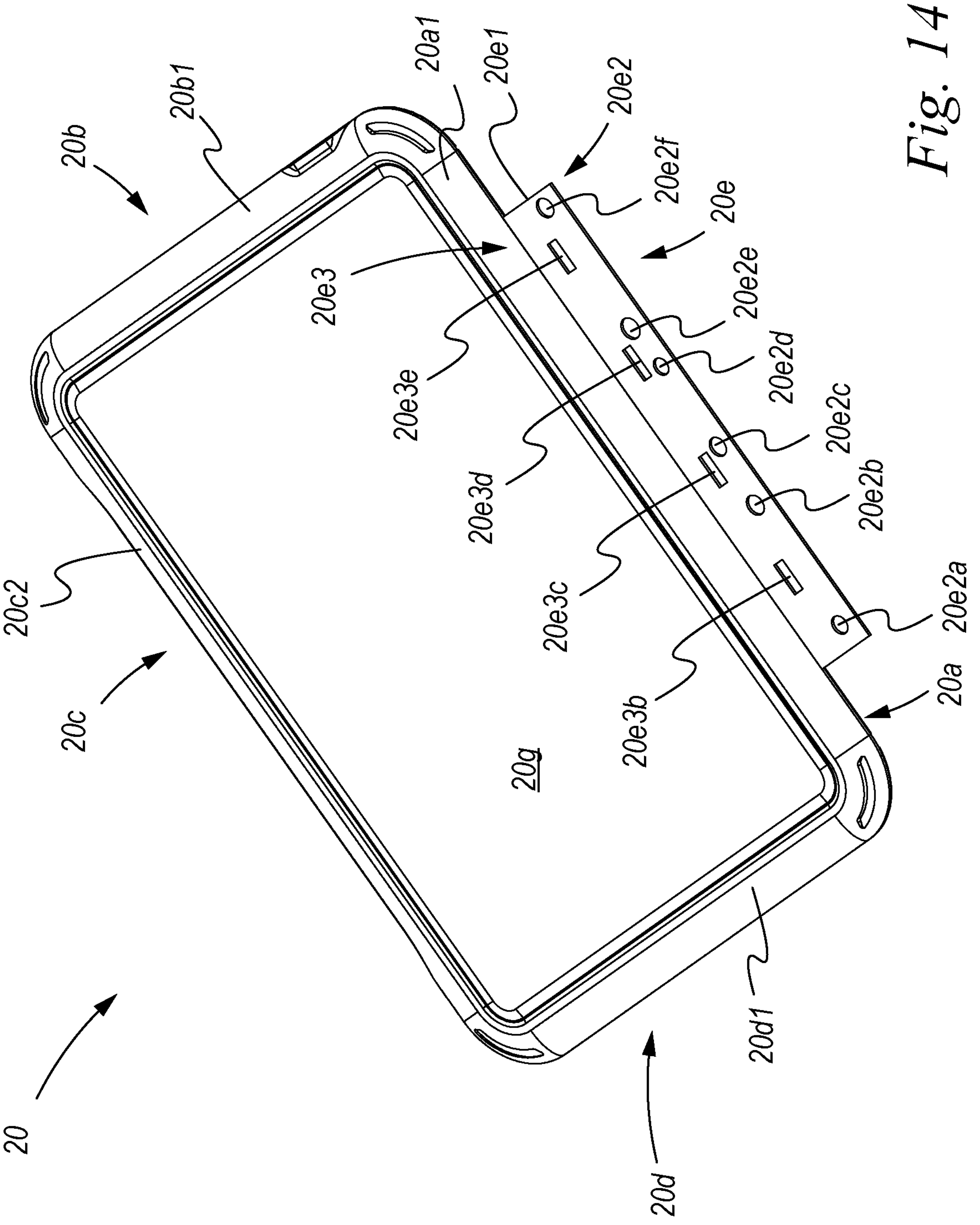
FIG. 14 is a first back perspective view of the keyboard of FIG. 8.

Turning to FIG. 14, depicted therein is a first back perspective view of keyboard assembly 20, showing coupling structures and rear alignment geometry in greater detail. The coupling structure 20*e* is clearly visible, including the inner surface 20*e*1 and aperture pluralities 20*e*2 and 20*e*3. These apertures-comprising members such as 20*e*2*a*-20*e*2*f* and 20*e*3*a*-20*e*3*d*—are spaced and shaped to correspond with standoffs and tabs on the frame assembly. The apertures may accommodate fasteners or enable snap-fit engagement, depending on the final configuration. This perspective also highlights the planar geometry of back portion 20*g* and its interface with adjacent side portions, ensuring a flush seating against the frame's recessed structure. Slight structural reliefs or channeling near the corners may assist with cable routing or mechanical retention when assembled.

Figure 15:
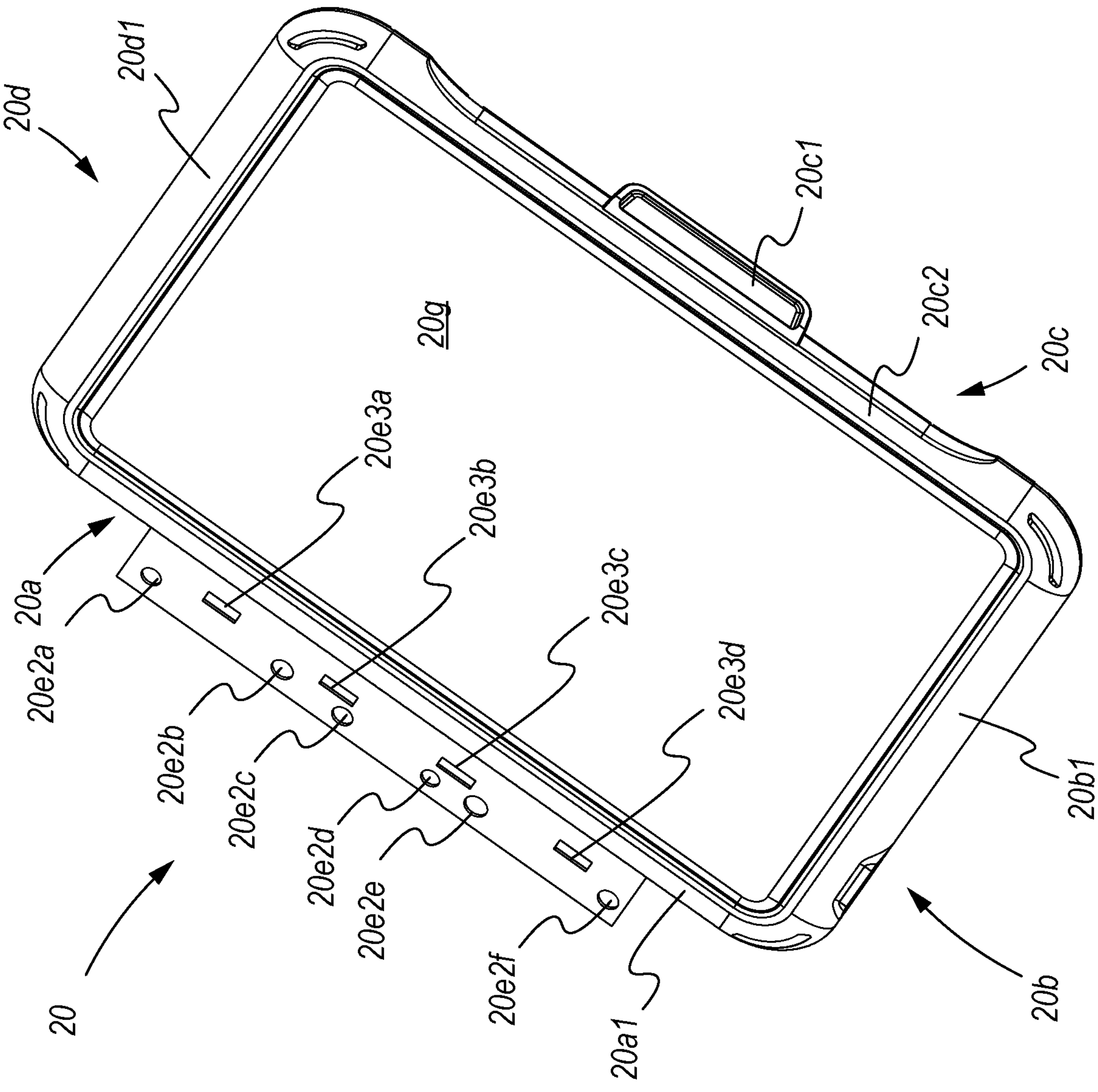
FIG. 15 is a second back perspective view of the keyboard of FIG. 8.

Turning to FIG. 15, depicted therein is a second back perspective view of keyboard assembly 20. From this angle, the back portion 20*g* is again visible, along with extended views of the coupling structure 20*e* and its associated apertures. The spatial relationship among aperture groups 20*e*2 and 20*e*3 is more apparent, showing their offset placement and depth to accommodate varied fastening or alignment features. This view further illustrates the smooth outer contours and minimal protrusions of the keyboard's rear surface, contributing to a flush fit within the recessed structure of the frame when coupled. Slight contouring or stepped transitions may assist in guiding the keyboard during insertion and ensure stability during use or transport.

Figure 16:
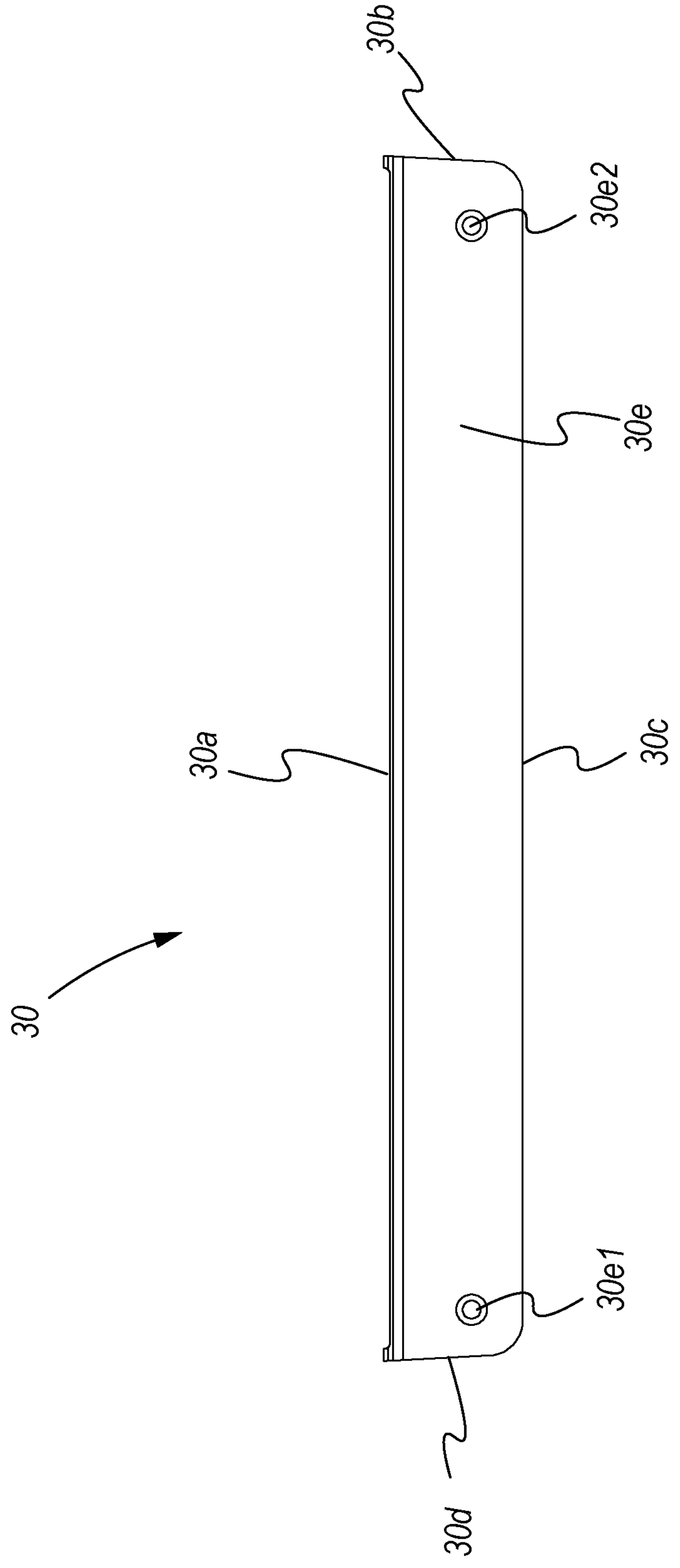
FIG. 16 is a front elevational view of a trim member.

Turning to FIG. 16, depicted therein is a front elevational view of trim assembly 30, including side portions 30*a*, 30*b*, 30*c*, and 30*d*, and outer surface 30*e*. The trim assembly presents a continuous and seamless front face with no visible openings, suggesting a protective or aesthetic cover. Outer surface 30*e* include rearward-projecting boss members 30*e*1 and 30*e*2 are spaced apart and positioned to align with mating holes in either the keyboard assembly or the frame assembly. These boss members are generally rectangular or oblong and may serve to align or retain the trim in a predetermined position. The front surface 30*e* exhibits gentle curvature or sculpting to match the surrounding enclosure profile, contributing to the system's finished appearance when assembled.

Figure 17:
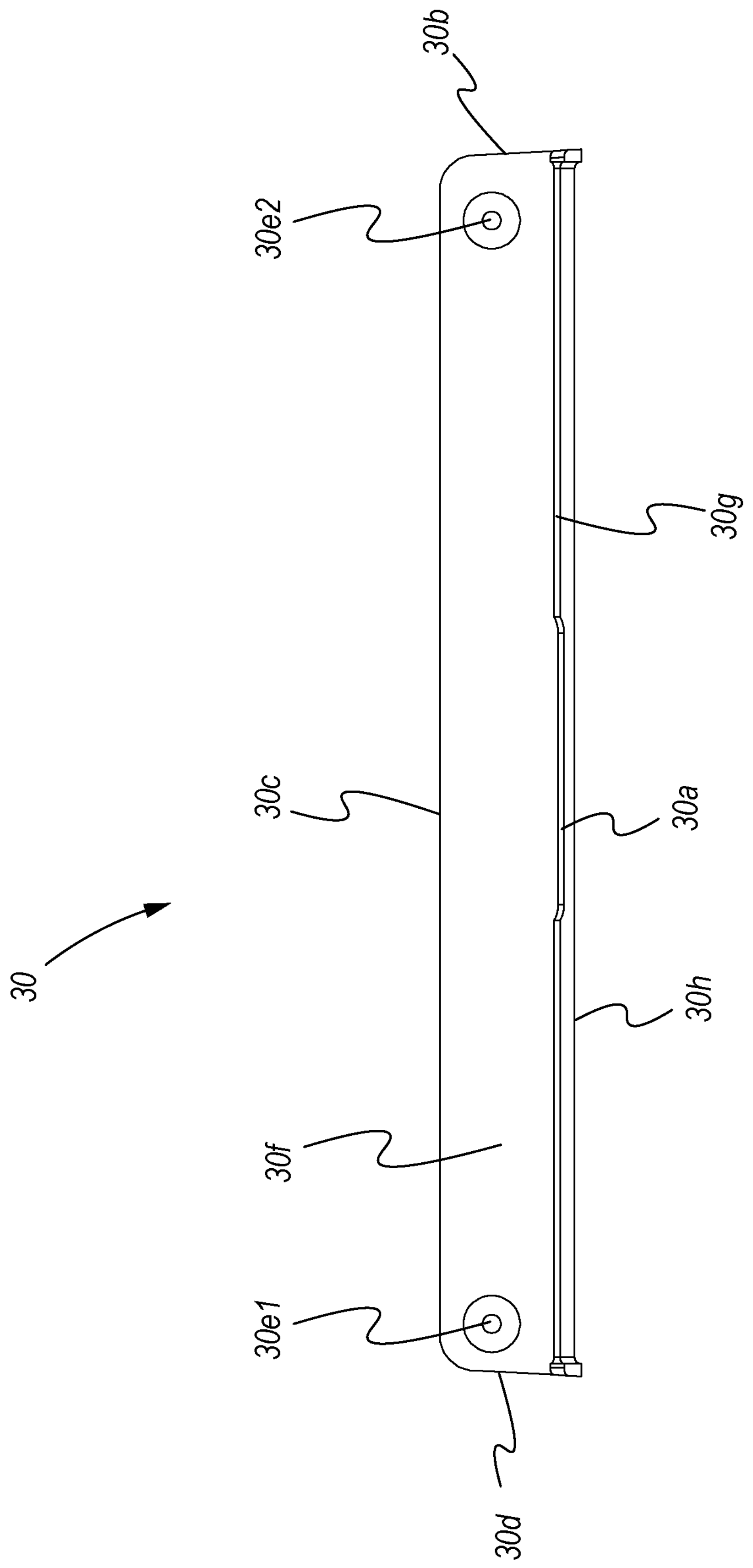
FIG. 17 is a back elevational view of the trim member of FIG. 16.

Turning to FIG. 17, depicted therein is a back elevational view of trim assembly 30, showing inner surfaces 30*f* and 30*g* and outer surface 30*h*. These surfaces define a peripheral contact region and a raised central rib or guide wall that may assist in positioning or stabilizing the trim when coupled to the frame or keyboard assembly. Rear-facing boss members 30*e*1 and 30*e*2 are shown protruding from the inner surface. These bosses appear rigid and integrally molded, dimensioned and spaced to insert into corresponding receiving holes in an underlying assembly. The layout of inner surfaces 30*f* and 30*g* further suggests that the trim can securely overlay internal components while minimizing lateral shifting.

Figure 18:
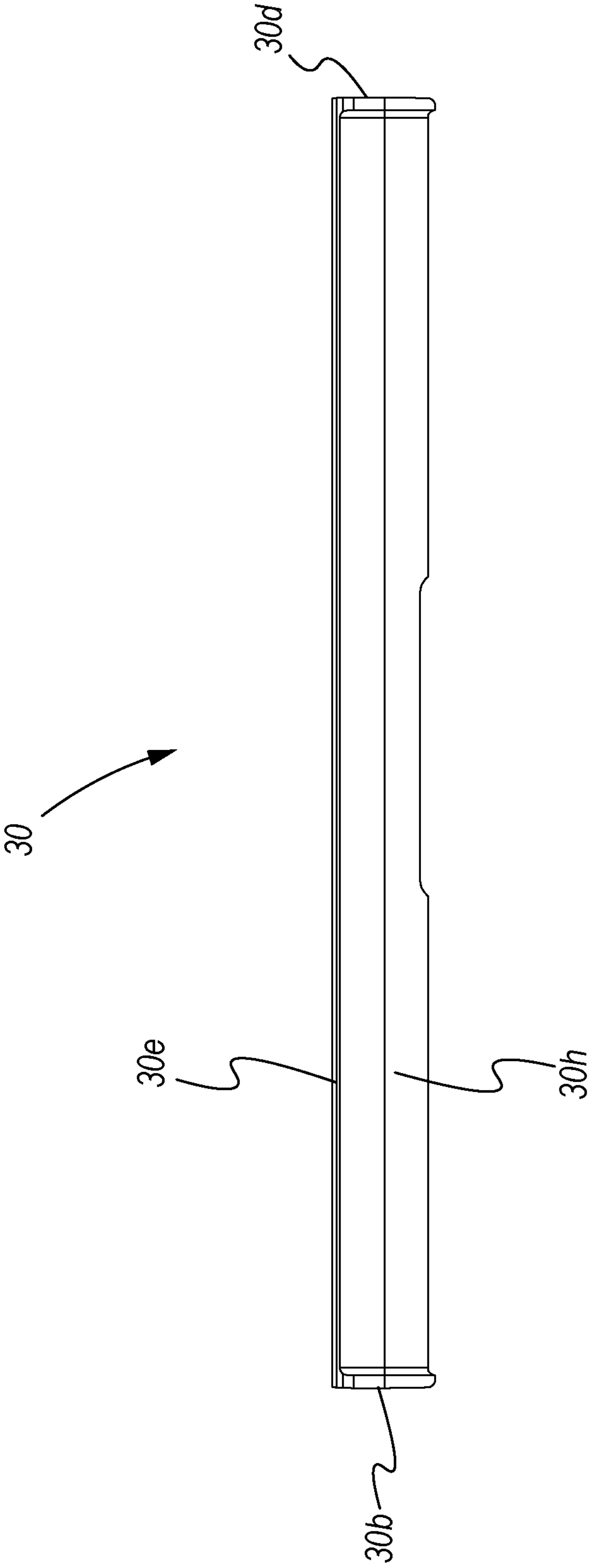
FIG. 18 is a left side elevational view of the trim member of FIG. 16.

Turning to FIG. 18, depicted therein is a left side elevational view of trim assembly 30. The profile reveals the thickness and contour of side portion 30*a*, which tapers slightly toward outer surface 30*e*. The geometry of the trim along this side view suggests it is designed to follow the outer contour of the keyboard and frame assemblies, allowing the trim to rest flush along adjacent surfaces. The projection of boss member 30*e*1 is partially visible, confirming its rearward extension for insertion into corresponding apertures in the keyboard or frame. The overall side wall structure appears rigid and continuous, indicating a unibody trim component suitable for structural overlay and edge protection.

Figure 19:
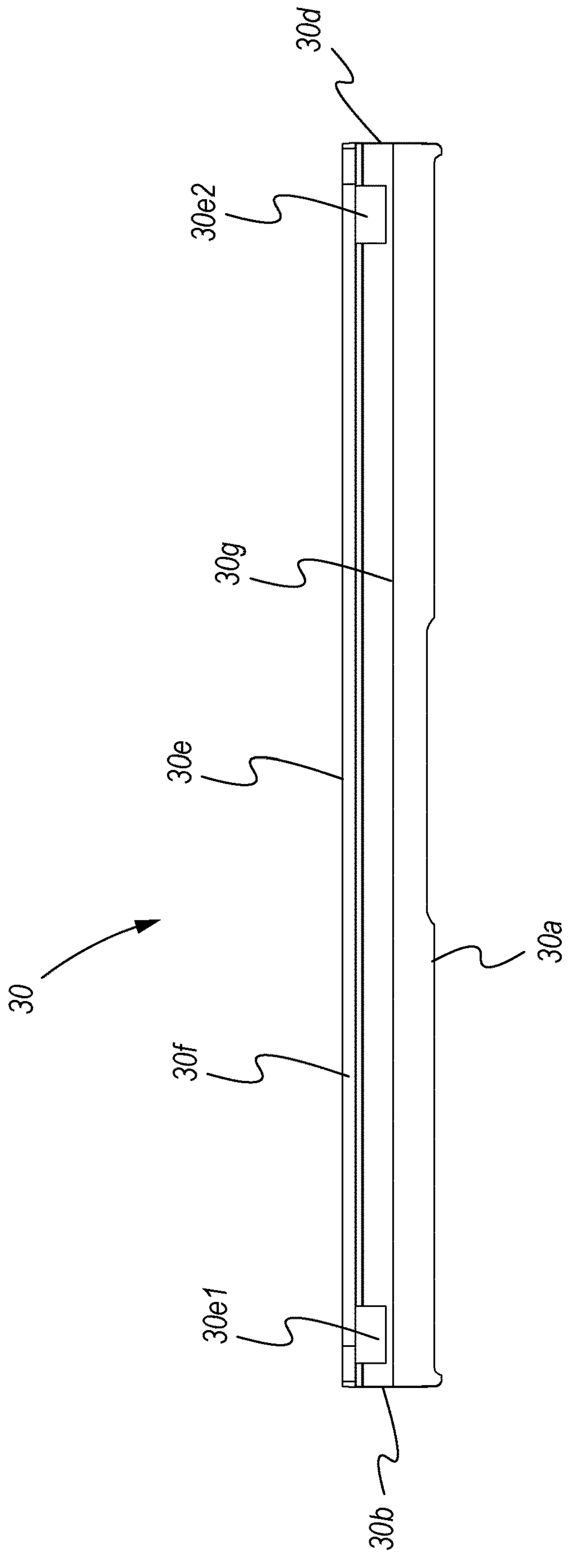
FIG. 19 is a right side elevational view of the trim member of FIG. 16.

Turning to FIG. 19, depicted therein is a right side elevational view of trim assembly 30. The view shows side portion 30*c* and provides a mirror-image profile to that of side portion 30*a* in FIG. 18. The outer contour of the trim again tapers toward outer surface 30*e*, ensuring symmetry when installed over the keyboard and frame assemblies. This side view also confirms the presence of a structural wall of uniform thickness and curvature, with no visible apertures or openings. The smooth outer edge and consistent wall profile suggest that the trim assembly is designed to slide or press-fit into place without the need for complex alignment, contributing to overall ease of assembly and a finished exterior appearance.

Figure 20:
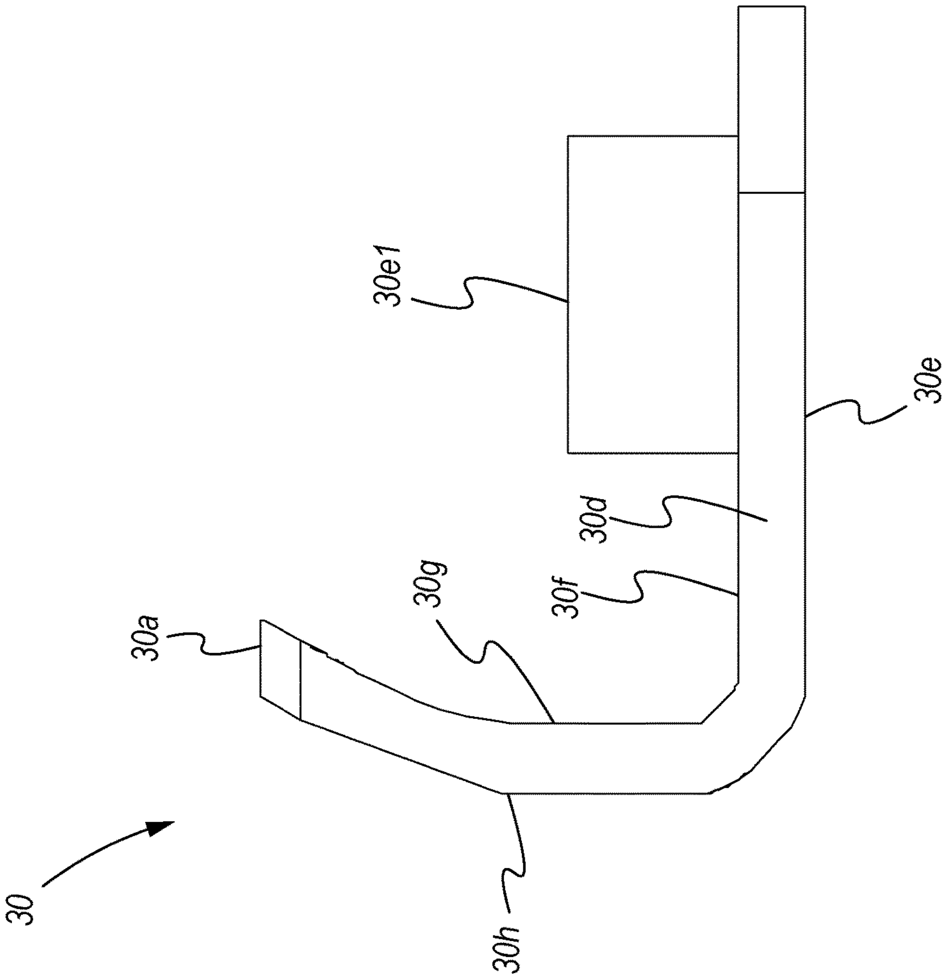
FIG. 20 is a top plan view of the trim member of FIG. 16.

Turning to FIG. 20, depicted therein is a top plan view of trim assembly 30. From this viewpoint, the full rectangular outline of the trim can be appreciated, including side portions 30*a*-30*d* defining the outer periphery. Outer surface 30*e* spans the central region and exhibits a smooth, slightly contoured profile, indicating ergonomic considerations for hand contact or visual finish. The spacing and orientation of boss members 30*e*1 and 30*e*2 are also visible through faint outlines or inferred positioning from surrounding contours. These boss members are aligned to mate with corresponding features on the underlying keyboard or frame assembly. The top plan view further reveals that the trim edges are slightly radiused, minimizing sharp corners and enhancing mechanical compatibility with surrounding components.

Figure 21:
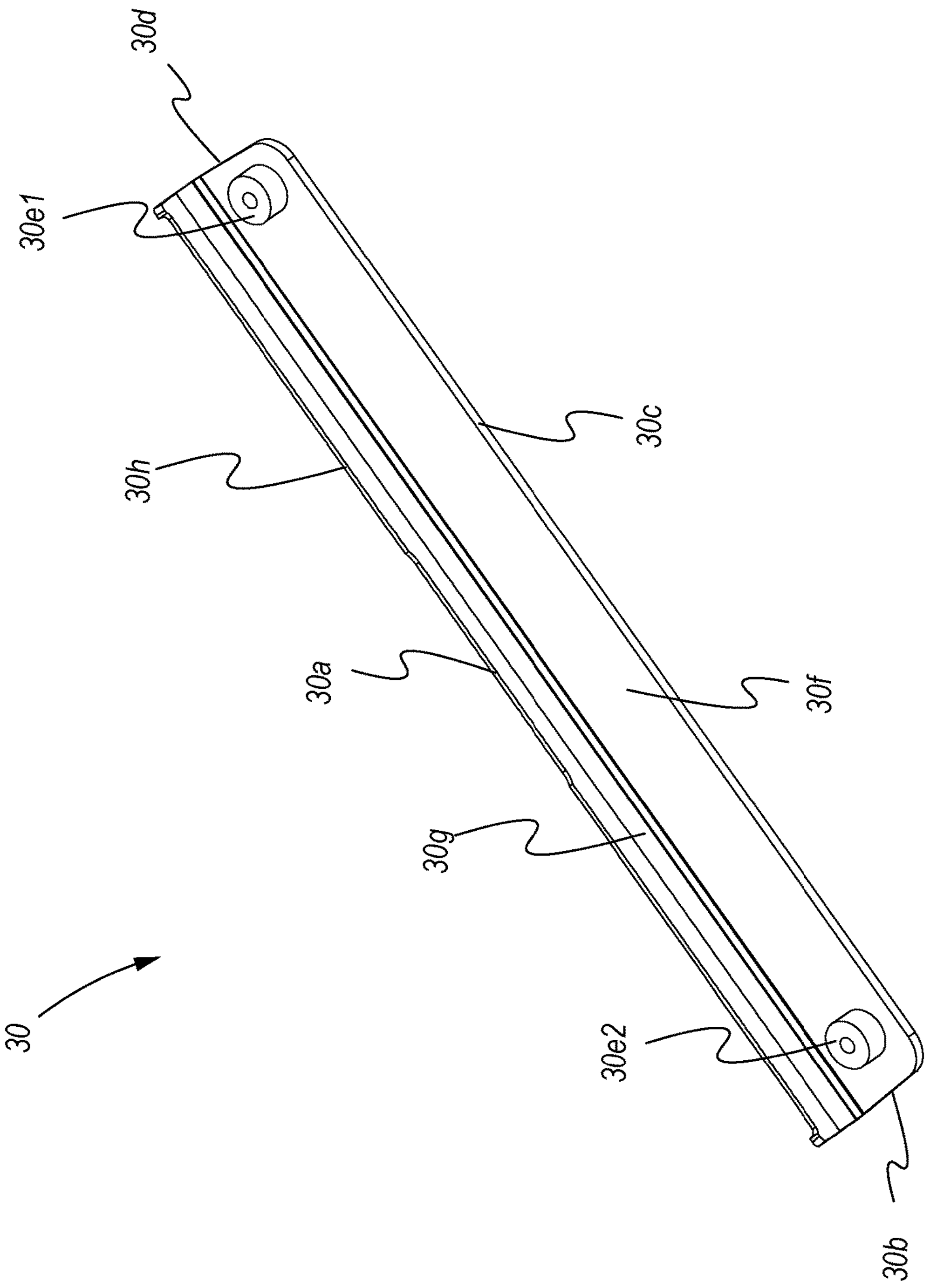
FIG. 21 is a first front perspective view of the trim member of FIG. 16.

Turning to FIG. 21, depicted therein is a first front perspective view of trim assembly 30. This angled view highlights the overall shape and curvature of outer surface 30*e*, along with the relative orientation of side portions 30*a*, 30*b*, 30*c*, and 30*d*. The trim appears as a thin, continuous frame designed to overlay and partially encase a keyboard or device front. Boss members 30*e*1 and 30*e*2 are faintly discernible projecting rearward from the inner surface, spaced for alignment with underlying engagement features. The perspective also emphasizes the trim's contouring and uniform thickness, suggesting it may provide both cosmetic coverage and protective reinforcement while maintaining low-profile aesthetics.

Figure 22:
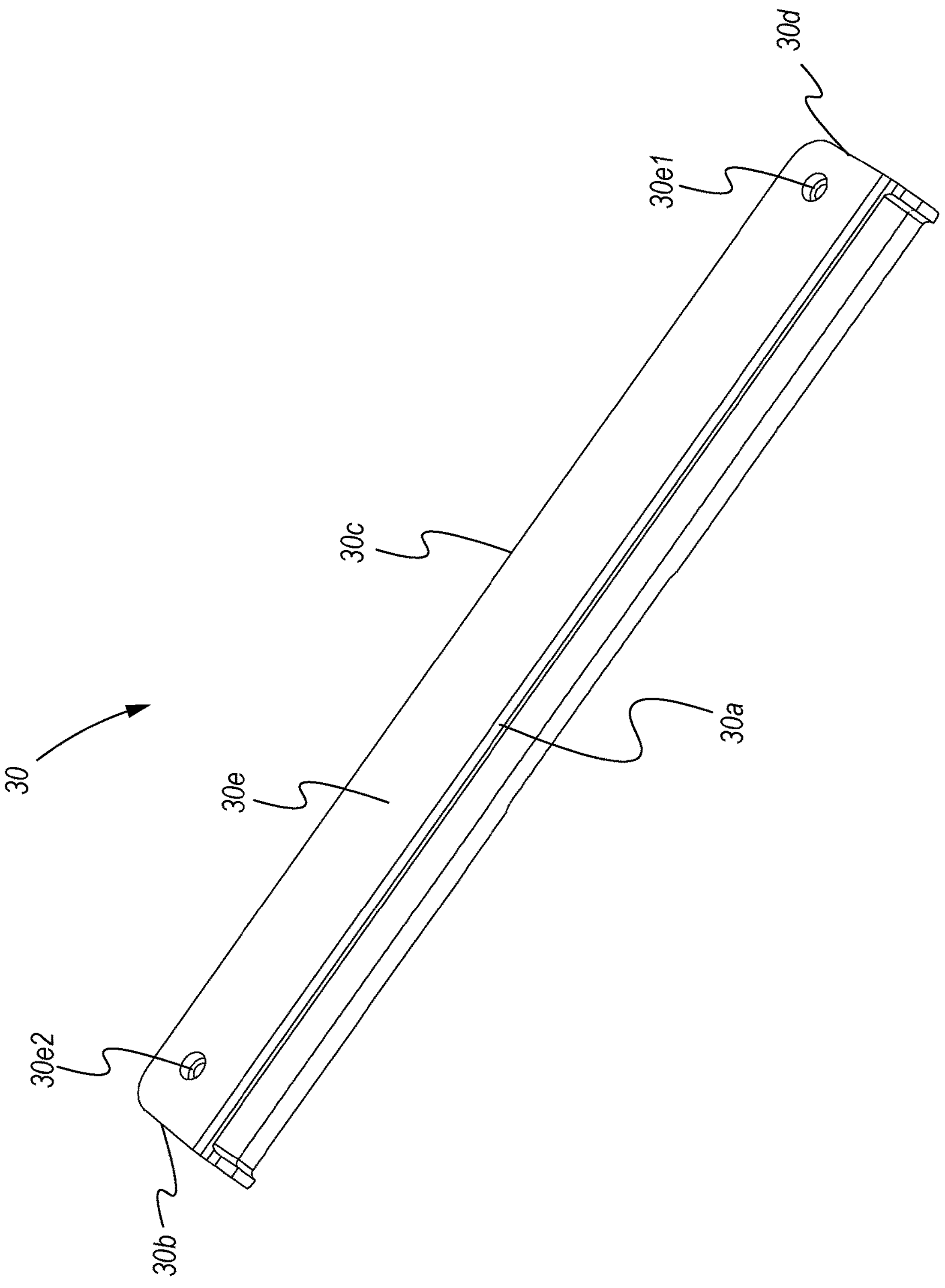
FIG. 22 is a second front perspective view of the trim member of FIG. 16.

Turning to FIG. 22, depicted therein is a second front perspective view of trim assembly 30, showing an alternate angle that emphasizes the curvature and front-facing profile of outer surface 30*e*. The slight bevel or edge taper along the inner perimeter suggests the trim is shaped to frame a keypad and trackpad region without interfering with user input. The corners of the trim show consistent radius transitions, and the view offers additional clarity into the relative spacing of side portions 30*a*-30*d*. The trim's minimalistic surface design reinforces its intended function as a seamless overlay that does not obstruct input components or visual alignment features.

Figure 23:
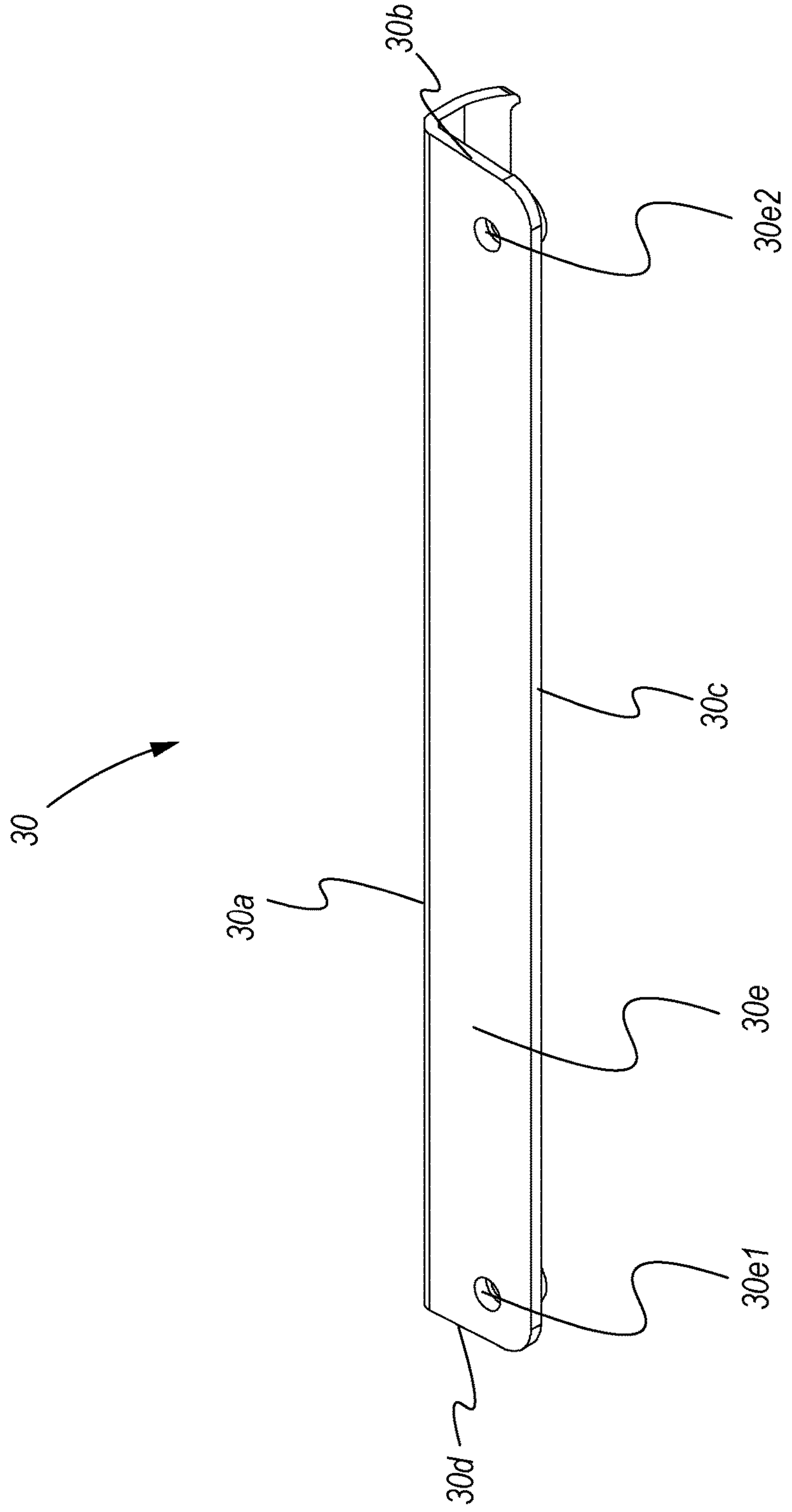
FIG. 23 is a first back perspective view of the trim member of FIG. 16.

Turning to FIG. 23, depicted therein is a first back perspective view of trim assembly 30. This view reveals the spatial positioning of rear-facing boss members 30*e*1 and 30*e*2, which protrude from inner surface 30*f* and are positioned near opposing side portions of the trim. These boss members are rectangular or oblong in shape and are likely intended to interface with mating features on the keyboard or frame assembly. The inner perimeter defined by surface 30*g* appears slightly raised, forming a guide or contact wall for alignment against an underlying surface. The overall geometry of the trim indicates that it is designed to be rigid and flush-mounted, forming a topmost layer when the system is assembled.

Figure 24:
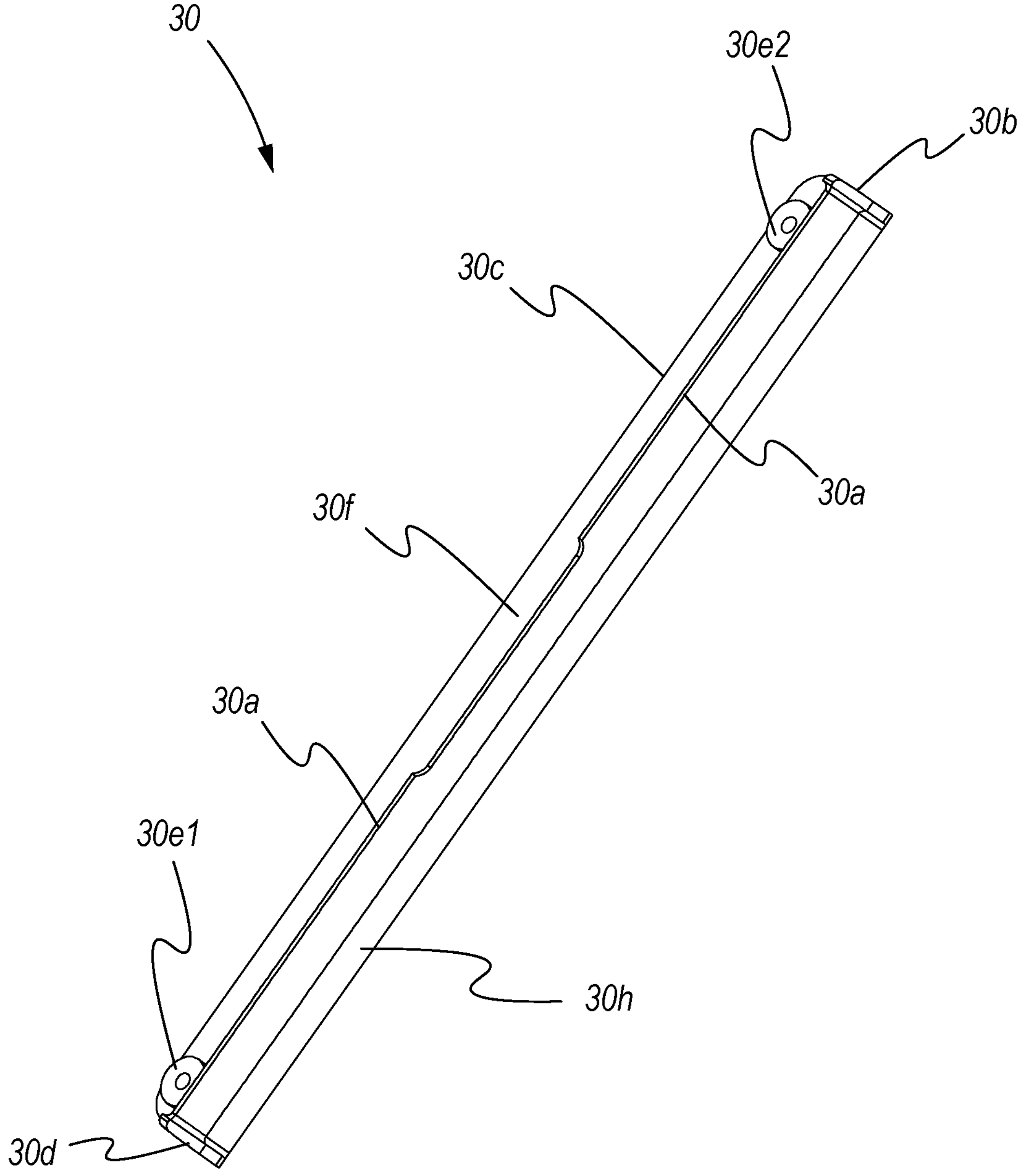
FIG. 24 is a second back perspective view of the trim member of FIG. 16.

Turning to FIG. 24, depicted therein is a second back perspective view of trim assembly 30, shown from an alternate angle to further illustrate the structure and placement of boss members 30*e*1 and 30*e*2. This view provides additional detail regarding the depth and alignment geometry of the bosses relative to the surrounding inner surfaces 30*f* and 30*g*. The peripheral ridge and raised inner profile contribute to secure seating against an underlying assembly, such as a keyboard or frame. The shape and contouring of the rear surface reinforce the trim's structural role in enclosing or protecting upper-facing components when coupled.

Figure 25:
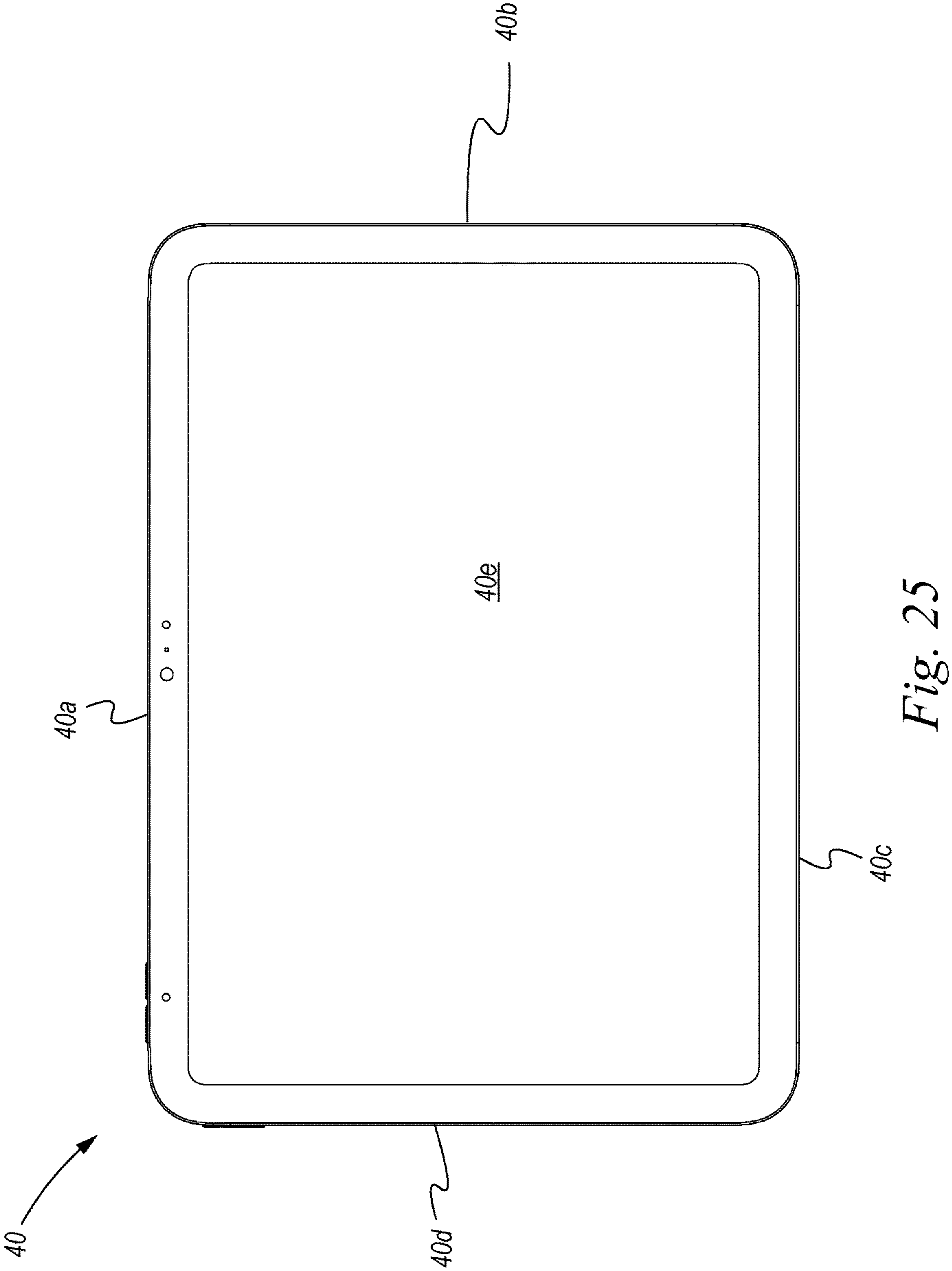
FIG. 25 is a front elevational view of a tablet-shaped electronic device.

Turning to FIG. 25, depicted therein is a front elevational view of portable electronic device 40, including side edges 40*a*, 40*b*, 40*c*, and 40*d*, and a display 40*e*. The display surface 40*e* occupies a substantial portion of the front face, suggesting a touchscreen interface such as a tablet or slate-style computing device. The edges are minimally framed, allowing the device to seat flush or nearly flush within surrounding support structures. The geometry shown is compatible with recessed or fitted retention within an external frame assembly.

Figure 26:
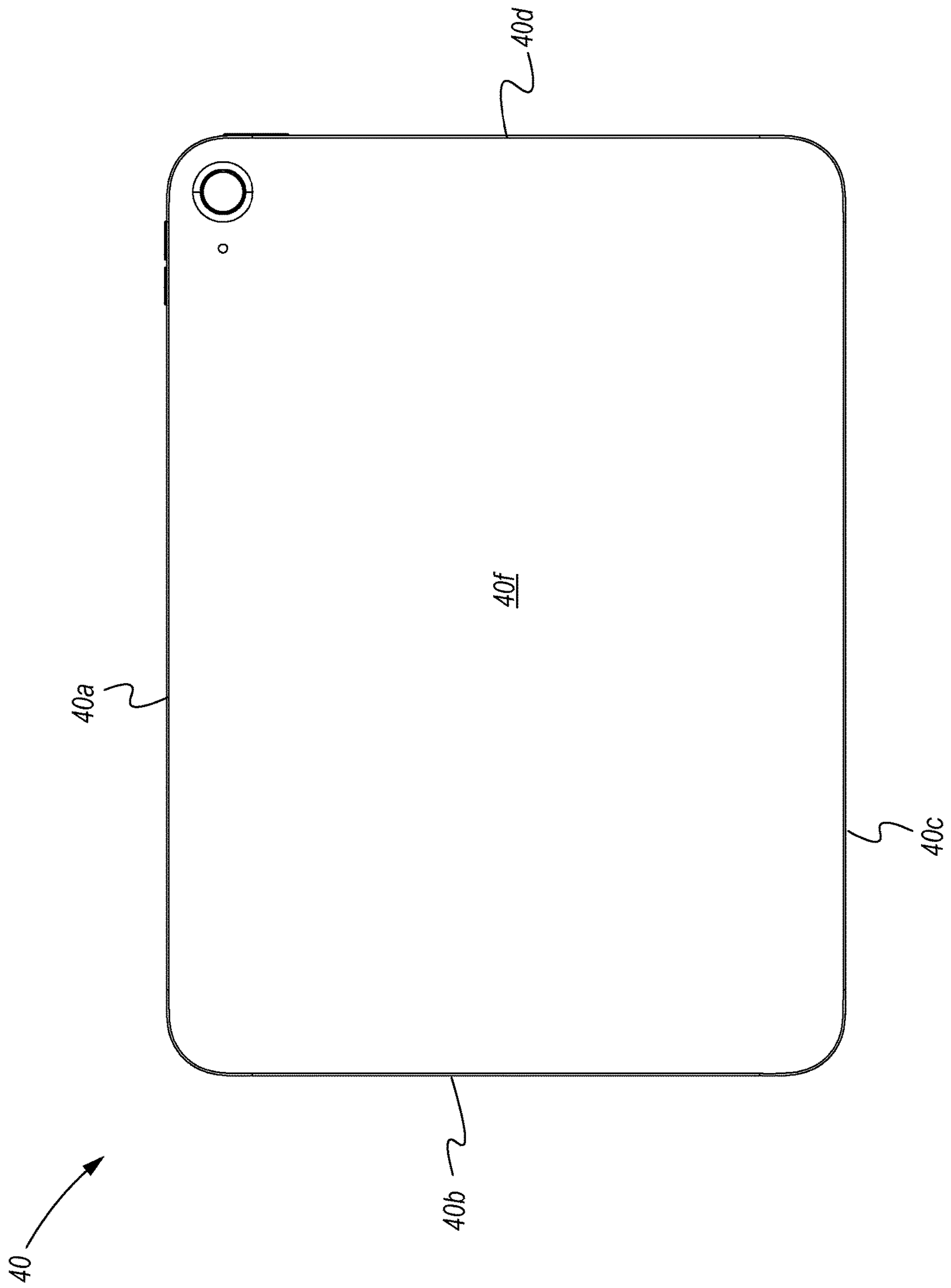
FIG. 26 is a back elevational view of the tablet-shaped electronic device-shaped electronic device of FIG. 25.

Turning to FIG. 26, depicted therein is a back elevational view of portable electronic device 40, showing back 40*f*. The back surface is generally planar and uninterrupted, allowing for close contact with internal frame structures or trim elements. The view illustrates that the device can rest securely against a support surface without interference from protrusions, supporting a flush fit when enclosed within the overall case system.

Figure 27:
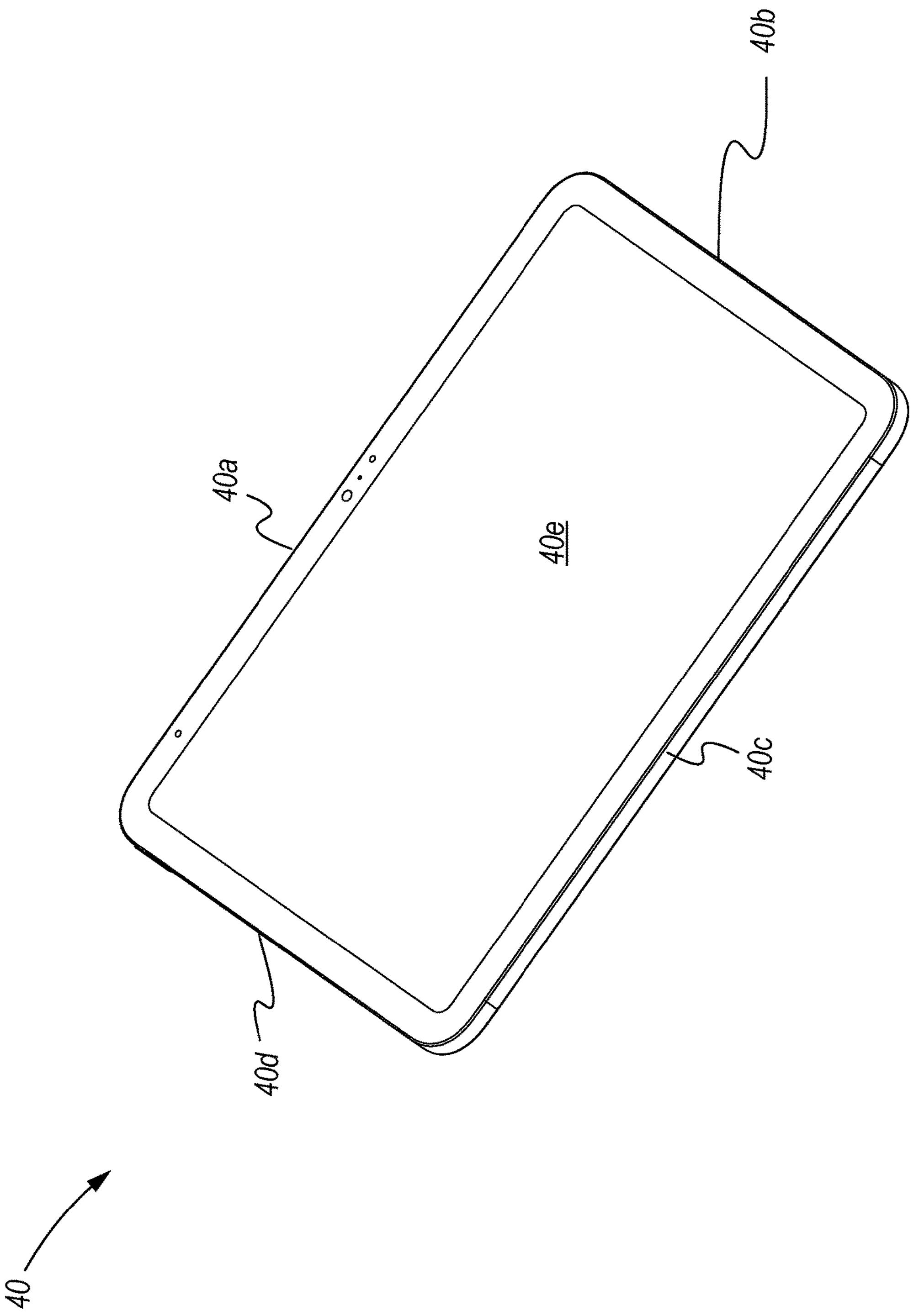
FIG. 27 is a second back perspective view of the tablet-shaped electronic device of FIG. 25.

Turning to FIG. 27, depicted therein is a second back perspective view of portable electronic device 40. This perspective reveals additional contouring along edges 40*a*-40*d*, which may assist with alignment or seating within the frame assembly. The back surface 40*f* remains predominantly flat, suggesting compatibility with adjacent frame or trim components and contributing to a low-profile enclosure when assembled.

Figure 28:
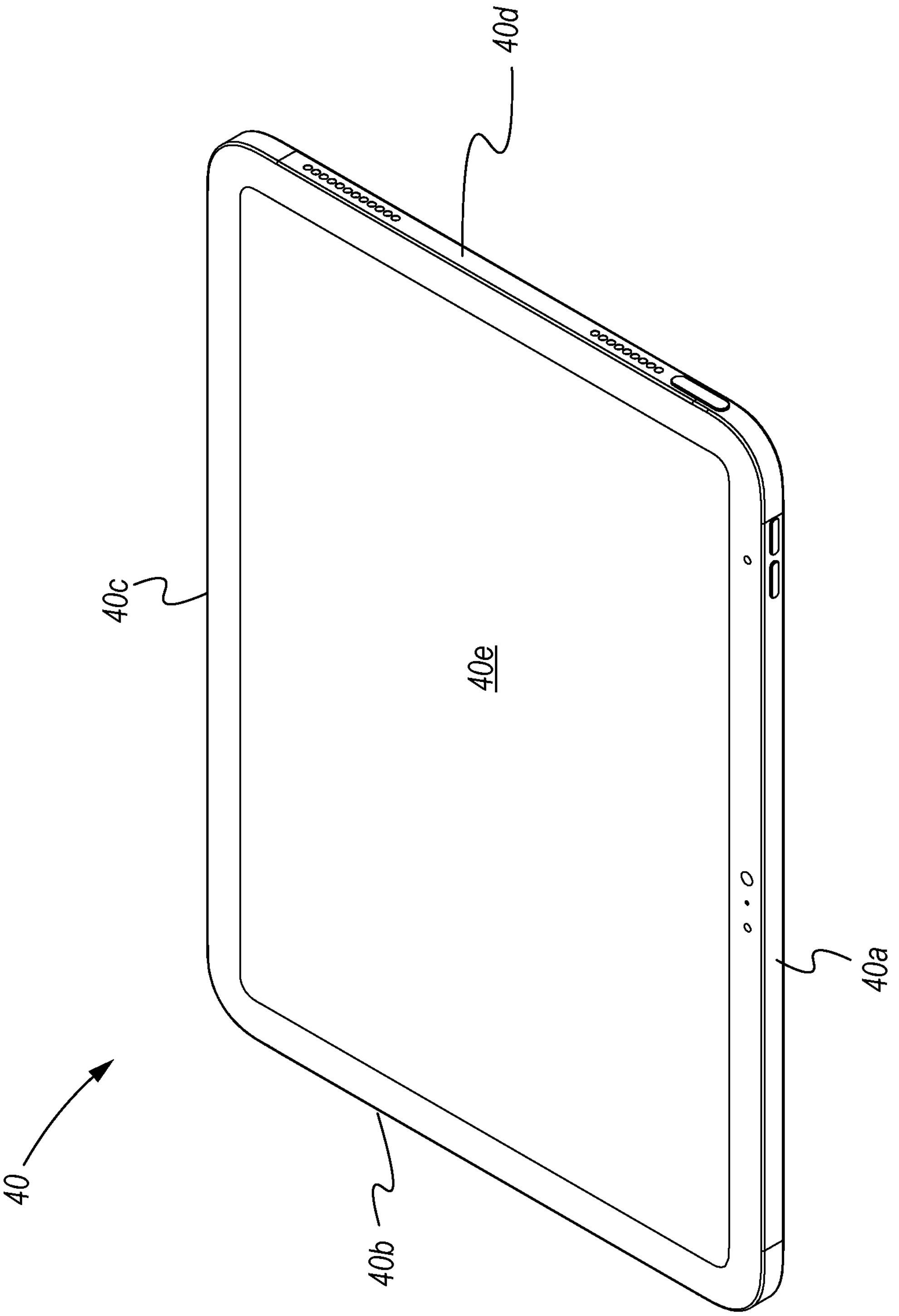
FIG. 28 is a first front perspective view of the tablet-shaped electronic device of FIG. 25.

Turning to FIG. 28, depicted therein is a first front perspective view of portable electronic device 40. The display surface 40*e* dominates the visible face, framed by sides 40*a*-40*d* with minimal bezels. The gently rounded corners and slim edge profile enhance the device's compatibility with a surrounding enclosure, and the configuration supports intuitive access to the screen when in use.

Figure 29:
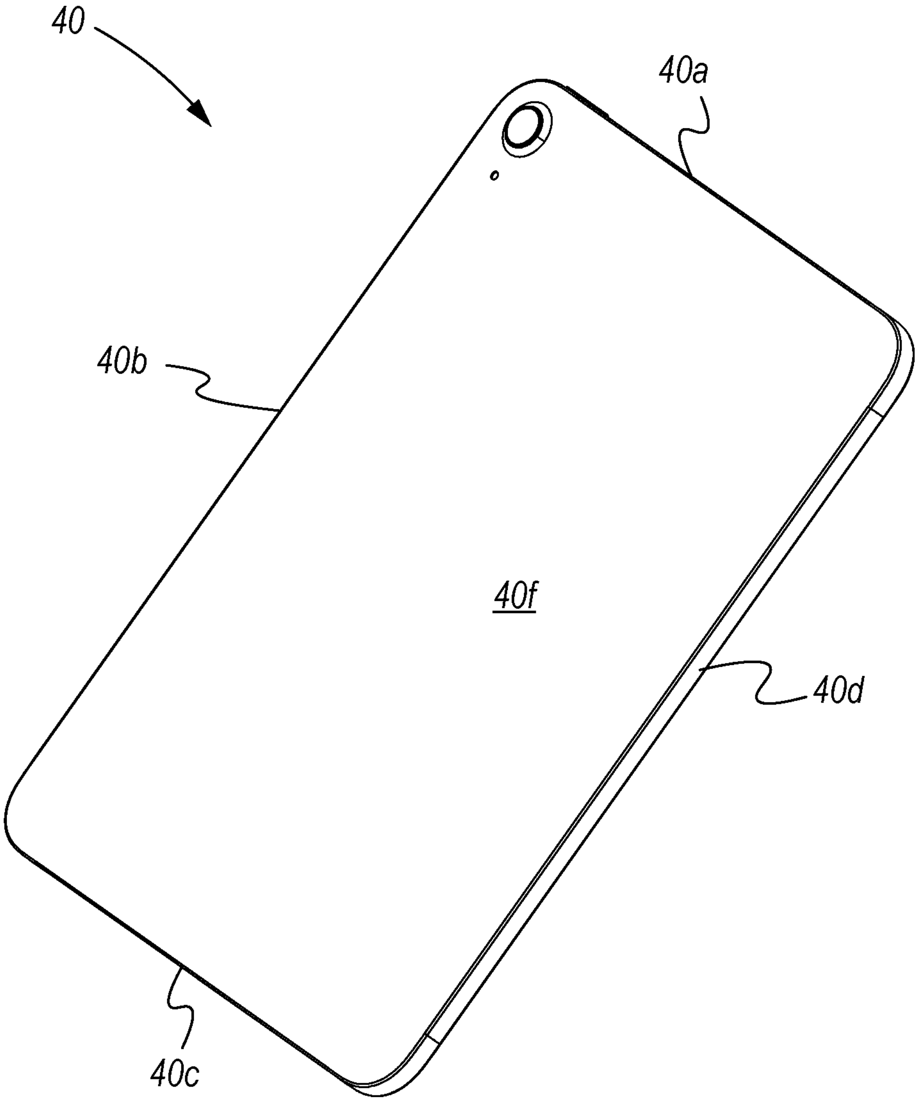
FIG. 29 is a second front perspective view of the tablet-shaped electronic device of FIG. 25.

Turning to FIG. 29, depicted therein is a second front perspective view of portable electronic device 40. This view shows the orientation and curvature of sides 40*a*-40*d* and display surface 40*e*, offering depth and dimensional context. The device appears proportioned to fit within a surrounding structural frame while maintaining accessibility to its front-facing screen. The angular perspective highlights the continuity of the housing and display integration.

Figure 30:
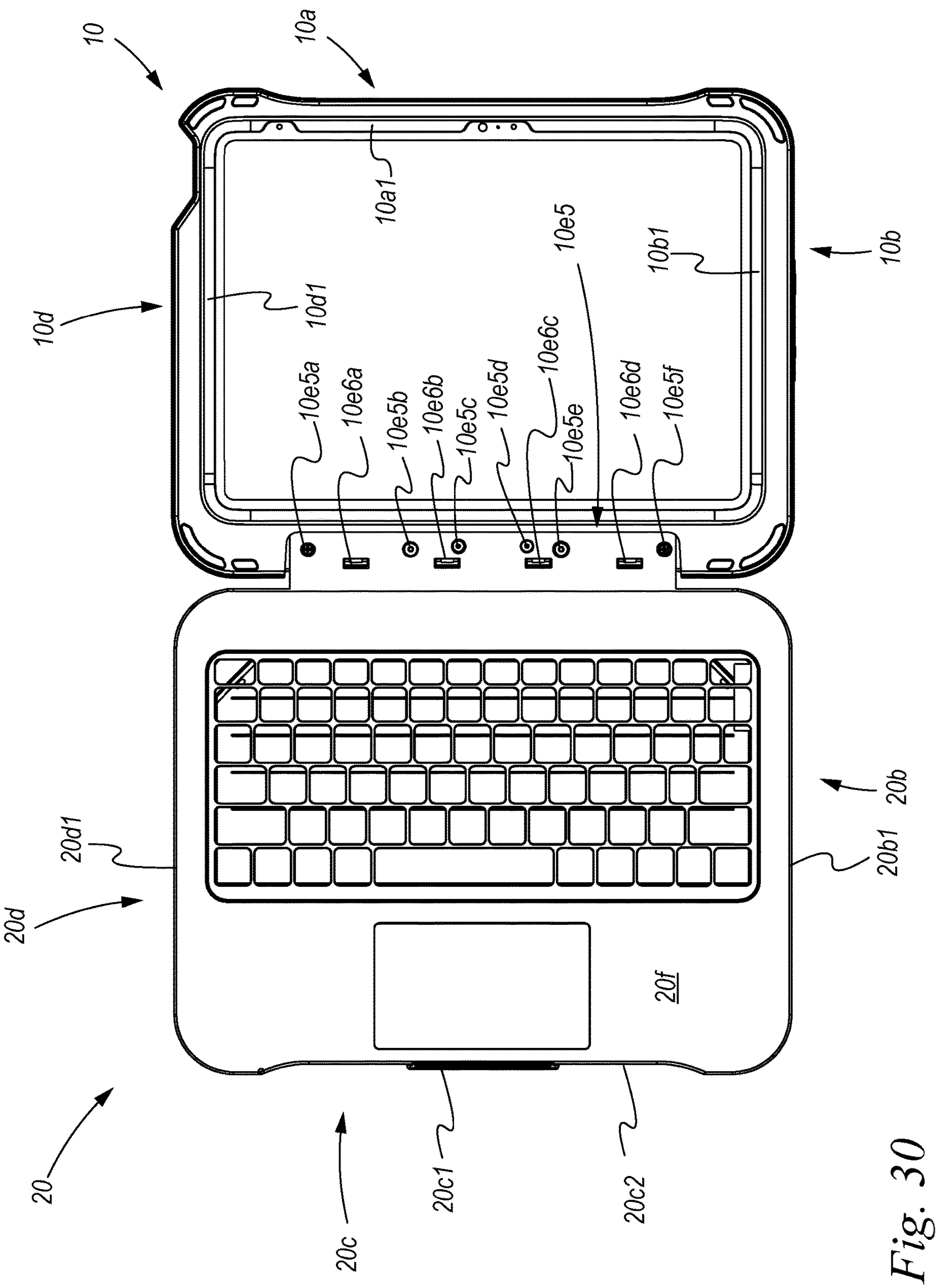
FIG. 30 is a front elevational view of an assembly excluding the trim member.

Turning to FIG. 30, depicted therein is a front elevational view of keyboard-case uncoupled assembly 50. In this view, keyboard assembly 20 is shown fully seated within the recessed structure of frame assembly 10, while portable electronic device 40 is received into a rear cavity of the frame. Trim assembly 30 is excluded to reveal the interface boundaries between the keyboard and frame, and the positioning of the portable electronic device within the system. This configuration illustrates the modular nature of the components before the outer trim is installed.

Figure 31:
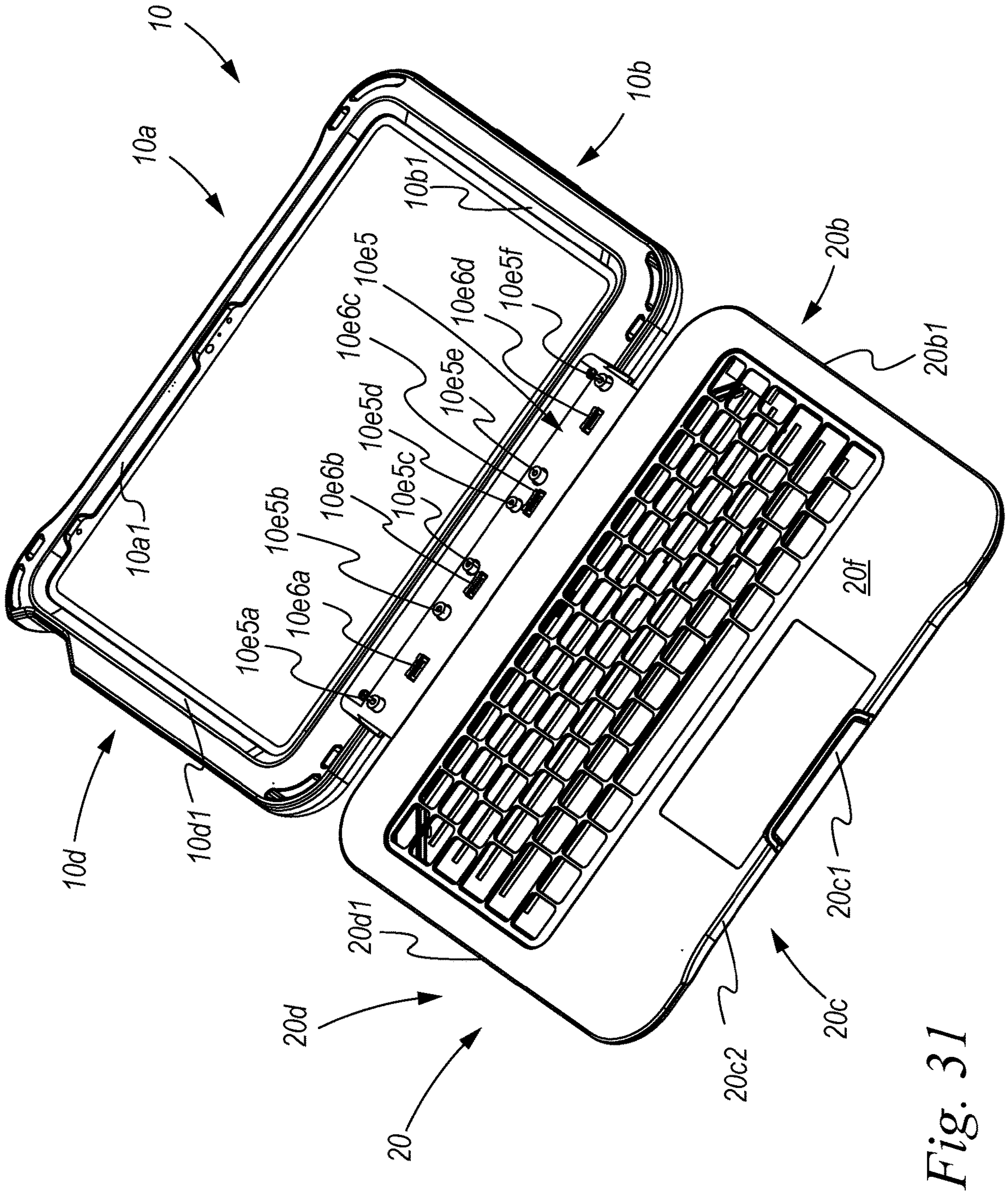
FIG. 31 is a first front perspective view of the assembly of FIG. 30.

Turning to FIG. 31, depicted therein is a first front perspective view of keyboard-case uncoupled assembly 50. This view highlights the spatial relationship between keyboard assembly 20 and frame assembly 10, with the keyboard seated within the recessed structure and aligned along the side and front portions of the frame. Portable electronic device 40 is positioned within a rear cavity of the frame assembly, and both components are shown without the trim assembly installed, allowing visibility of interface regions and surface contours. The perspective provides visual context for alignment, coupling, and enclosure steps in assembly.

Figure 32:
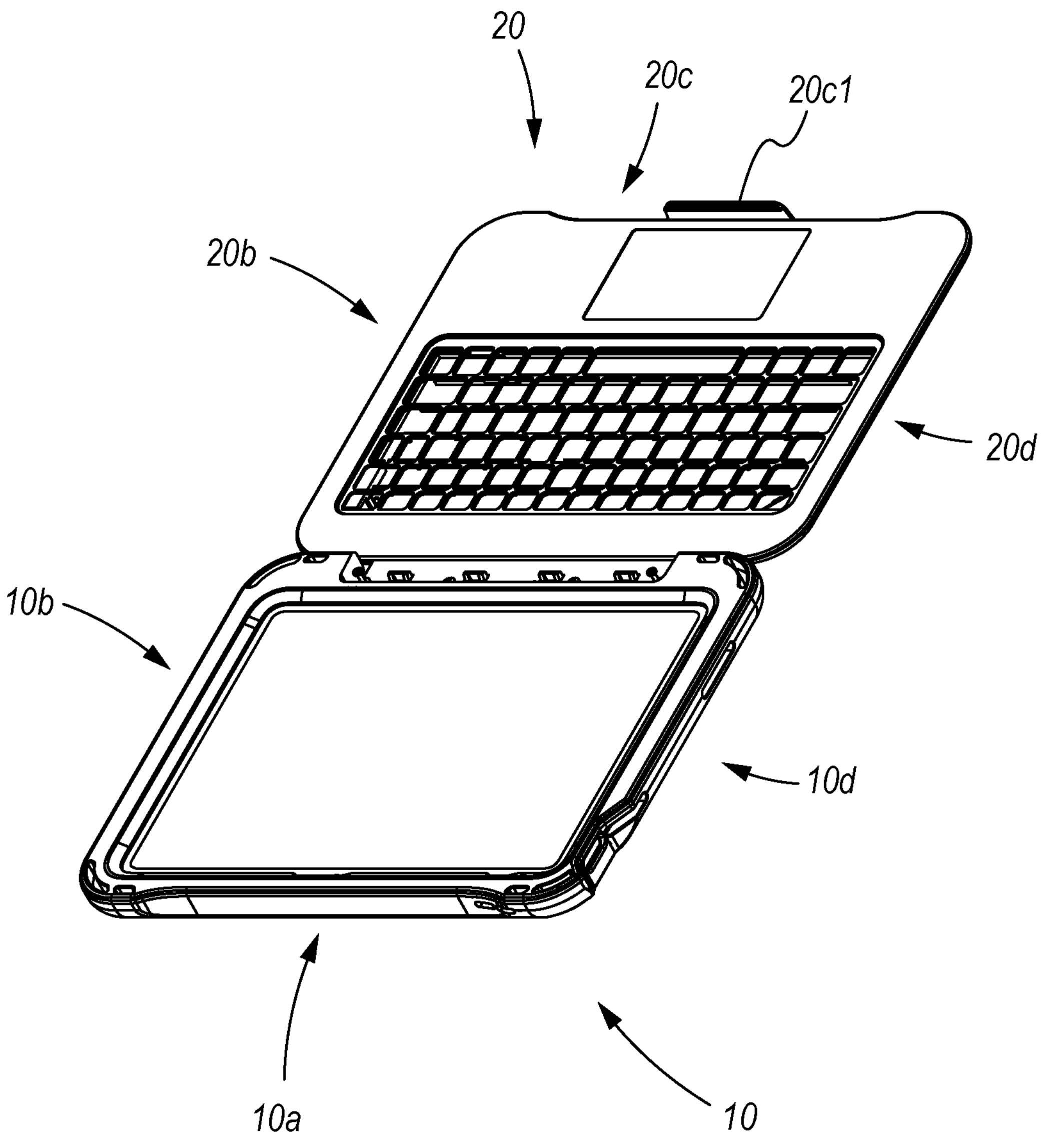
FIG. 32 is a first front perspective exploded view of the assembly.

Turning to FIG. 32, depicted therein is a first front perspective exploded view of keyboard-case assembly 60. Keyboard assembly 20, frame assembly 10, portable electronic device 40, and trim assembly 30 are shown in spaced alignment along their intended coupling axes.

Figure 33:
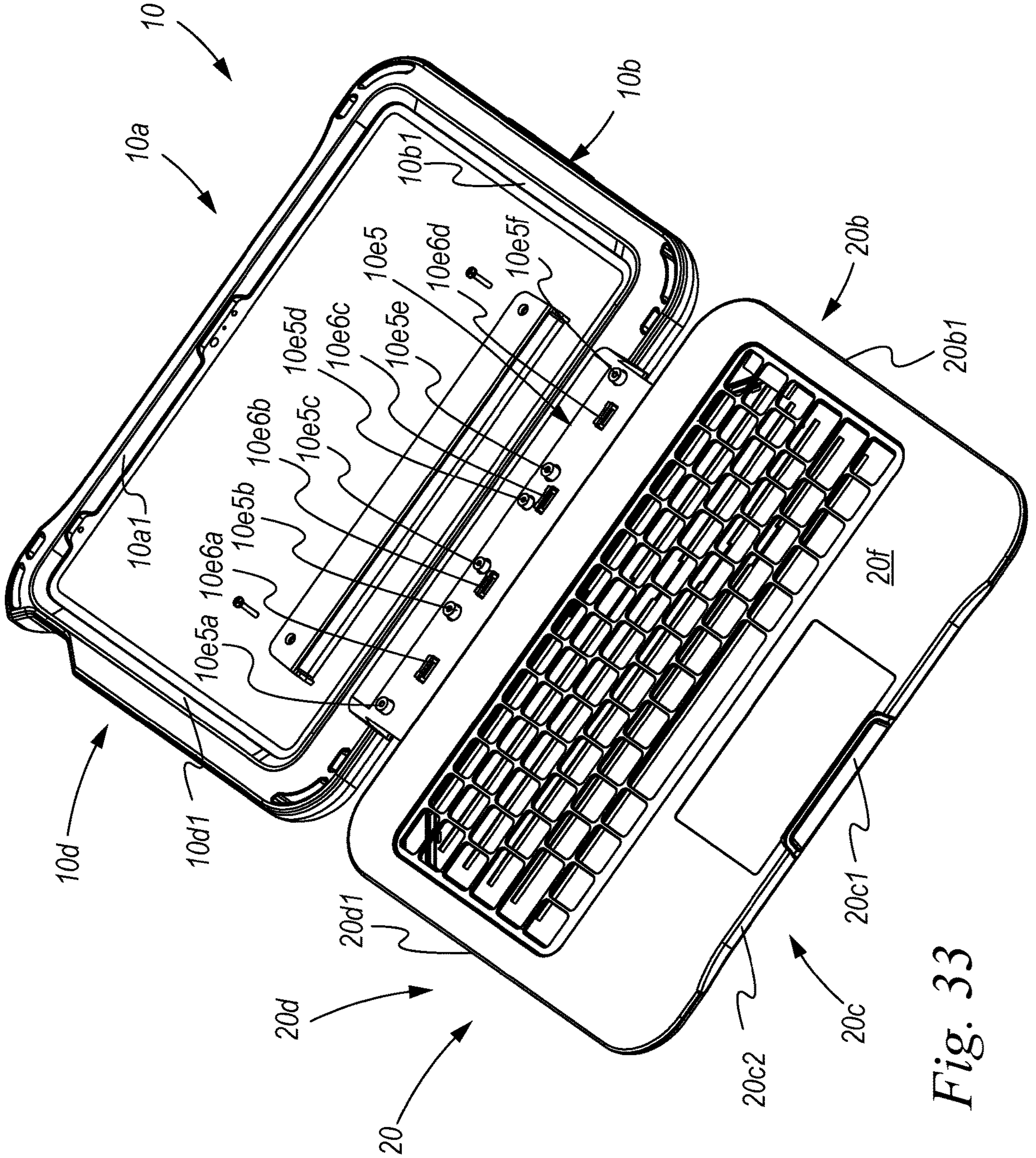
FIG. 33 is a second front perspective view of the assembly of FIG. 30.

Turning to FIG. 33, depicted therein is a second front perspective view of keyboard-case uncoupled assembly 50. This alternate viewing angle further illustrates the fit of keyboard assembly 20 within the recessed structure of frame assembly 10 and the seated position of portable electronic device 40 in the rear cavity. The side and corner interfaces between the frame and keyboard are more clearly visible, as are edge clearances and the alignment between adjacent surfaces. The trim assembly remains omitted in this view, allowing clearer visualization of the assembly's intermediate state prior to final enclosure.

Figure 34:
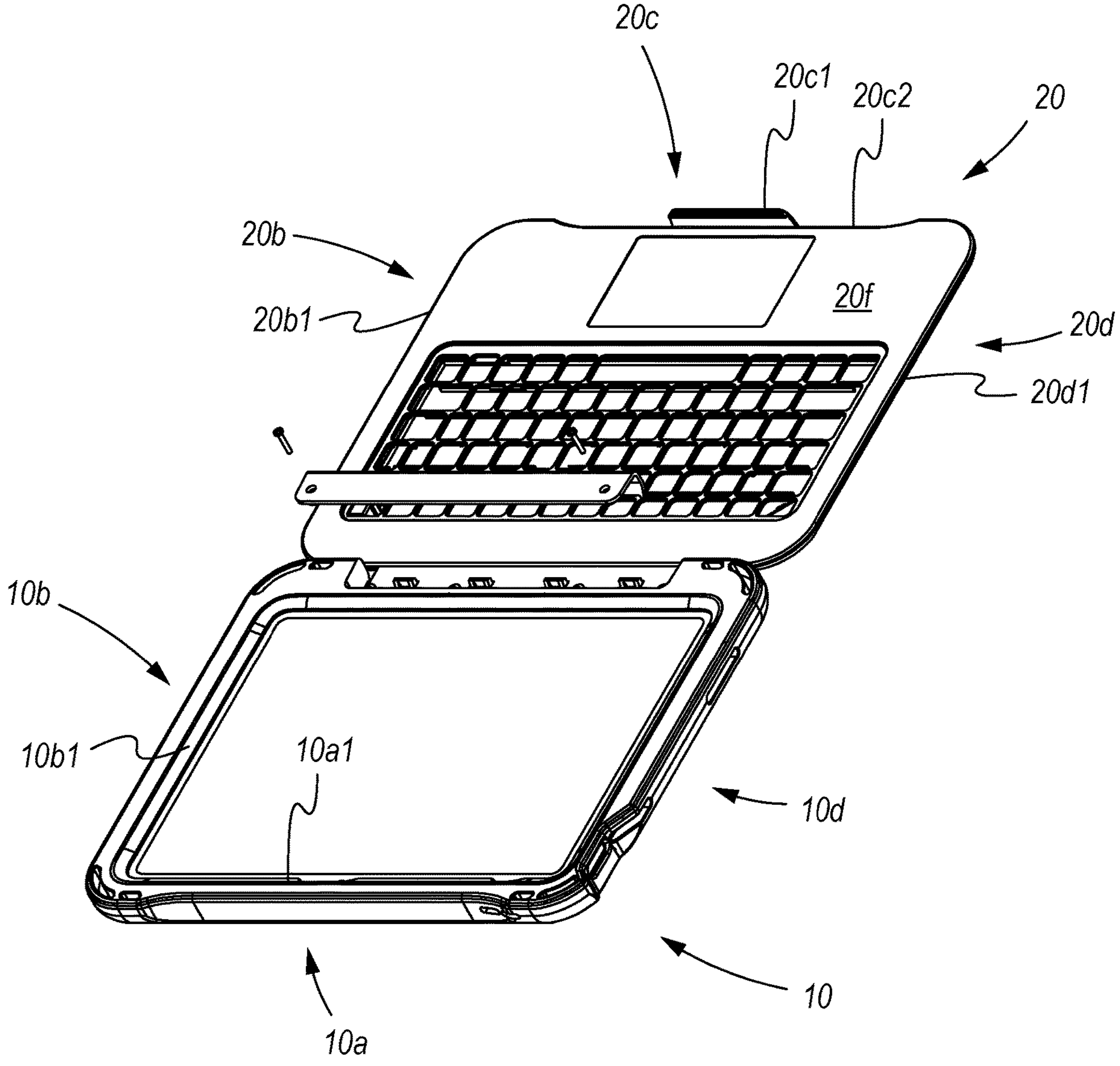
FIG. 34 is a first front perspective exploded view of the assembly.

Turning to FIG. 34, depicted therein is a first front perspective exploded view of keyboard-case assembly 60. Keyboard assembly 20, frame assembly 10, portable electronic device 40, and trim assembly 30 are shown in spaced alignment along their intended coupling axes. The relative positioning of the components illustrates the insertion path of the keyboard into the recessed structure of the frame, the placement of the portable electronic device behind or within the frame, and the alignment of the trim over the keyboard. This view highlights the modular and stackable nature of the components, with visible features such as alignment bosses, coupling apertures, and flange interfaces supporting guided assembly and secure attachment.

Figure 35:
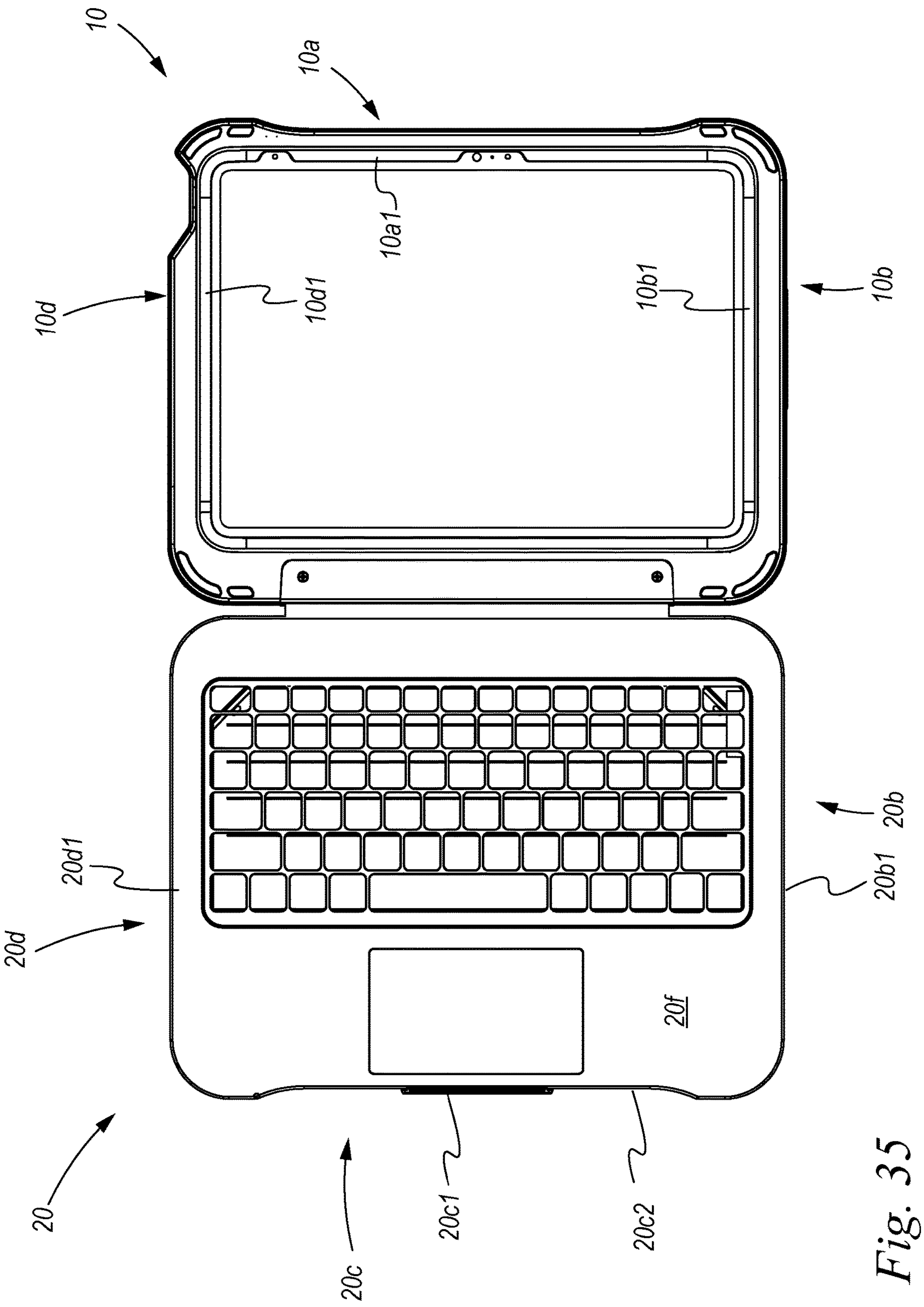
FIG. 35 is a second front perspective exploded view of the assembly.

Turning to FIG. 35, depicted therein is a second front perspective exploded view of keyboard-case assembly 60. The view presents a different angle from FIG. 33, further clarifying the spatial relationship between frame assembly 10, keyboard assembly 20, portable electronic device 40, and trim assembly 30. The exploded arrangement illustrates how each component is designed to mate with adjacent parts, showing the alignment of flanges, standoffs, tabs, and boss members along their respective coupling paths. This orientation emphasizes the layered structure and mechanical compatibility among the assemblies, facilitating an intuitive assembly process.

Figure 36:
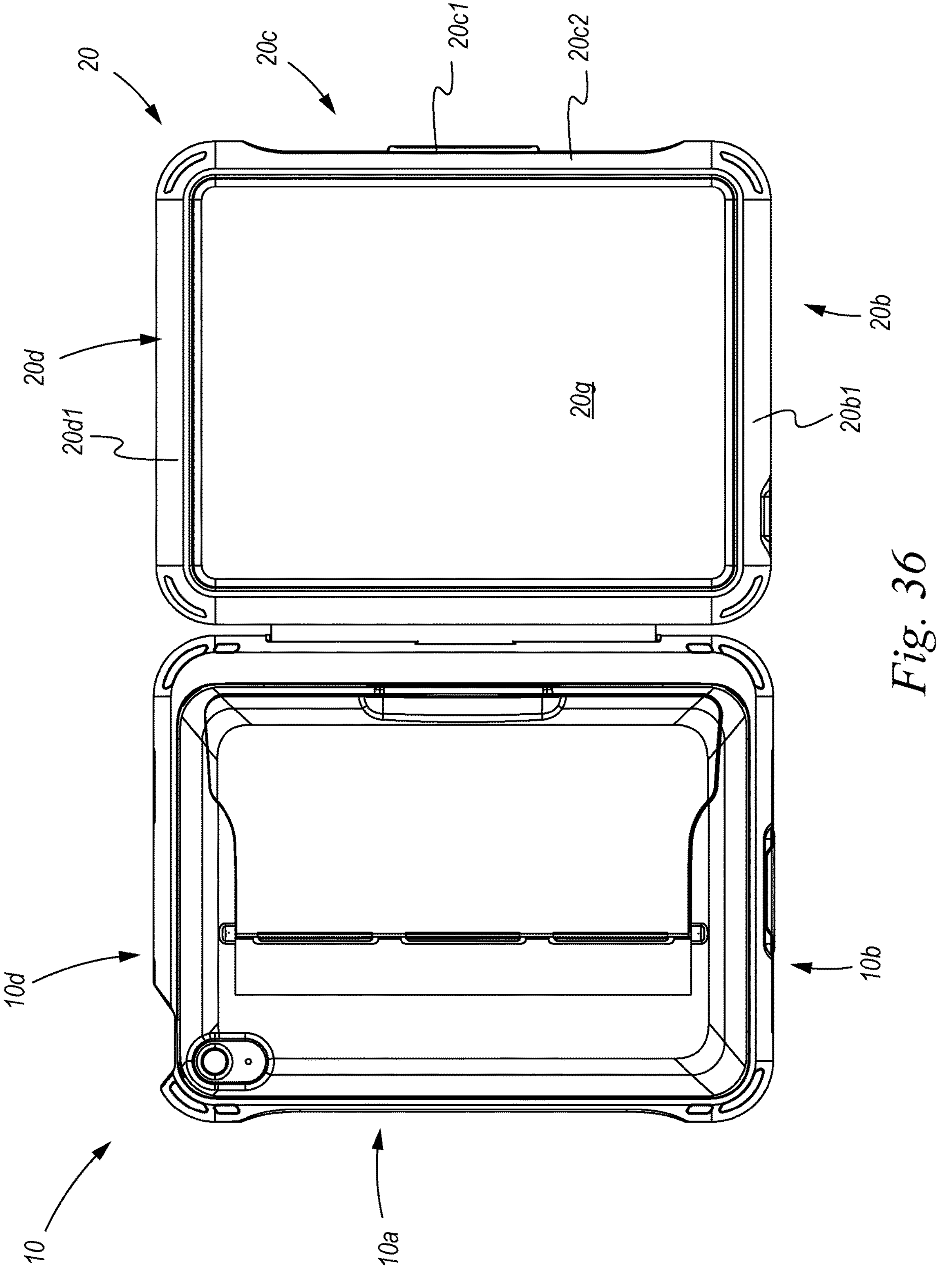
FIG. 36 is a front elevational view of the assembly in an open configuration.

Turning to FIG. 36, depicted therein is a front elevational view of keyboard-case assembly 60 in an open configuration. In this view, the keyboard assembly 20 is visibly seated within the frame assembly 10, and the portable electronic device 40 is held in position within the recessed portion of the frame. The trim assembly 30 has been removed to expose internal components and facilitate understanding of the arrangement. The planar alignment of the keyboard's front input surface with the surrounding frame flanges is evident, and the overall layout demonstrates how the device remains accessible and operable while in the open position.

Figure 37:
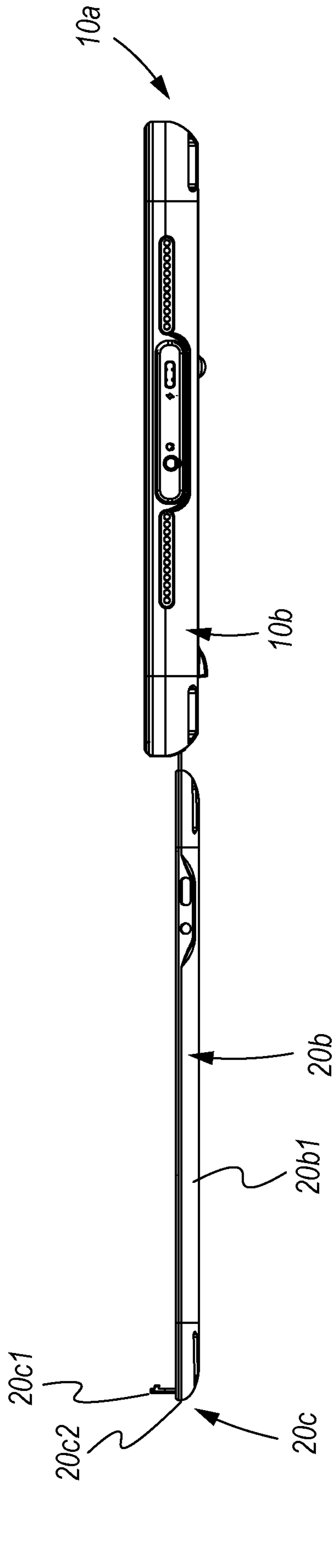
FIG. 37 is a back elevational view of the assembly in an open configuration.

Turning to FIG. 37, depicted therein is a back elevational view of keyboard-case assembly 60 in an open configuration. The rear surface of the frame assembly 10 is visible, along with the back surface of the portable electronic device 40 secured within the recessed region. The back portion of the keyboard assembly 20 is shown flush against the recessed structure, indicating a snug fit when the components are coupled. Outer frame contours and parting lines are evident, suggesting a cohesive rear surface and facilitating integration with additional components or accessories.

Figure 38:
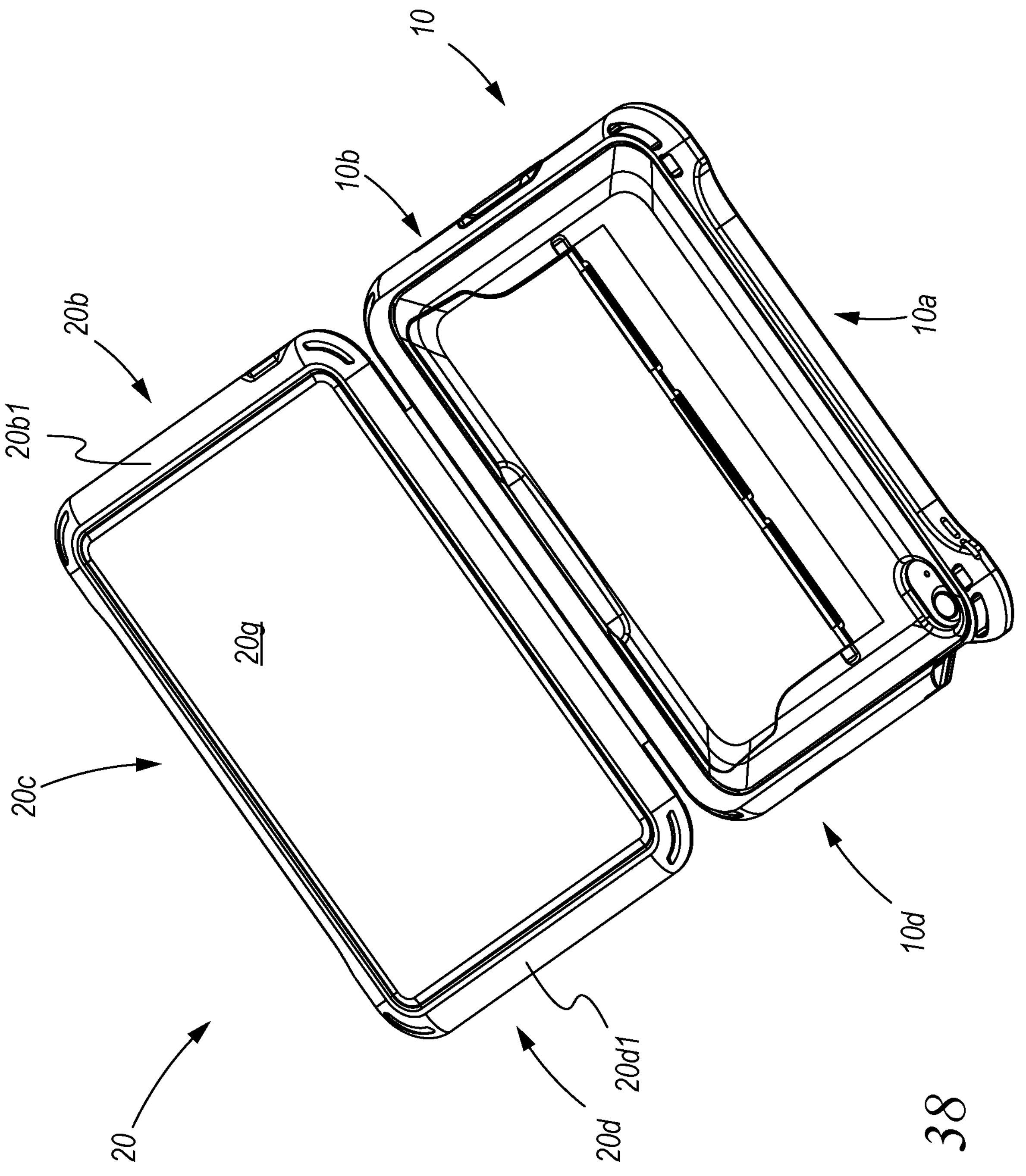
FIG. 38 is a bottom plan view of the assembly in an open configuration.

Turning to FIG. 38, depicted therein is a bottom plan view of keyboard-case assembly 60 in an open configuration. The base of the frame assembly 10 and the lower portion of keyboard assembly 20 are visible, with alignment between the components suggesting secure seating within the recessed structure. The edges of the portable electronic device 40 can be seen nestled into the rear cavity of the frame, with its lower edge proximate to the keyboard. Structural alignment features, such as flange transitions or wall contours, may be present along the bottom perimeter to facilitate stable closure and ergonomic use.

Figure 39:
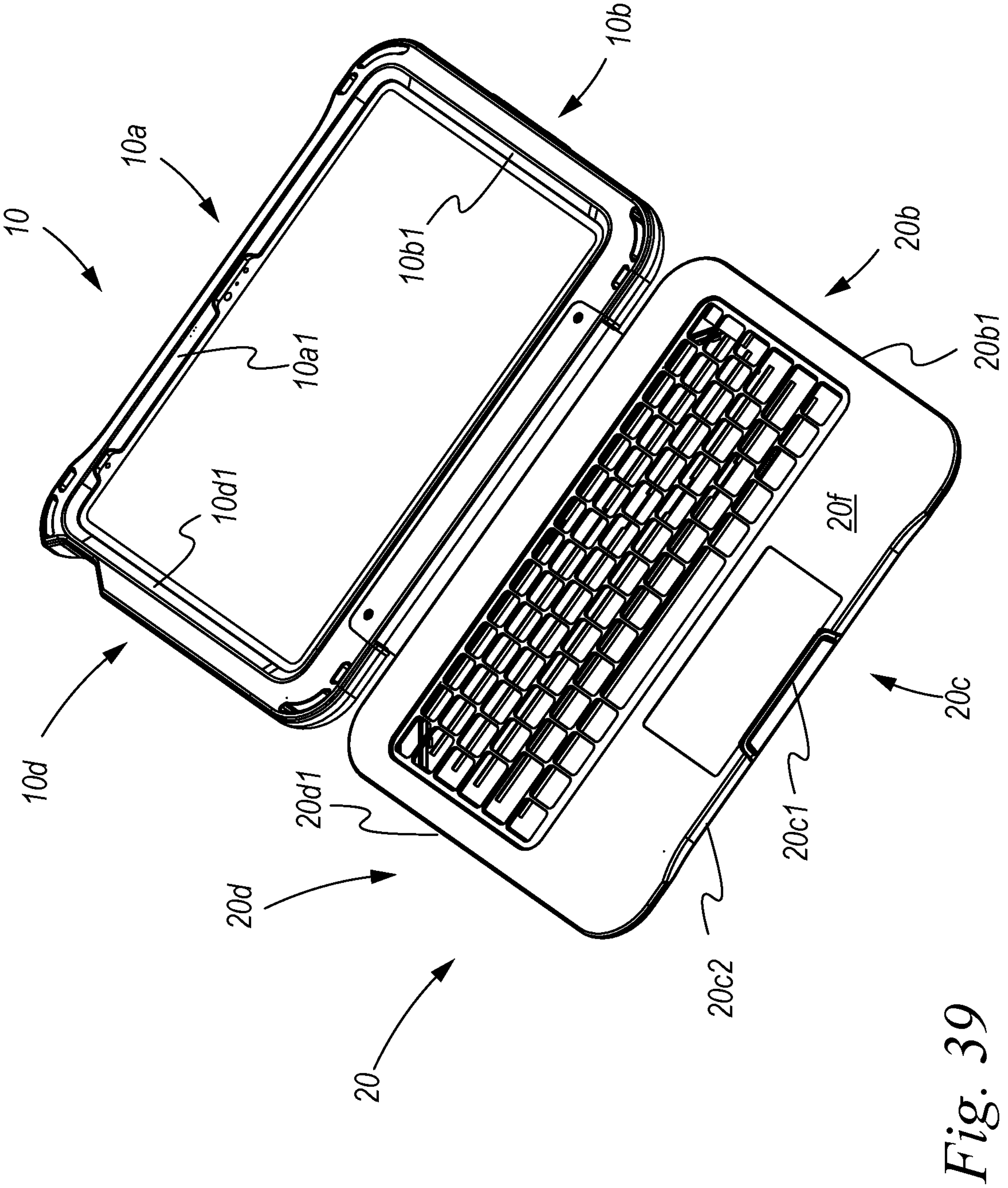
FIG. 39 is a first back perspective view of the assembly in an open configuration.

Turning to FIG. 39, depicted therein is a first back perspective view of keyboard-case assembly 60 in an open configuration. The portable electronic device 40 is shown seated within the frame assembly 10, with its back surface exposed and flush with the surrounding perimeter. The keyboard assembly 20 is coupled within the recessed structure of the frame, and the spatial relationship between these components illustrates the integration of the back and side walls. Visible interface contours and surface transitions along the frame and keyboard assemblies indicate alignment features and possibly guide the closing or latching mechanism used when transitioning to a closed configuration.

Figure 40:
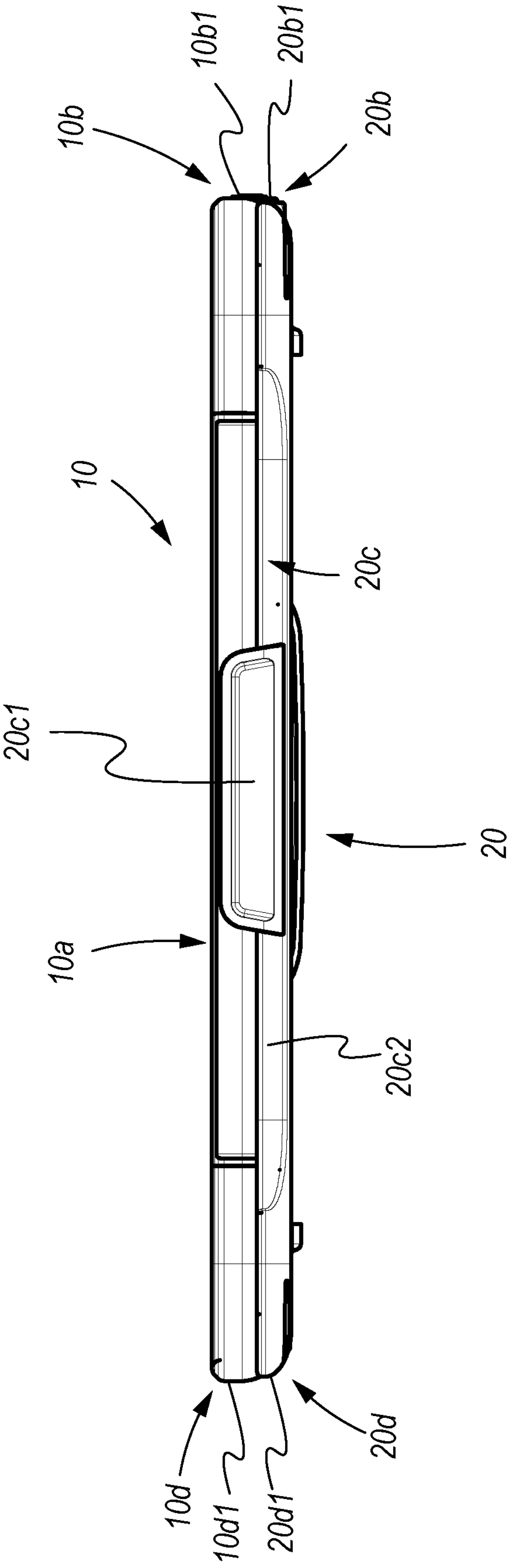
FIG. 40 is a first front perspective view of the assembly in an open configuration.

Turning to FIG. 40, depicted therein is a first front perspective view of keyboard-case assembly 60 in an open configuration. The portable electronic device 40 is positioned in the upper portion of the frame assembly 10, while the keyboard assembly 20 is coupled below within the recessed structure. The trim assembly is not shown in this view, allowing clear visibility of the device's display surface, keyboard input surface, and the interface contours along the frame's inner walls and flange portions. The alignment between components appears flush and precise, supporting ergonomic use while maintaining structural integrity.

Figure 41:
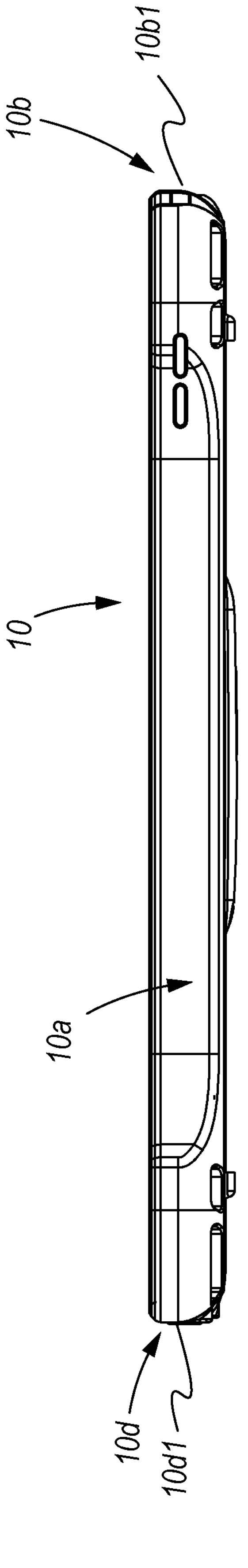
FIG. 41 is a left side elevational view of the assembly in an open configuration.

Turning to FIG. 41, depicted therein is a left side elevational view of keyboard-case assembly 60 in an open configuration. The side profile shows the relative positioning and height alignment between the frame assembly 10 and keyboard assembly 20, with the portable electronic device 40 seated in the upper portion of the frame. The view illustrates the angled orientation of the keyboard input surface and the screen display, highlighting a typical user-facing configuration when deployed for typing or viewing. The relationship between the frame's flange portions and the outer edges of the keyboard is also visible, reinforcing the consistent fit along the left side.

Figure 42:
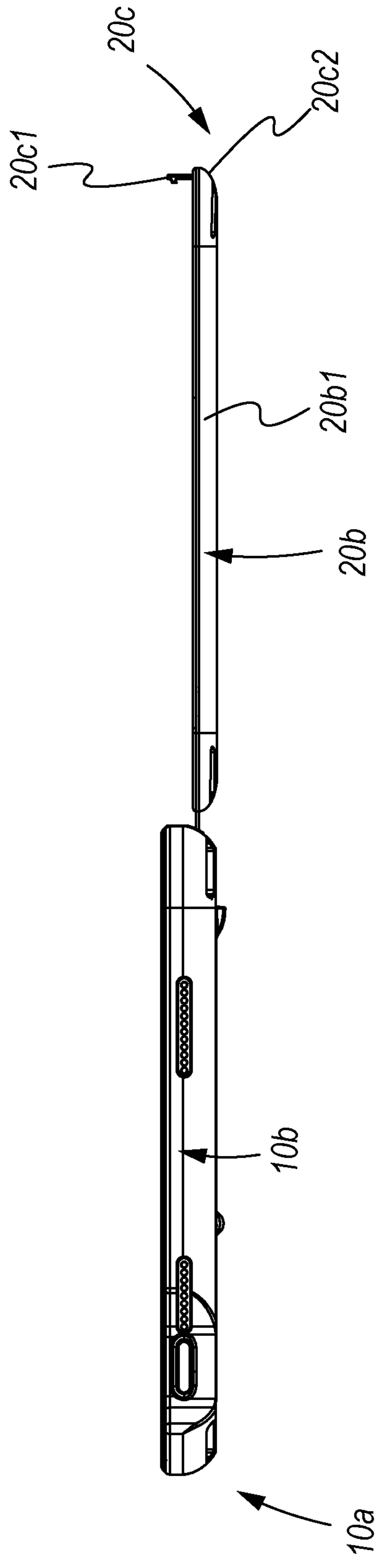
FIG. 42 is a right side elevational view of the assembly in an open configuration.

Turning to FIG. 42, depicted therein is a right side elevational view of keyboard-case assembly 60 in an open configuration. The figure reveals the side edge profiles of the frame assembly 10, keyboard assembly 20, and portable electronic device 40 when deployed. The angle of inclination between the keyboard surface and the display screen is evident, and the right-side flange and trim contours are visible along the outer edge. The compact alignment across components along the right side ensures a unified and ergonomic assembly for user interaction.

Figure 43:
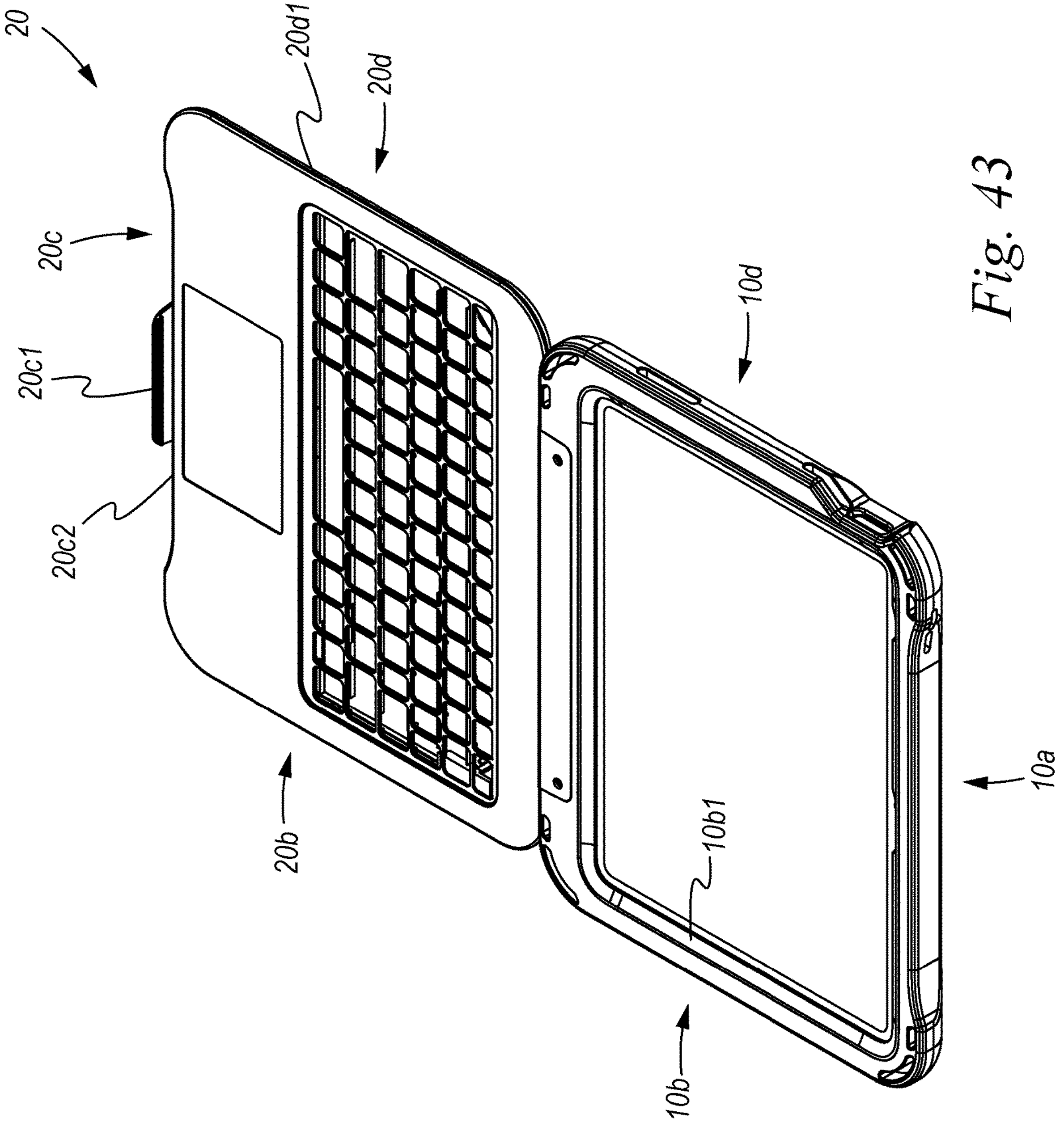
FIG. 43 is a top plan view of the assembly in an open configuration.

Turning to FIG. 43, depicted therein is a top plan view of keyboard-case assembly 60 in an open configuration. The arrangement of the keyboard assembly 20, frame assembly 10, and portable electronic device 40 is shown in a planar layout, with the display surface of the device extending upward and the keyboard extending forward. The top edges of the frame and trim are aligned with the outer boundaries of the keyboard and device, indicating a well-integrated assembly footprint. This top-down view also shows the edge alignment and enclosure margins that contribute to the protective function of the frame and trim.

Figure 44:
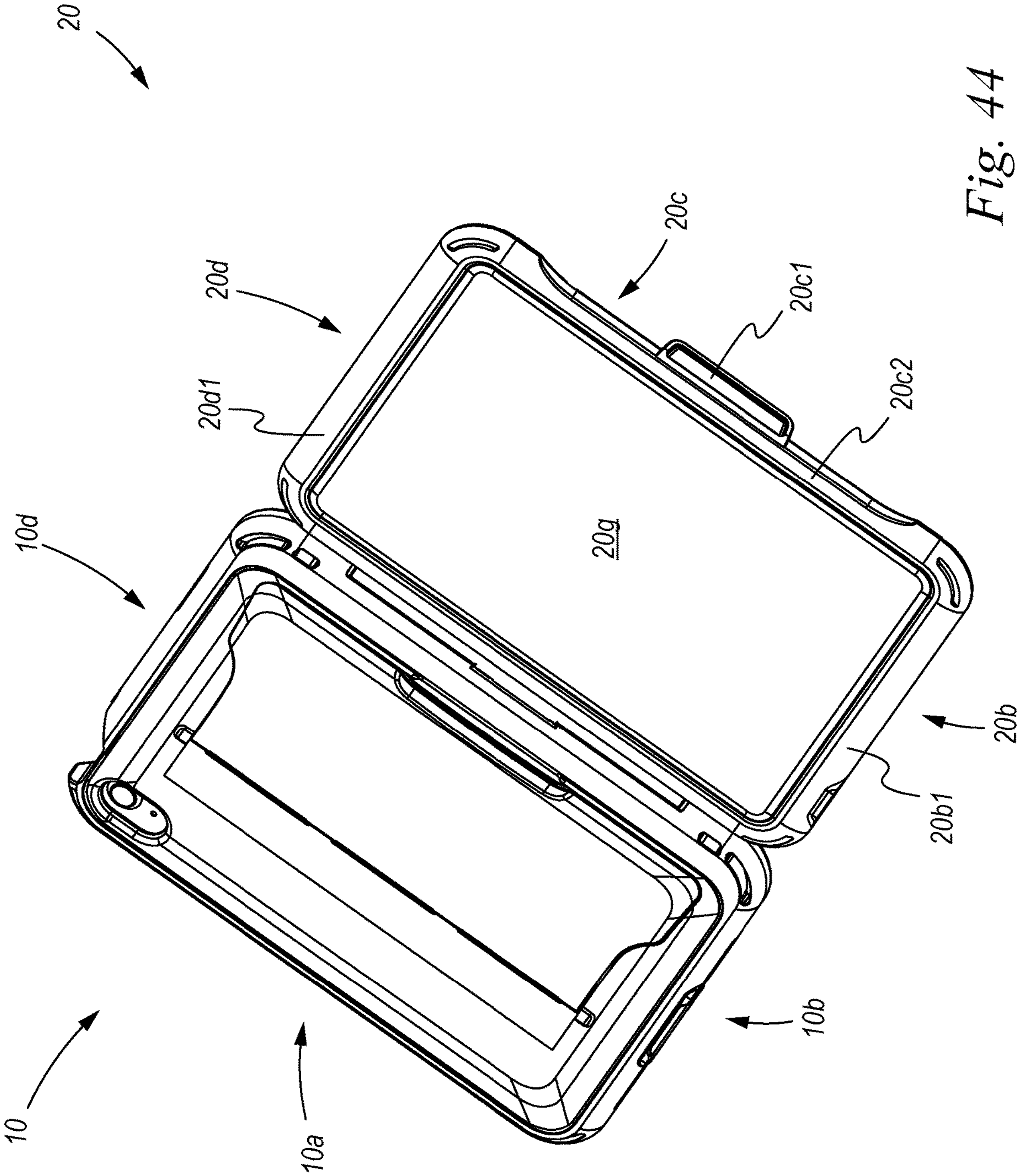
FIG. 44 is a second front perspective view of the assembly in an open configuration.

Turning to FIG. 44, depicted therein is a second front perspective view of keyboard-case assembly 60 in an open configuration. This perspective highlights the alignment between the keyboard assembly and the portable electronic device within the frame assembly. The trim member is shown bordering the display area of the device, contributing to enclosure and positional retention. The configuration emphasizes the smooth transition from keyboard to display, as well as the structural integration of the frame and trim in maintaining device orientation during use.

Figure 45:
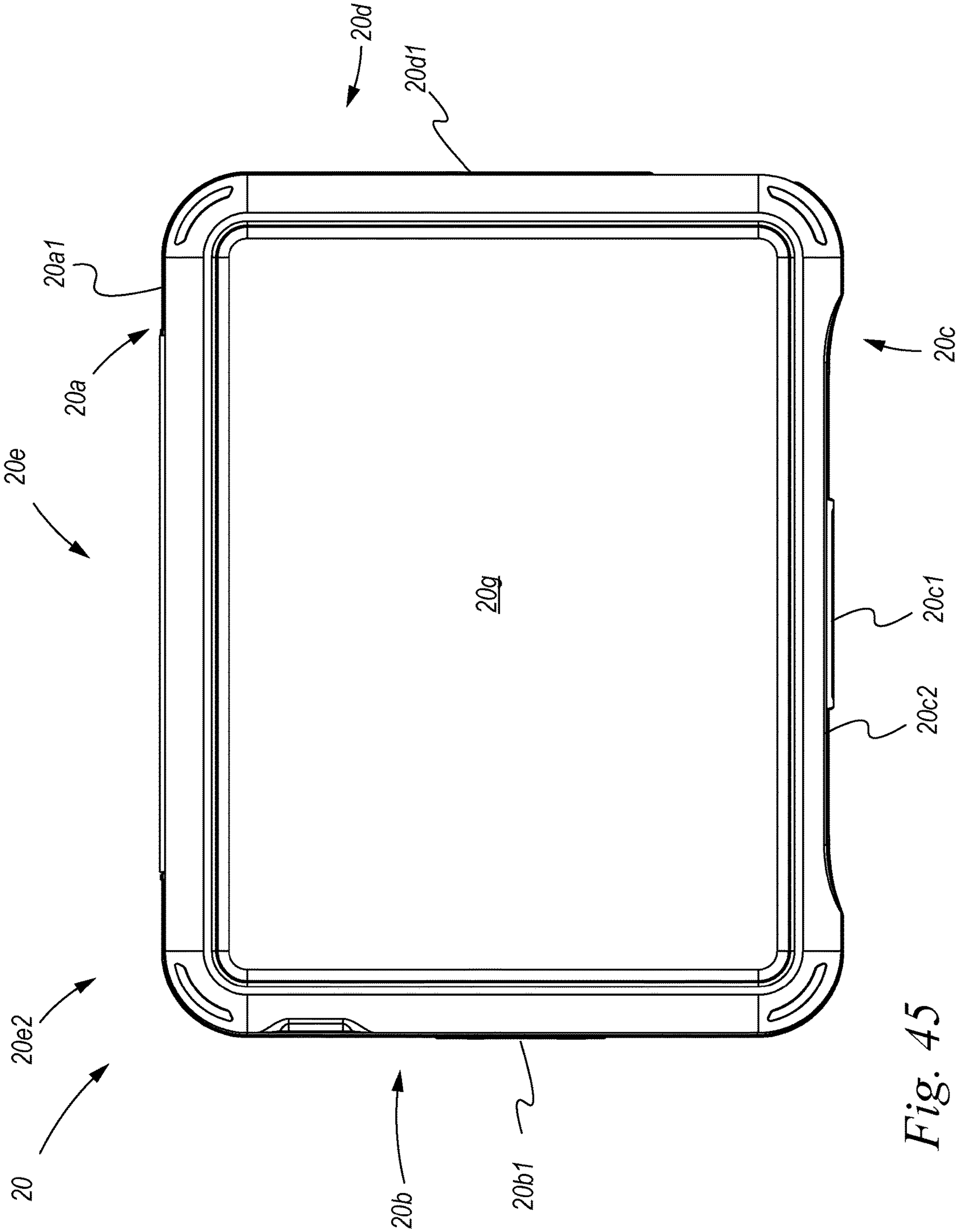
FIG. 45 is a second back perspective view of the assembly in an open configuration.

Turning to FIG. 45, depicted therein is a second back perspective view of keyboard-case assembly 60 in an open configuration. The image provides a view of the rear surfaces of the frame assembly and portable electronic device, with the trim member shown seated along the outer periphery. This orientation illustrates the rear structural interaction between components, including the alignment of the portable electronic device within the rear cavity of the frame. The trim's backside profile conforms closely to the device, offering both coverage and mechanical reinforcement.

Figure 46:
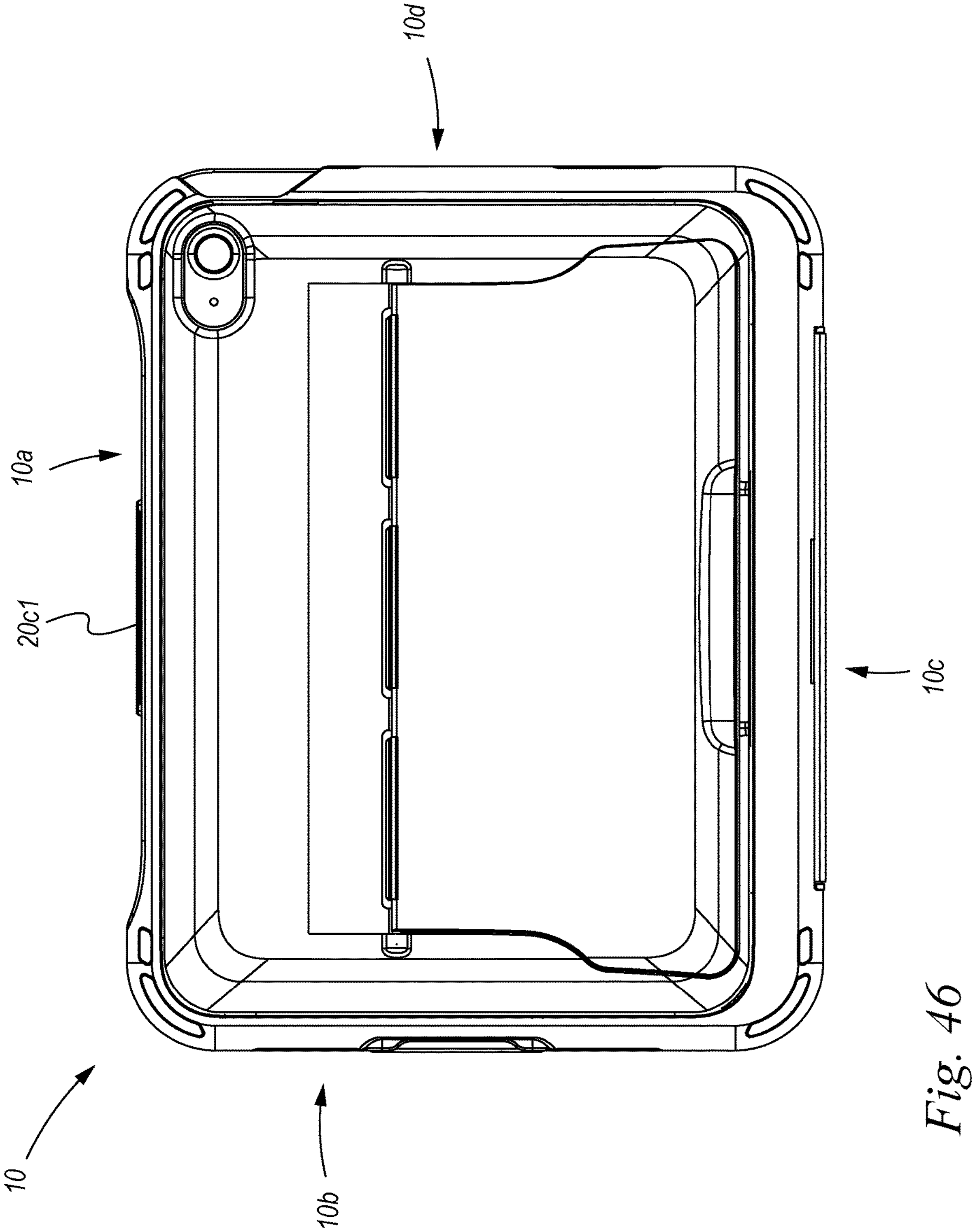
FIG. 46 is a front elevational view of the fully assembled device.

Turning to FIG. 46, depicted therein is a front elevational view of the fully assembled keyboard-case assembly 60 in a closed configuration. In this view, the keyboard assembly is covered by the trim member, and the portable electronic device is enclosed within the frame assembly. The outer surface appears flush and integrated, with minimal visible seams, indicating a compact and secure enclosure. The trim member overlays the keyboard's input region, and the frame edges extend slightly outward, forming a continuous outer boundary around the system.

Figure 47:
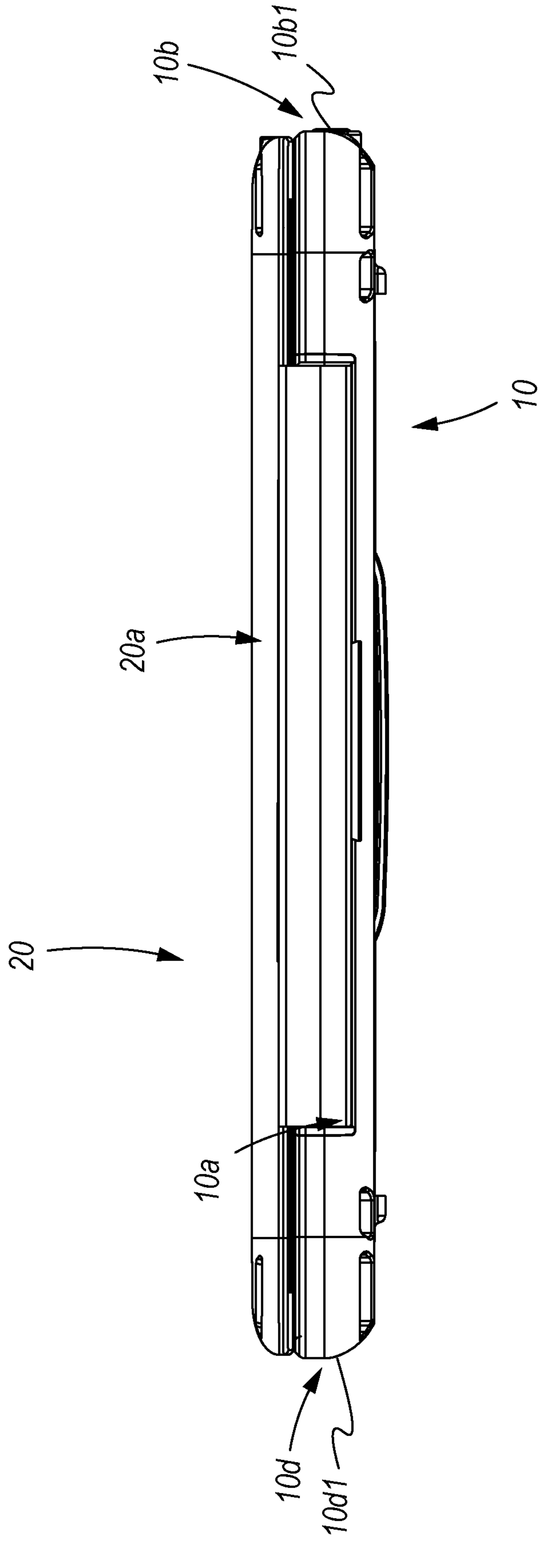
FIG. 47 is a back elevational view of the assembly of FIG. 45.

Turning to FIG. 47, depicted therein is a back elevational view of the fully assembled keyboard-case assembly 60 in the closed configuration. The rear surface of the frame assembly is visible, showing a smooth outer face with slight curvature or structural features to enhance rigidity and aesthetic uniformity. No internal components are exposed, and the closed configuration presents a streamlined profile suitable for transport or storage.

Figure 48:
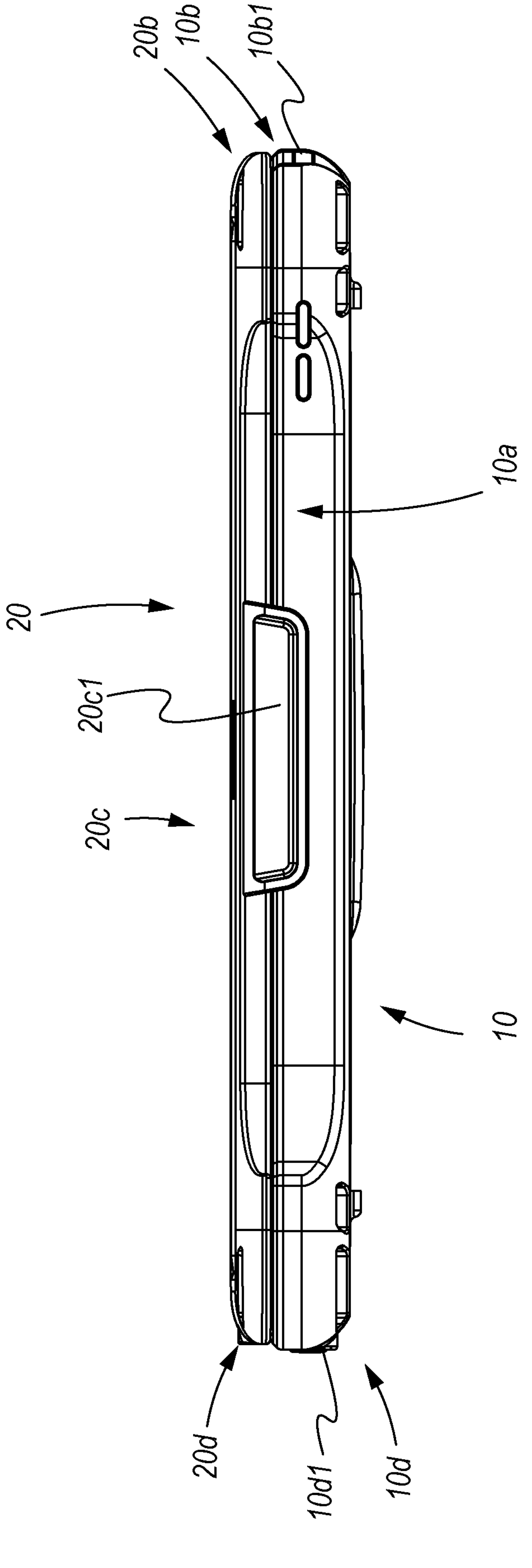
FIG. 48 is a left side elevational view of the assembly of FIG. 45.

Turning to FIG. 48, depicted therein is a left side elevational view of the fully assembled keyboard-case assembly 60 in the closed configuration. The side profile illustrates the alignment of the keyboard assembly with the frame assembly, showing a continuous contour along the edge. The flange portions of the frame are visible, extending outward to define the lateral boundary of the enclosure, and the trim member appears flush with adjacent components, contributing to a compact and cohesive form factor.

Figure 49:
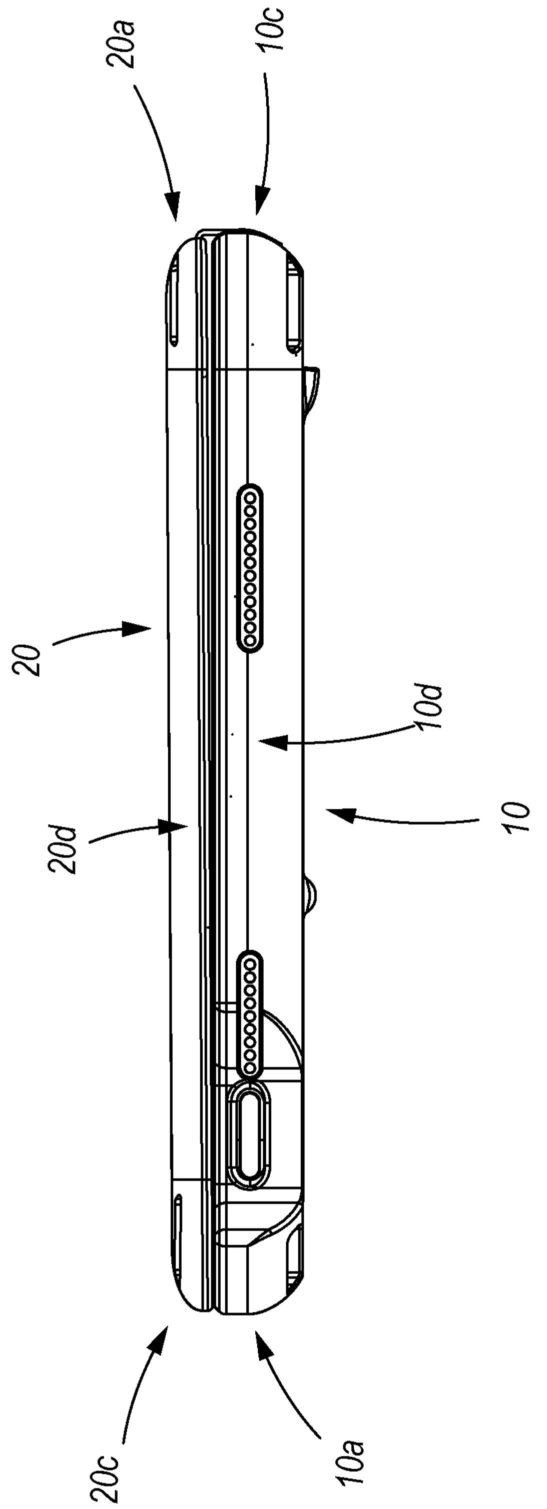
FIG. 49 is a right side elevational view of the assembly of FIG. 45.

Turning to FIG. 49, depicted therein is a right side elevational view of the fully assembled keyboard-case assembly 60 in the closed configuration. The outer surfaces of the trim member and frame assembly are shown in close alignment, forming a seamless enclosure around the internal components. The side view illustrates the uniform thickness of the assembly along its length, and the alignment of structural features such as flange portions, sidewalls, and trim edges contributes to the overall integrity and aesthetic of the closed system.

Figure 50:
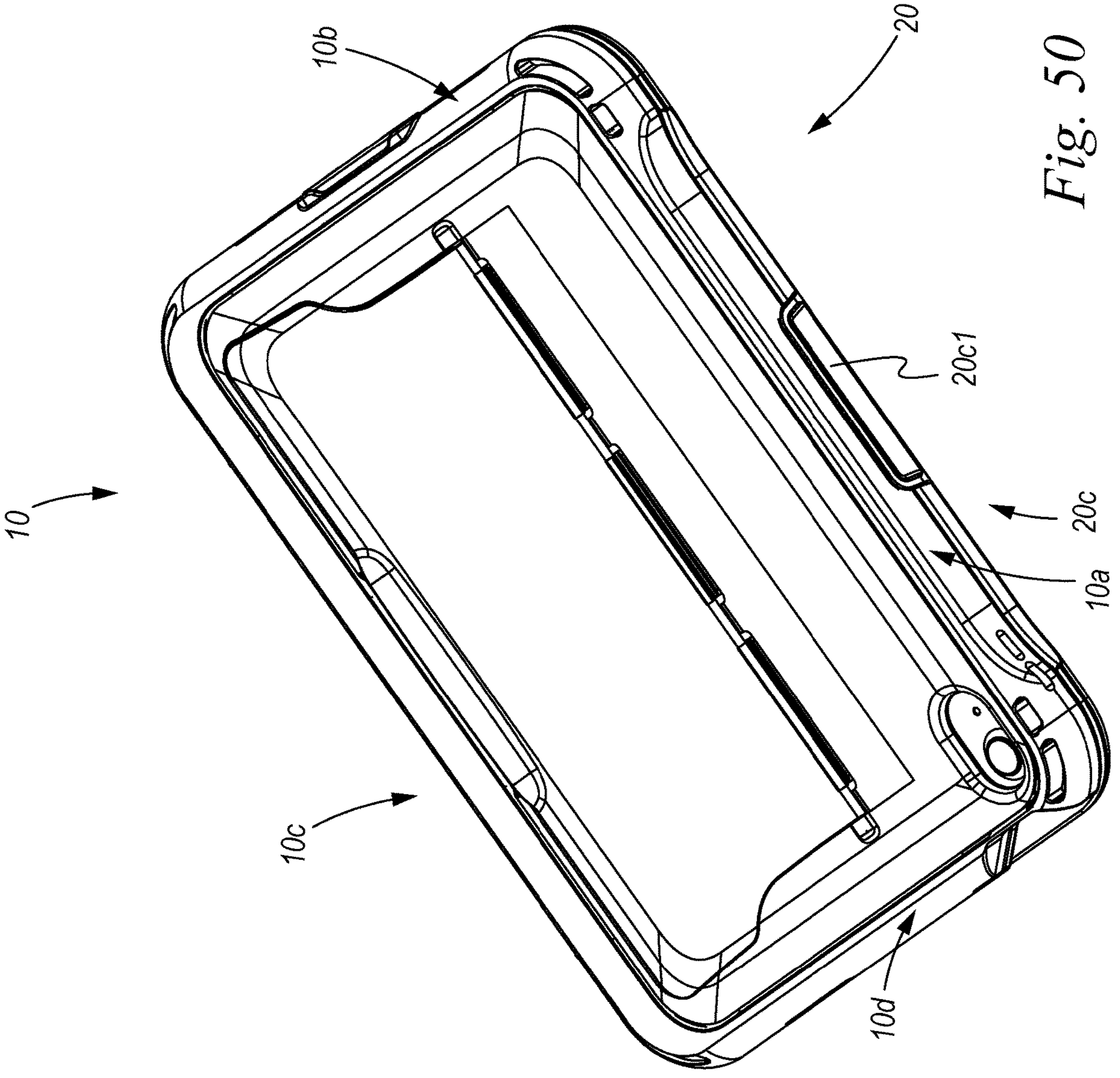
FIG. 50 is a top plan view of the assembly of FIG. 45.

Turning to FIG. 50, depicted therein is a top plan view of the fully assembled keyboard-case assembly 60 in the closed configuration. This view illustrates the contiguous interface between the frame assembly and the trim member along the top edge. The alignment of the side portions and any visible flange or rib features contributes to a rigid enclosure. The top plan perspective confirms the compact profile of the assembly, showing minimal gaps between components and a generally planar upper surface.

Figure 51:
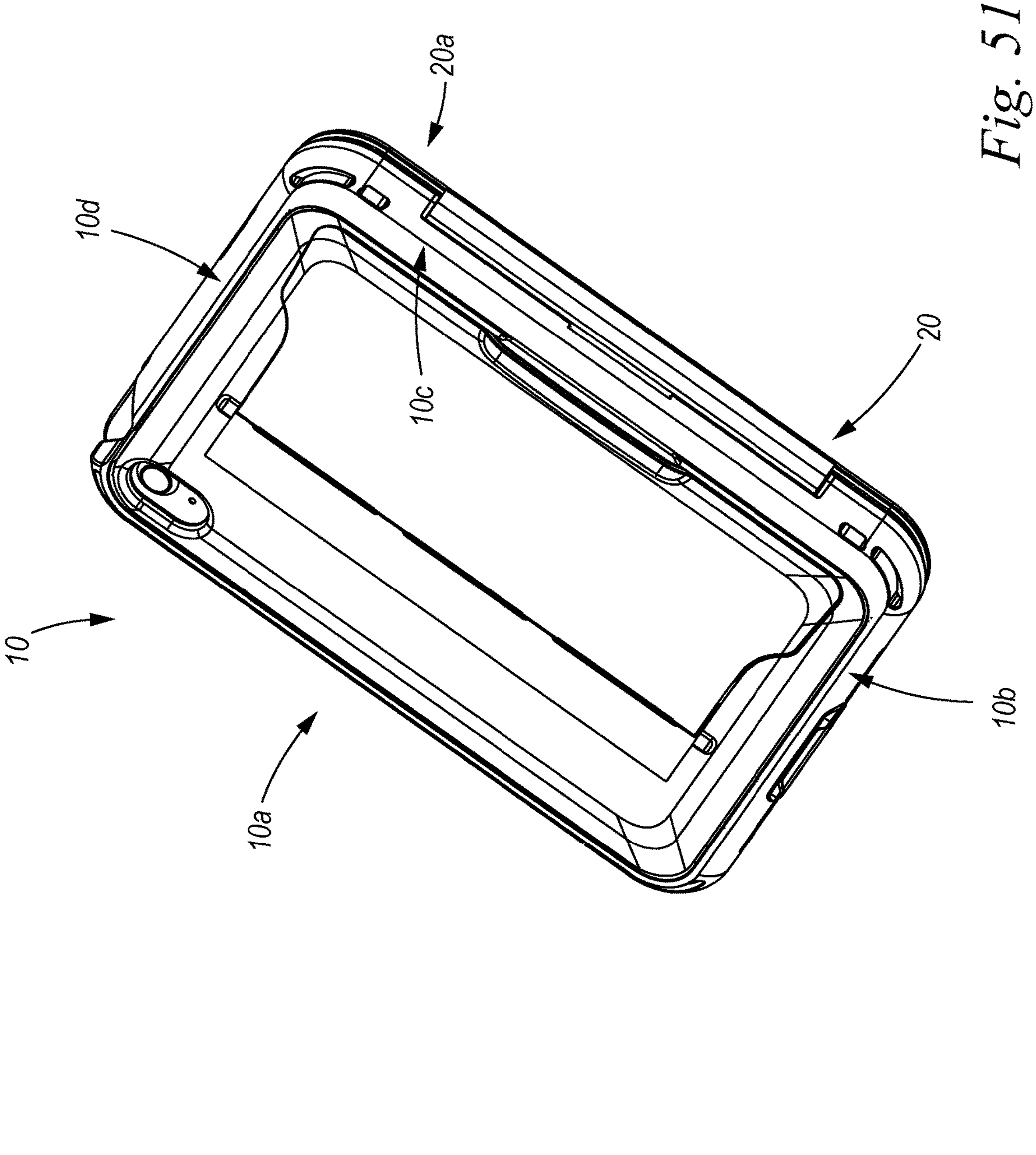
FIG. 51 is a first back perspective view of the assembly of FIG. 45.

Turning to FIG. 51, depicted therein is a first back perspective view of the fully assembled keyboard-case assembly 60 in the closed configuration. The rear-facing view reveals the back surface of the frame assembly, with the portable electronic device enclosed within. The trim member is shown secured along the periphery, with its boss members likely engaged within mating holes of the frame or keyboard assembly. The overall form factor is compact and structurally unified, offering protective coverage while maintaining access to ports or controls along the device perimeter.

Figure 52:
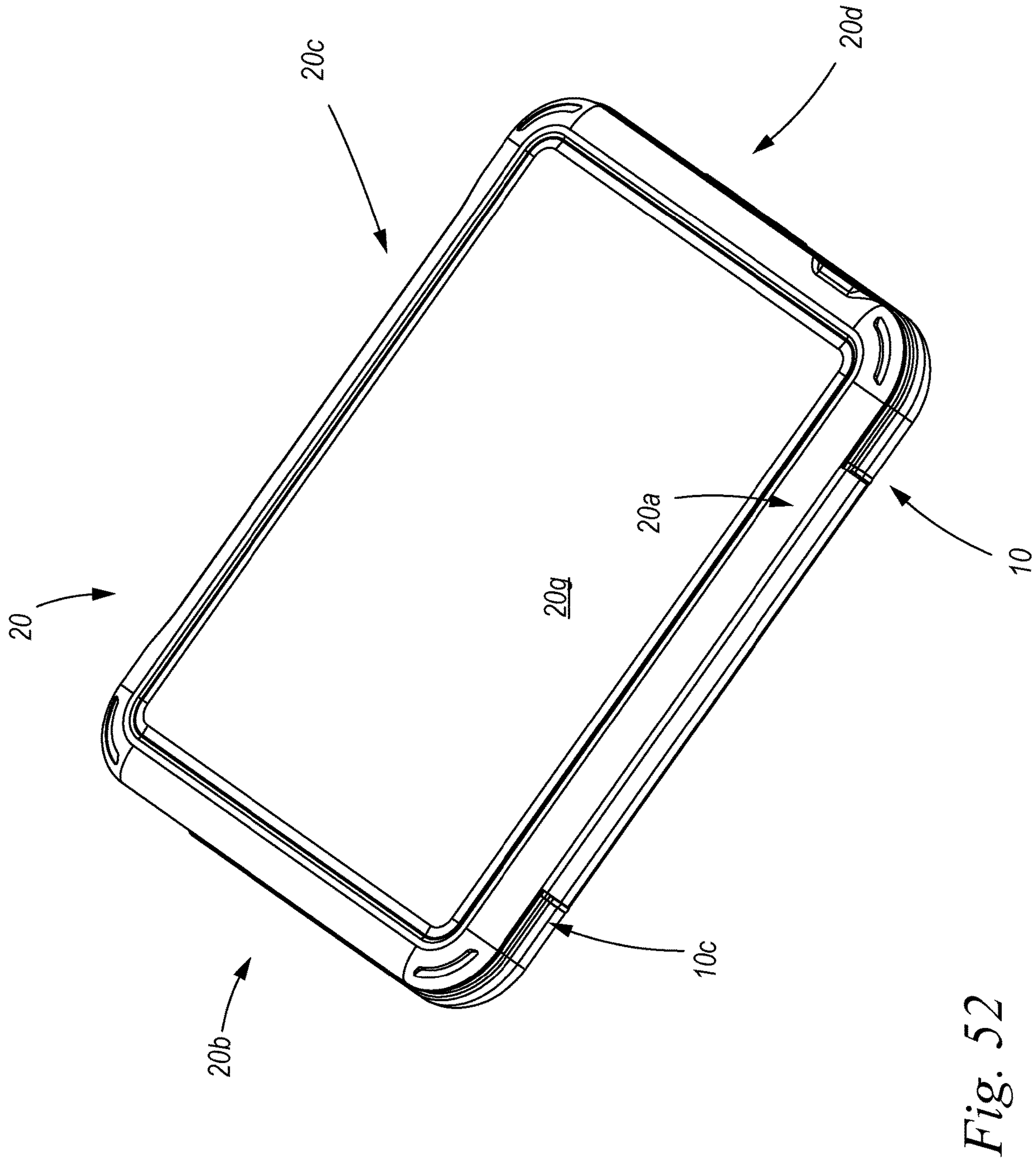
FIG. 52 is a second back perspective view of the assembly of FIG. 45.

Turning to FIG. 52, depicted therein is a second back perspective view of the fully assembled keyboard-case assembly 60 in the closed configuration, viewed from an alternate angle. This perspective highlights the interface between the trim member and the rear surfaces of the frame assembly and keyboard assembly. The trim's rear-facing surface appears to provide a continuous outer layer, with minimal visual separation at component junctions. The back of the portable electronic device is enclosed, and the structure appears rigid and cohesive, suitable for transport or protective storage.

Figure 53:
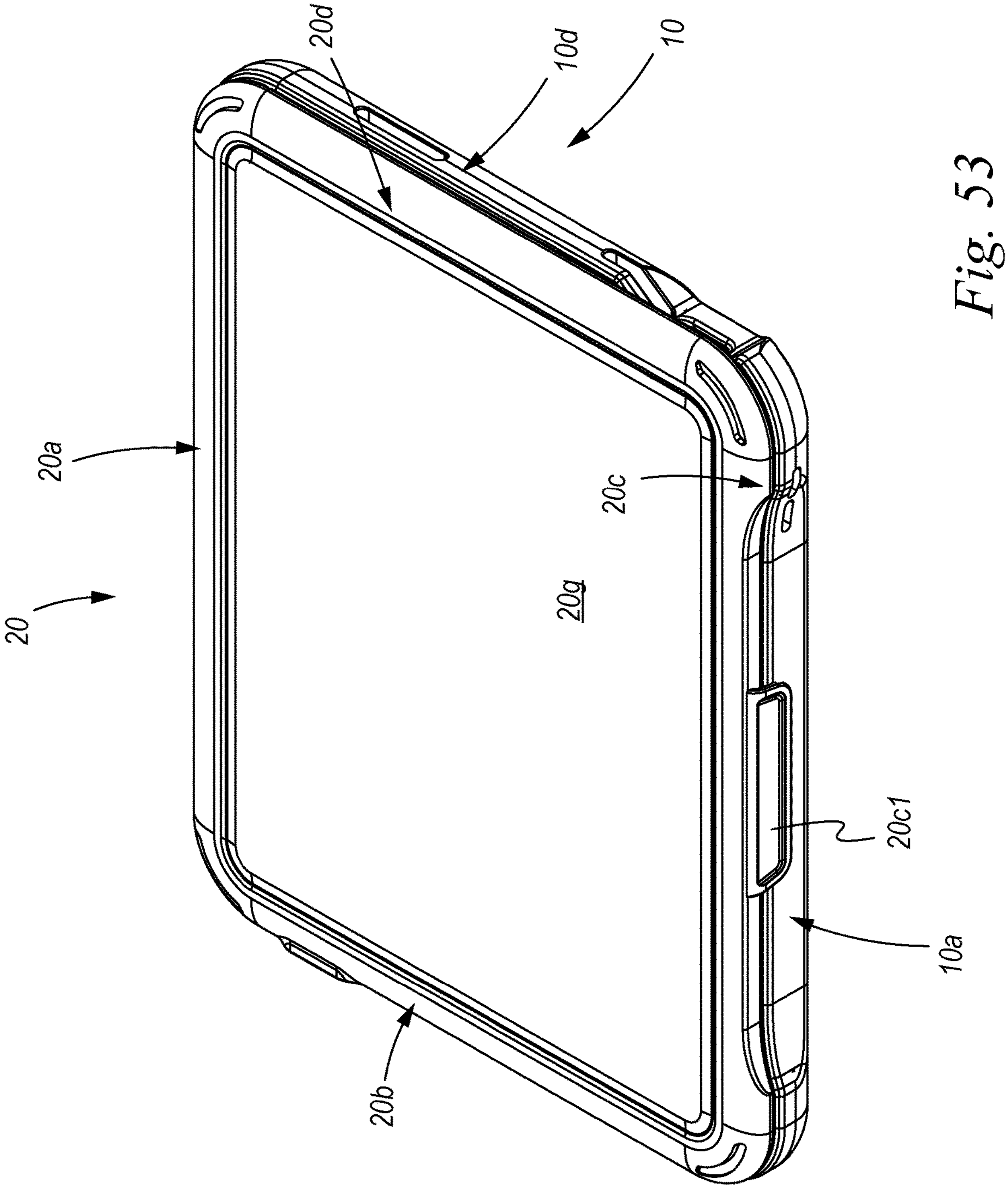
FIG. 53 is a first front perspective view of the assembly of FIG. 45.

Turning to FIG. 53, depicted therein is a first front perspective view of the fully assembled keyboard-case assembly 60 in the closed configuration. From this vantage, the front-facing outer surface of the trim member is prominently visible, extending across the input area of the underlying keyboard assembly. The trim forms a continuous and slightly contoured exterior, with side portions aligned to the frame's perimeter. The front edges of the frame and trim mate closely, suggesting minimal gaps and robust enclosure of the keyboard and portable electronic device components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A case system for a portable electronic device, the system comprising:

I. a frame assembly including:
   A. a plurality of side portions, each having a flange portion;
   B. a recessed structure including:
      (1) end portions,
      (2) a back portion,
      (3) a base portion, and
      (4) an edge portion,
   C. a plurality of standoffs positioned within the recessed structure, and
   D. a plurality of tabs positioned along the recessed structure; and II. a keyboard assembly including:
   A. a plurality of side portions aligned with the side portions of the frame assembly,
   B. a coupling structure having:
      (1) an inner surface, and (2) a plurality of apertures arranged to receive corresponding tabs and fasteners from the frame assembly, C. a front portion including a keypad and a trackpad, and D. a back portion positioned adjacent to the recessed structure of the frame assembly, wherein the keyboard assembly is removably couplable to the frame assembly such that the back portion is secured within the recessed structure and the tabs and standoffs facilitate alignment and attachment.

2. The system of claim 1, wherein the side portions of the keyboard assembly include tab members insertable into corresponding tab-receiving regions of the frame assembly.

3. The system of claim 2, wherein the frame assembly further includes inner wall portions extending from the side portions and interfacing with outer portions of the keyboard assembly.

4. The system of claim 3, wherein the inner wall portions cooperate with the tabs to restrict lateral movement of the keyboard assembly relative to the frame assembly.

5. The system of claim 1, wherein the plurality of apertures in the coupling structure receive fasteners extending through the tabs of the frame assembly.

6. The system of claim 5, wherein the recessed structure of the frame assembly includes a plurality of bosses positioned adjacent at least some of the tabs to accept the fasteners.

7. The system of claim 6, wherein the standoffs maintain spacing between the keyboard assembly and the base portion of the recessed structure.

8. The system of claim 7, wherein the spacing accommodates airflow or cable routing between the keyboard assembly and the frame assembly.

9. The system of claim 1, wherein the back portion of the keyboard assembly includes a latch portion engageable with a portion of the recessed structure of the frame assembly.

10. The system of claim 9, wherein the latch portion assists in maintaining the keyboard assembly in a retained position relative to the frame assembly.

11. A case system for a portable electronic device, the system comprising:

I. a frame assembly including:

A. a recessed structure formed by:

(1) end portions, (2) a back portion, and (3) an edge portion, and

B. a plurality of tabs and standoffs; and

II. a keyboard assembly including:

A. a coupling structure with a plurality of apertures, and

B. a back portion seated within the recessed structure, wherein the keyboard assembly is removably couplable to the frame assembly by fasteners extending through the tabs into the standoffs.

12. The system of claim 11, wherein the coupling structure includes an inner surface shaped to match the recessed structure of the frame assembly.

13. The system of claim 12, wherein the inner surface promotes flush alignment between the keyboard assembly and the frame assembly.

14. The system of claim 11, wherein the recessed structure further includes a plurality of bosses receiving the fasteners.

15. The system of claim 14, wherein the frame assembly includes outer face portions surrounding the recessed structure and aligning with corresponding outer portions of the keyboard assembly.

16. The system of claim 11, wherein the keyboard assembly includes a front portion having a trackpad and a keypad aligned for user input.

17. A case system for a portable electronic device, the system comprising:

I. a frame assembly including:

A. a recessed structure receiving both a keyboard assembly and a portable electronic device, B. a plurality of tabs and standoffs arranged to secure components within the recessed structure, and C. flange portions extending from side portions of the frame assembly;

II. a keyboard assembly removably couplable to the recessed structure by fasteners extending through the tabs; and III. a trim member including a plurality of boss members engaging corresponding holes in the frame assembly to enclose the portable electronic device and keyboard assembly.

18. The system of claim 17, wherein the trim member includes an inner surface contacting and retaining the portable electronic device.

19. The system of claim 18, wherein the trim member includes side portions aligned with the side portions of the frame assembly to provide edge protection.

20. The system of claim 19, wherein the frame assembly and trim member together define an enclosure substantially surrounding the keyboard assembly and the portable electronic device in a closed configuration.

* * * * *